(12) United States Patent
Chen et al.

(10) Patent No.: US 9,237,101 B2
(45) Date of Patent: Jan. 12, 2016

(54) GENERATING AND COMMUNICATING SOURCE IDENTIFICATION INFORMATION TO ENABLE RELIABLE COMMUNICATIONS

(75) Inventors: Steve Chen, Fremont, CA (US);
Michael G. Luby, Berkeley, CA (US);
Manu Prasad, Fremont, CA (US);
William Seed, Los Altos, CA (US);
Thomas Stockhammer, Bergen (DE)

(73) Assignee: Digital Fountain, Inc., San Diego, CA (US)

( * ) Notice: Subject to any disclaimer, the term of this patent is extended or adjusted under 35 U.S.C. 154(b) by 406 days.

(21) Appl. No.: 12/210,024

(22) Filed: Sep. 12, 2008

(65) Prior Publication Data

US 2009/0067551 A1 Mar. 12, 2009

Related U.S. Application Data

(60) Provisional application No. 61/093,277, filed on Aug. 29, 2008, provisional application No. 60/971,884, filed on Sep. 12, 2007.

(51) Int. Cl.
*H04J 3/24* (2006.01)
*H04J 3/06* (2006.01)
(Continued)

(52) U.S. Cl.
CPC ............... *H04L 47/10* (2013.01); *H04L 1/004* (2013.01); *H04L 1/1841* (2013.01); *H04L 47/11* (2013.01); *H04L 1/0072* (2013.01); *H04L 2001/0093* (2013.01)

(58) Field of Classification Search
USPC ........................................ 370/474, 486, 487
See application file for complete search history.

(56) References Cited

U.S. PATENT DOCUMENTS

| 3,909,721 A | 9/1975 | Bussgang et al. |
| 4,365,338 A | 12/1982 | McRae et al. |

(Continued)

FOREIGN PATENT DOCUMENTS

| CN | 1338839 A | 3/2002 |
| CN | 1425228 A | 6/2003 |

(Continued)

OTHER PUBLICATIONS

DVB-IPI Standard: DVB BlueBook A086r4 (Mar. 2007) Transport of MPEG 2 Transport Streatm (TS) Based DVB Services over IP Based Networks, ETSI Technical Specification 102 034 v1.3.1.

(Continued)

*Primary Examiner* — Warner Wong

(57) ABSTRACT

A method of generating Source Identification information from a source packet stream and reliably transmitting the Source Identification information from a source to a destination over a communications channel is provided. The method operates on a set of source packets, wherein Source Identification information for each source packet to be transmitted is derived and delivered with the Source Identification information of all or most other source packets of an associated source block. The method includes techniques to minimize the network bandwidth required to deliver Source Identification information and techniques to overcome network impairments. When combined with FEC techniques, retransmission techniques, or combinations of FEC techniques and retransmission techniques, the methods described herein allow receivers to recover lost source packets, while simultaneously ensuring that the original source packets are not modified and thereby ensuring backwards compatibility for legacy receivers.

35 Claims, 30 Drawing Sheets

(51) Int. Cl.
    *G06F 3/00*     (2006.01)
    *G06F 11/00*    (2006.01)
    *H04L 12/801*   (2013.01)
    *H04L 1/00*     (2006.01)
    *H04L 1/18*     (2006.01)

(56) References Cited

U.S. PATENT DOCUMENTS

| | | |
|---|---|---|
| 4,589,112 A | 5/1986 | Karim |
| 4,901,319 A | 2/1990 | Ross |
| 5,136,592 A | 8/1992 | Weng |
| 5,153,591 A | 10/1992 | Clark |
| 5,329,369 A | 7/1994 | Willis et al. |
| 5,331,320 A | 7/1994 | Cideciyan et al. |
| 5,371,532 A | 12/1994 | Gelman et al. |
| 5,372,532 A | 12/1994 | Robertson, Jr. |
| 5,379,297 A | 1/1995 | Glover et al. |
| 5,421,031 A | 5/1995 | De Bey |
| 5,425,050 A | 6/1995 | Schreiber et al. |
| 5,432,787 A | 7/1995 | Chethik |
| 5,455,823 A | 10/1995 | Noreen et al. |
| 5,465,318 A | 11/1995 | Sejnoha |
| 5,517,508 A | 5/1996 | Scott |
| 5,524,025 A | 6/1996 | Lawrence et al. |
| 5,566,208 A | 10/1996 | Balakrishnan |
| 5,568,614 A | 10/1996 | Mendelson et al. |
| 5,583,784 A | 12/1996 | Kapust et al. |
| 5,608,738 A | 3/1997 | Matsushita |
| 5,617,541 A | 4/1997 | Albanese et al. |
| 5,642,365 A | 6/1997 | Murakami et al. |
| 5,659,614 A | 8/1997 | Bailey, III |
| 5,699,473 A | 12/1997 | Kim |
| 5,701,582 A | 12/1997 | DeBey |
| 5,751,336 A | 5/1998 | Aggarwal et al. |
| 5,754,563 A | 5/1998 | White |
| 5,757,415 A | 5/1998 | Asamizuya et al. |
| 5,802,394 A | 9/1998 | Baird et al. |
| 5,805,825 A | 9/1998 | Danneels et al. |
| 5,835,165 A | 11/1998 | Keate et al. |
| 5,844,636 A | 12/1998 | Joseph et al. |
| 5,852,565 A | 12/1998 | Demos |
| 5,870,412 A | 2/1999 | Schuster et al. |
| 5,903,775 A | 5/1999 | Murray |
| 5,917,852 A | 6/1999 | Butterfield et al. |
| 5,926,205 A | 7/1999 | Krause et al. |
| 5,933,056 A | 8/1999 | Rothenberg |
| 5,936,659 A | 8/1999 | Viswanathan |
| 5,936,949 A | 8/1999 | Pasternak et al. |
| 5,953,537 A | 9/1999 | Balicki et al. |
| 5,970,098 A | 10/1999 | Herzberg |
| 5,983,383 A | 11/1999 | Wolf |
| 5,993,056 A | 11/1999 | Vaman et al. |
| 6,005,477 A | 12/1999 | Deck et al. |
| 6,011,590 A | 1/2000 | Saukkonen |
| 6,012,159 A | 1/2000 | Fischer et al. |
| 6,014,706 A | 1/2000 | Cannon et al. |
| 6,018,359 A | 1/2000 | Kermode et al. |
| 6,041,001 A | 3/2000 | Estakhri |
| 6,044,485 A | 3/2000 | Dent et al. |
| 6,061,820 A | 5/2000 | Nakakita et al. |
| 6,073,250 A | 6/2000 | Luby et al. |
| 6,079,041 A | 6/2000 | Kunisa et al. |
| 6,079,042 A | 6/2000 | Vaman et al. |
| 6,081,907 A | 6/2000 | Witty et al. |
| 6,081,909 A | 6/2000 | Luby et al. |
| 6,081,918 A | 6/2000 | Spielman |
| 6,088,330 A | 7/2000 | Bruck et al. |
| 6,097,320 A | 8/2000 | Kuki et al. |
| 6,134,596 A | 10/2000 | Bolosky et al. |
| 6,141,053 A | 10/2000 | Saukkonen |
| 6,141,787 A | 10/2000 | Kunisa et al. |
| 6,141,788 A | 10/2000 | Rosenberg et al. |
| 6,154,452 A | 11/2000 | Marko et al. |
| 6,163,870 A | 12/2000 | Luby et al. |
| 6,166,544 A | 12/2000 | Debbins et al. |
| 6,175,944 B1 | 1/2001 | Urbanke et al. |
| 6,178,536 B1 | 1/2001 | Sorkin |
| 6,185,265 B1 | 2/2001 | Campanella |
| 6,195,777 B1 | 2/2001 | Luby et al. |
| 6,223,324 B1 | 4/2001 | Sinha et al. |
| 6,226,259 B1 | 5/2001 | Piret |
| 6,226,301 B1 | 5/2001 | Cheng et al. |
| 6,229,824 B1 | 5/2001 | Marko |
| 6,243,846 B1 | 6/2001 | Schuster et al. |
| 6,272,658 B1 | 8/2001 | Steele et al. |
| 6,278,716 B1 | 8/2001 | Rubenstein et al. |
| 6,298,462 B1 | 10/2001 | Yi |
| 6,314,289 B1 | 11/2001 | Eberlein et al. |
| 6,320,520 B1 | 11/2001 | Luby |
| 6,332,163 B1 | 12/2001 | Bowman-Amuah |
| 6,333,926 B1 | 12/2001 | Van Heeswyk et al. |
| 6,373,406 B2 | 4/2002 | Luby |
| 6,393,065 B1 | 5/2002 | Piret et al. |
| 6,411,223 B1 | 6/2002 | Haken et al. |
| 6,415,326 B1 | 7/2002 | Gupta et al. |
| 6,420,982 B1 | 7/2002 | Brown |
| 6,421,387 B1 | 7/2002 | Rhee |
| 6,430,233 B1 | 8/2002 | Dillon et al. |
| 6,445,717 B1 | 9/2002 | Gibson et al. |
| 6,459,811 B1 | 10/2002 | Hurst, Jr. |
| 6,466,698 B1 | 10/2002 | Creusere |
| 6,473,010 B1 | 10/2002 | Vityaev et al. |
| 6,486,803 B1 | 11/2002 | Luby et al. |
| 6,487,692 B1 | 11/2002 | Morelos-Zaragoza |
| 6,496,980 B1 | 12/2002 | Tillman et al. |
| 6,510,177 B1 | 1/2003 | De Bonet et al. |
| 6,523,147 B1 | 2/2003 | Kroeger et al. |
| 6,535,920 B1 | 3/2003 | Parry et al. |
| 6,584,543 B2 | 6/2003 | Williams et al. |
| 6,609,223 B1 | 8/2003 | Wolfgang |
| 6,614,366 B2 | 9/2003 | Luby |
| 6,618,451 B1 | 9/2003 | Gonikberg |
| 6,631,172 B1 | 10/2003 | Shokrollahi et al. |
| 6,633,856 B2 | 10/2003 | Richardson et al. |
| 6,641,366 B2 | 11/2003 | Nordhoff |
| 6,643,332 B1 | 11/2003 | Morelos-Zaragoza et al. |
| 6,677,864 B2 | 1/2004 | Khayrallah |
| 6,678,855 B1 | 1/2004 | Gemmell |
| 6,694,476 B1 | 2/2004 | Sridharan et al. |
| 6,704,370 B1 | 3/2004 | Chheda et al. |
| 6,732,325 B1 | 5/2004 | Tash et al. |
| 6,742,154 B1 | 5/2004 | Barnard |
| 6,748,441 B1 | 6/2004 | Gemmell |
| 6,751,772 B1 | 6/2004 | Kim et al. |
| 6,765,866 B1 * | 7/2004 | Wyatt .......................... 370/229 |
| 6,804,202 B1 | 10/2004 | Hwang |
| 6,810,499 B2 | 10/2004 | Sridharan et al. |
| 6,820,221 B2 | 11/2004 | Fleming |
| 6,831,172 B1 | 12/2004 | Barbucci et al. |
| 6,849,803 B1 | 2/2005 | Gretz |
| 6,850,736 B2 | 2/2005 | McCune, Jr. |
| 6,868,083 B2 | 3/2005 | Apostolopoulos et al. |
| 6,876,623 B1 | 4/2005 | Lou et al. |
| 6,882,618 B1 | 4/2005 | Sakoda et al. |
| 6,895,547 B2 | 5/2005 | Eleftheriou et al. |
| 6,909,383 B2 | 6/2005 | Shokrollahi et al. |
| 6,928,603 B1 | 8/2005 | Castagna et al. |
| 6,937,618 B1 | 8/2005 | Noda et al. |
| 6,956,875 B2 | 10/2005 | Kapadia et al. |
| 6,965,636 B1 | 11/2005 | DesJardins et al. |
| 6,985,459 B2 | 1/2006 | Dickson |
| 6,995,692 B2 | 2/2006 | Yokota et al. |
| 7,010,052 B2 | 3/2006 | Dill et al. |
| 7,030,785 B2 | 4/2006 | Shokrollahi et al. |
| 7,031,257 B1 | 4/2006 | Lu et al. |
| 7,057,534 B2 | 6/2006 | Luby |
| 7,068,681 B2 | 6/2006 | Chang et al. |
| 7,072,971 B2 | 7/2006 | Lassen et al. |
| 7,073,191 B2 | 7/2006 | Srikantan et al. |
| 7,100,188 B2 | 8/2006 | Hejna, Jr. |
| 7,110,412 B2 | 9/2006 | Costa et al. |
| 7,139,660 B2 | 11/2006 | Sarkar et al. |
| 7,139,960 B2 | 11/2006 | Shokrollahi |
| 7,143,433 B1 | 11/2006 | Duan et al. |

(56) References Cited

U.S. PATENT DOCUMENTS

| | | | |
|---|---|---|---|
| 7,151,754 B1 | 12/2006 | Boyce et al. | |
| 7,154,951 B2 | 12/2006 | Wang | |
| 7,164,370 B1 | 1/2007 | Mishra | |
| 7,164,882 B2 | 1/2007 | Poltorak | |
| 7,168,030 B2 | 1/2007 | Ariyoshi | |
| 7,219,289 B2 | 5/2007 | Dickson | |
| 7,233,264 B2 | 6/2007 | Luby | |
| 7,240,236 B2 | 7/2007 | Cutts et al. | |
| 7,240,358 B2 | 7/2007 | Horn et al. | |
| 7,243,285 B2 | 7/2007 | Foisy et al. | |
| 7,249,291 B2* | 7/2007 | Rasmussen et al. | 714/701 |
| 7,254,754 B2 | 8/2007 | Hetzler et al. | |
| 7,257,764 B2 | 8/2007 | Suzuki et al. | |
| 7,265,688 B2 | 9/2007 | Shokrollahi et al. | |
| 7,293,222 B2 | 11/2007 | Shokrollahi | |
| 7,295,573 B2 | 11/2007 | Yi et al. | |
| 7,304,990 B2 | 12/2007 | Rajwan | |
| 7,318,180 B2 | 1/2008 | Starr | |
| 7,320,099 B2 | 1/2008 | Miura et al. | |
| 7,363,048 B2 | 4/2008 | Cheng et al. | |
| 7,391,717 B2 | 6/2008 | Klemets et al. | |
| 7,394,407 B2 | 7/2008 | Shokrollahi et al. | |
| 7,398,454 B2 | 7/2008 | Cai et al. | |
| 7,409,626 B1 | 8/2008 | Schelstraete | |
| 7,412,641 B2 | 8/2008 | Shokrollahi | |
| 7,451,377 B2 | 11/2008 | Shokrollahi | |
| 7,483,447 B2 | 1/2009 | Chang et al. | |
| 7,483,489 B2 | 1/2009 | Gentric et al. | |
| 7,512,697 B2 | 3/2009 | Lassen et al. | |
| 7,529,806 B1 | 5/2009 | Shteyn | |
| 7,532,132 B2 | 5/2009 | Shokrollahi et al. | |
| 7,555,006 B2 | 6/2009 | Wolfe et al. | |
| 7,559,004 B1 | 7/2009 | Chang et al. | |
| 7,570,665 B2* | 8/2009 | Ertel et al. | 370/503 |
| 7,574,706 B2 | 8/2009 | Meulemans et al. | |
| 7,597,423 B2* | 10/2009 | Silverbrook | 347/56 |
| 7,613,183 B1* | 11/2009 | Brewer et al. | 370/392 |
| 7,633,413 B2 | 12/2009 | Shokrollahi et al. | |
| 7,644,335 B2 | 1/2010 | Luby et al. | |
| 7,650,036 B2 | 1/2010 | Lei et al. | |
| 7,668,198 B2 | 2/2010 | Yi et al. | |
| 7,720,096 B2 | 5/2010 | Klemets | |
| 7,720,174 B2 | 5/2010 | Shokrollahi et al. | |
| 7,812,743 B2 | 10/2010 | Luby | |
| 7,831,896 B2* | 11/2010 | Amram et al. | 714/804 |
| 7,924,913 B2 | 4/2011 | Sullivan et al. | |
| 7,956,772 B2 | 6/2011 | Shokrollahi et al. | |
| 7,961,700 B2 | 6/2011 | Malladi et al. | |
| 7,971,129 B2* | 6/2011 | Watson et al. | 714/784 |
| 7,979,769 B2 | 7/2011 | Lee et al. | |
| 8,027,328 B2 | 9/2011 | Yang et al. | |
| 8,028,322 B2 | 9/2011 | Riedl et al. | |
| 8,081,716 B2* | 12/2011 | Kang et al. | 375/340 |
| 8,135,073 B2 | 3/2012 | Shen | |
| 8,185,794 B2 | 5/2012 | Lohmar et al. | |
| 8,185,809 B2* | 5/2012 | Luby et al. | 714/786 |
| RE43,741 E | 10/2012 | Shokrollahi et al. | |
| 8,301,725 B2 | 10/2012 | Biderman et al. | |
| 8,327,403 B1 | 12/2012 | Chilvers et al. | |
| 8,340,133 B2* | 12/2012 | Kim et al. | 370/474 |
| 8,422,474 B2 | 4/2013 | Park et al. | |
| 8,462,643 B2 | 6/2013 | Walton et al. | |
| 8,544,043 B2 | 9/2013 | Parekh et al. | |
| 8,572,646 B2* | 10/2013 | Haberman et al. | 725/34 |
| 8,615,023 B2 | 12/2013 | Oh et al. | |
| 8,638,796 B2* | 1/2014 | Dan et al. | 370/394 |
| 8,713,624 B1* | 4/2014 | Harvey et al. | 725/132 |
| 8,737,421 B2 | 5/2014 | Zhang et al. | |
| 8,812,735 B2 | 8/2014 | Igarashi | |
| 2001/0015944 A1 | 8/2001 | Takahashi et al. | |
| 2001/0033586 A1 | 10/2001 | Takashimizu et al. | |
| 2002/0009137 A1 | 1/2002 | Nelson et al. | |
| 2002/0053062 A1 | 5/2002 | Szymanski | |
| 2002/0083345 A1 | 6/2002 | Halliday et al. | |
| 2002/0085013 A1 | 7/2002 | Lippincott | |
| 2002/0133247 A1 | 9/2002 | Smith et al. | |
| 2002/0141433 A1 | 10/2002 | Kwon et al. | |
| 2002/0143953 A1 | 10/2002 | Aiken | |
| 2002/0191116 A1 | 12/2002 | Kessler et al. | |
| 2003/0005386 A1 | 1/2003 | Bhatt et al. | |
| 2003/0037299 A1 | 2/2003 | Smith | |
| 2003/0086515 A1 | 5/2003 | Trans et al. | |
| 2003/0101408 A1 | 5/2003 | Martinian et al. | |
| 2003/0106014 A1 | 6/2003 | Dohmen et al. | |
| 2003/0138043 A1 | 7/2003 | Hannuksela | |
| 2003/0194211 A1 | 10/2003 | Abecassis | |
| 2003/0207696 A1 | 11/2003 | Willenegger et al. | |
| 2003/0224773 A1 | 12/2003 | Deeds | |
| 2004/0015768 A1 | 1/2004 | Bordes et al. | |
| 2004/0031054 A1 | 2/2004 | Dankworth et al. | |
| 2004/0049793 A1 | 3/2004 | Chou | |
| 2004/0066854 A1 | 4/2004 | Hannuksela | |
| 2004/0081106 A1 | 4/2004 | Bruhn | |
| 2004/0096110 A1 | 5/2004 | Yogeshwar et al. | |
| 2004/0117716 A1 | 6/2004 | Shen | |
| 2004/0151109 A1 | 8/2004 | Batra et al. | |
| 2004/0151206 A1* | 8/2004 | Scholte | 370/473 |
| 2004/0162071 A1 | 8/2004 | Grilli et al. | |
| 2004/0207548 A1 | 10/2004 | Kilbank | |
| 2004/0231004 A1 | 11/2004 | Seo | |
| 2004/0240382 A1 | 12/2004 | Ido et al. | |
| 2004/0255328 A1 | 12/2004 | Baldwin et al. | |
| 2005/0018635 A1 | 1/2005 | Proctor | |
| 2005/0028067 A1 | 2/2005 | Weirauch | |
| 2005/0041736 A1 | 2/2005 | Butler-Smith et al. | |
| 2005/0071491 A1 | 3/2005 | Seo | |
| 2005/0084006 A1 | 4/2005 | Lei et al. | |
| 2005/0091697 A1 | 4/2005 | Tanaka et al. | |
| 2005/0097213 A1 | 5/2005 | Barrett et al. | |
| 2005/0102371 A1 | 5/2005 | Aksu | |
| 2005/0105371 A1 | 5/2005 | Johnson et al. | |
| 2005/0123058 A1 | 6/2005 | Greenbaum et al. | |
| 2005/0138286 A1 | 6/2005 | Franklin et al. | |
| 2005/0152359 A1* | 7/2005 | Giesberts et al. | 370/389 |
| 2005/0160272 A1 | 7/2005 | Teppler | |
| 2005/0163468 A1 | 7/2005 | Takahashi et al. | |
| 2005/0169379 A1 | 8/2005 | Shin et al. | |
| 2005/0180415 A1 | 8/2005 | Cheung et al. | |
| 2005/0193309 A1 | 9/2005 | Grilli et al. | |
| 2005/0195752 A1 | 9/2005 | Amin et al. | |
| 2005/0195899 A1 | 9/2005 | Han | |
| 2005/0195900 A1 | 9/2005 | Han | |
| 2005/0207392 A1 | 9/2005 | Sivalingham et al. | |
| 2005/0216472 A1 | 9/2005 | Leon et al. | |
| 2005/0216951 A1 | 9/2005 | MacInnis | |
| 2005/0249222 A1* | 11/2005 | van Kampen et al. | 370/395.5 |
| 2005/0254575 A1 | 11/2005 | Hannuksela et al. | |
| 2006/0015568 A1 | 1/2006 | Walsh et al. | |
| 2006/0031738 A1 | 2/2006 | Fay et al. | |
| 2006/0037057 A1 | 2/2006 | Xu | |
| 2006/0093634 A1 | 5/2006 | Lutz et al. | |
| 2006/0107174 A1 | 5/2006 | Heise | |
| 2006/0109805 A1 | 5/2006 | Malamal Vadakital et al. | |
| 2006/0120464 A1 | 6/2006 | Hannuksela | |
| 2006/0193524 A1 | 8/2006 | Tarumoto et al. | |
| 2006/0212444 A1 | 9/2006 | Handman et al. | |
| 2006/0212782 A1 | 9/2006 | Li | |
| 2006/0229075 A1 | 10/2006 | Kim et al. | |
| 2006/0244824 A1 | 11/2006 | Debey | |
| 2006/0244865 A1 | 11/2006 | Simon | |
| 2006/0248195 A1 | 11/2006 | Toumura et al. | |
| 2006/0256851 A1 | 11/2006 | Wang et al. | |
| 2006/0262856 A1 | 11/2006 | Wu et al. | |
| 2006/0279437 A1 | 12/2006 | Luby et al. | |
| 2007/0002953 A1 | 1/2007 | Kusunoki | |
| 2007/0006274 A1 | 1/2007 | Paila et al. | |
| 2007/0016594 A1 | 1/2007 | Visharam et al. | |
| 2007/0022215 A1 | 1/2007 | Singer et al. | |
| 2007/0028099 A1* | 2/2007 | Entin et al. | 713/163 |
| 2007/0078876 A1 | 4/2007 | Hayashi et al. | |
| 2007/0081562 A1* | 4/2007 | Ma | 370/516 |
| 2007/0081586 A1 | 4/2007 | Raveendran et al. | |
| 2007/0110074 A1 | 5/2007 | Bradley et al. | |
| 2007/0127576 A1 | 6/2007 | Henocq et al. | |

(56) References Cited

U.S. PATENT DOCUMENTS

| | | |
|---|---|---|
| 2007/0134005 A1 | 6/2007 | Myong, II et al. |
| 2007/0140369 A1 | 6/2007 | Limberg et al. |
| 2007/0157267 A1 | 7/2007 | Lopez-Estrada |
| 2007/0162568 A1 | 7/2007 | Gupta et al. |
| 2007/0162611 A1 | 7/2007 | Yu et al. |
| 2007/0176800 A1 | 8/2007 | Rijavec |
| 2007/0177811 A1 | 8/2007 | Yang et al. |
| 2007/0185973 A1 | 8/2007 | Wayda et al. |
| 2007/0195894 A1 | 8/2007 | Shokrollahi et al. |
| 2007/0200949 A1 | 8/2007 | Walker et al. |
| 2007/0201549 A1 | 8/2007 | Hannuksela et al. |
| 2007/0204196 A1 | 8/2007 | Watson et al. |
| 2007/0230568 A1 | 10/2007 | Eleftheriadis et al. |
| 2007/0233784 A1 | 10/2007 | O'Rourke et al. |
| 2007/0255844 A1 | 11/2007 | Shen et al. |
| 2007/0277209 A1 | 11/2007 | Yousef |
| 2008/0010153 A1 | 1/2008 | Pugh-O'Connor et al. |
| 2008/0034273 A1 | 2/2008 | Luby |
| 2008/0052753 A1* | 2/2008 | Huang et al. .................. 725/151 |
| 2008/0058958 A1 | 3/2008 | Cheng |
| 2008/0059532 A1 | 3/2008 | Kazmi et al. |
| 2008/0066136 A1 | 3/2008 | Dorai et al. |
| 2008/0075172 A1 | 3/2008 | Koto |
| 2008/0086751 A1 | 4/2008 | Horn et al. |
| 2008/0101478 A1 | 5/2008 | Kusunoki |
| 2008/0134005 A1 | 6/2008 | Izzat et al. |
| 2008/0152241 A1 | 6/2008 | Itoi et al. |
| 2008/0168133 A1 | 7/2008 | Osborne |
| 2008/0168516 A1 | 7/2008 | Flick et al. |
| 2008/0170564 A1 | 7/2008 | Shi et al. |
| 2008/0170806 A1 | 7/2008 | Kim |
| 2008/0172430 A1 | 7/2008 | Thorstensen |
| 2008/0172712 A1 | 7/2008 | Munetsugu |
| 2008/0181296 A1 | 7/2008 | Tian et al. |
| 2008/0189419 A1 | 8/2008 | Girle et al. |
| 2008/0192818 A1 | 8/2008 | DiPietro et al. |
| 2008/0215317 A1 | 9/2008 | Fejzo |
| 2008/0232357 A1 | 9/2008 | Chen |
| 2008/0243918 A1 | 10/2008 | Holtman |
| 2008/0256418 A1 | 10/2008 | Luby et al. |
| 2008/0281943 A1 | 11/2008 | Shapiro |
| 2008/0285556 A1 | 11/2008 | Park et al. |
| 2008/0303893 A1 | 12/2008 | Kim et al. |
| 2008/0303896 A1 | 12/2008 | Lipton et al. |
| 2008/0309525 A1 | 12/2008 | Shokrollahi et al. |
| 2008/0313191 A1 | 12/2008 | Bouazizi |
| 2009/0003439 A1 | 1/2009 | Wang et al. |
| 2009/0019229 A1 | 1/2009 | Morrow et al. |
| 2009/0031199 A1 | 1/2009 | Luby et al. |
| 2009/0043906 A1 | 2/2009 | Hurst et al. |
| 2009/0055705 A1 | 2/2009 | Gao |
| 2009/0083806 A1 | 3/2009 | Barrett et al. |
| 2009/0089445 A1 | 4/2009 | Deshpande |
| 2009/0092138 A1 | 4/2009 | Joo et al. |
| 2009/0100496 A1 | 4/2009 | Bechtolsheim et al. |
| 2009/0103523 A1 | 4/2009 | Katis et al. |
| 2009/0106356 A1 | 4/2009 | Brase et al. |
| 2009/0125636 A1 | 5/2009 | Li et al. |
| 2009/0150557 A1 | 6/2009 | Wormley et al. |
| 2009/0158114 A1 | 6/2009 | Shokrollahi |
| 2009/0164653 A1 | 6/2009 | Mandyam et al. |
| 2009/0189792 A1 | 7/2009 | Shokrollahi et al. |
| 2009/0195640 A1 | 8/2009 | Kim et al. |
| 2009/0201990 A1 | 8/2009 | Leprovost et al. |
| 2009/0204877 A1 | 8/2009 | Betts |
| 2009/0210547 A1 | 8/2009 | Lassen et al. |
| 2009/0222873 A1 | 9/2009 | Einarsson |
| 2009/0248697 A1 | 10/2009 | Richardson et al. |
| 2009/0257508 A1 | 10/2009 | Aggarwal et al. |
| 2009/0287841 A1 | 11/2009 | Chapweske et al. |
| 2009/0297123 A1 | 12/2009 | Virdi et al. |
| 2009/0300203 A1 | 12/2009 | Virdi et al. |
| 2009/0300204 A1 | 12/2009 | Zhang et al. |
| 2009/0307565 A1 | 12/2009 | Luby et al. |
| 2009/0319563 A1 | 12/2009 | Schnell |
| 2009/0328228 A1 | 12/2009 | Schnell |
| 2010/0011061 A1 | 1/2010 | Hudson et al. |
| 2010/0011117 A1 | 1/2010 | Hristodorescu et al. |
| 2010/0011274 A1 | 1/2010 | Stockhammer et al. |
| 2010/0020871 A1 | 1/2010 | Hannuksela et al. |
| 2010/0023525 A1 | 1/2010 | Westerlund et al. |
| 2010/0046906 A1 | 2/2010 | Kanamori et al. |
| 2010/0049865 A1 | 2/2010 | Hannuksela et al. |
| 2010/0061444 A1 | 3/2010 | Wilkins et al. |
| 2010/0067495 A1 | 3/2010 | Lee et al. |
| 2010/0131671 A1 | 5/2010 | Kohli et al. |
| 2010/0153578 A1 | 6/2010 | Van Gassel et al. |
| 2010/0165077 A1 | 7/2010 | Yin et al. |
| 2010/0174823 A1 | 7/2010 | Huang |
| 2010/0189131 A1 | 7/2010 | Branam et al. |
| 2010/0198982 A1 | 8/2010 | Fernandez |
| 2010/0211690 A1 | 8/2010 | Pakzad et al. |
| 2010/0223533 A1 | 9/2010 | Stockhammer et al. |
| 2010/0235472 A1 | 9/2010 | Sood et al. |
| 2010/0235528 A1 | 9/2010 | Bocharov et al. |
| 2010/0257051 A1 | 10/2010 | Fernandez |
| 2010/0318632 A1 | 12/2010 | Yoo et al. |
| 2011/0019769 A1 | 1/2011 | Shokrollahi et al. |
| 2011/0055881 A1 | 3/2011 | Yu et al. |
| 2011/0083144 A1 | 4/2011 | Bocharov et al. |
| 2011/0096828 A1 | 4/2011 | Chen et al. |
| 2011/0103519 A1 | 5/2011 | Shokrollahi et al. |
| 2011/0119394 A1 | 5/2011 | Wang et al. |
| 2011/0119396 A1 | 5/2011 | Kwon et al. |
| 2011/0216541 A1 | 9/2011 | Inoue et al. |
| 2011/0231519 A1 | 9/2011 | Luby et al. |
| 2011/0231569 A1 | 9/2011 | Luby et al. |
| 2011/0238789 A1 | 9/2011 | Luby et al. |
| 2011/0239078 A1 | 9/2011 | Luby et al. |
| 2011/0258510 A1 | 10/2011 | Watson et al. |
| 2011/0268178 A1 | 11/2011 | Park et al. |
| 2011/0280311 A1 | 11/2011 | Chen et al. |
| 2011/0280316 A1 | 11/2011 | Chen et al. |
| 2011/0299629 A1 | 12/2011 | Luby et al. |
| 2011/0307545 A1 | 12/2011 | Bouazizi |
| 2011/0307581 A1 | 12/2011 | Furbeck et al. |
| 2012/0013746 A1 | 1/2012 | Chen et al. |
| 2012/0016965 A1 | 1/2012 | Chen et al. |
| 2012/0020413 A1 | 1/2012 | Chen et al. |
| 2012/0023249 A1 | 1/2012 | Chen et al. |
| 2012/0023254 A1 | 1/2012 | Park et al. |
| 2012/0033730 A1 | 2/2012 | Lee |
| 2012/0042050 A1 | 2/2012 | Chen et al. |
| 2012/0042089 A1 | 2/2012 | Chen et al. |
| 2012/0042090 A1 | 2/2012 | Chen et al. |
| 2012/0047280 A1 | 2/2012 | Park et al. |
| 2012/0099593 A1 | 4/2012 | Luby |
| 2012/0151302 A1 | 6/2012 | Luby et al. |
| 2012/0185530 A1 | 7/2012 | Reza |
| 2012/0202535 A1 | 8/2012 | Chaddha et al. |
| 2012/0207068 A1 | 8/2012 | Watson et al. |
| 2012/0208580 A1 | 8/2012 | Luby et al. |
| 2012/0210190 A1 | 8/2012 | Luby et al. |
| 2012/0317305 A1 | 12/2012 | Einarsson et al. |
| 2013/0002483 A1 | 1/2013 | Rowitch et al. |
| 2013/0007223 A1 | 1/2013 | Luby et al. |
| 2013/0067295 A1 | 3/2013 | Luby et al. |
| 2013/0091251 A1 | 4/2013 | Walker et al. |
| 2013/0246643 A1 | 9/2013 | Luby et al. |
| 2013/0254634 A1 | 9/2013 | Luby |
| 2013/0287023 A1 | 10/2013 | Bims |
| 2014/0009578 A1 | 1/2014 | Chen et al. |
| 2014/0380113 A1 | 12/2014 | Luby |

FOREIGN PATENT DOCUMENTS

| | | |
|---|---|---|
| CN | 1481643 A | 3/2004 |
| CN | 1708934 A | 12/2005 |
| CN | 1714577 A | 12/2005 |
| CN | 1792056 A | 6/2006 |
| CN | 1806392 A | 7/2006 |
| CN | 1819661 A | 8/2006 |
| CN | 1868157 A | 11/2006 |
| CN | 101390399 A | 3/2009 |

(56) References Cited

FOREIGN PATENT DOCUMENTS

| | | |
|---|---|---|
| CN | 101729857 A | 6/2010 |
| EP | 0669587 A2 | 8/1995 |
| EP | 0701371 A1 | 3/1996 |
| EP | 0784401 A2 | 7/1997 |
| EP | 0853433 A1 | 7/1998 |
| EP | 0854650 A2 | 7/1998 |
| EP | 0903955 A1 | 3/1999 |
| EP | 0986908 A1 | 3/2000 |
| EP | 1024672 A1 | 8/2000 |
| EP | 1051027 A1 | 11/2000 |
| EP | 1124344 A1 | 8/2001 |
| EP | 1241795 A2 | 9/2002 |
| EP | 1298931 A2 | 4/2003 |
| EP | 1406452 A2 | 4/2004 |
| EP | 1455504 A2 | 9/2004 |
| EP | 1468497 A1 | 10/2004 |
| EP | 1501318 A1 | 1/2005 |
| EP | 1670256 A2 | 6/2006 |
| EP | 1755248 A1 | 2/2007 |
| EP | 2046044 A1 | 4/2009 |
| EP | 2071827 A2 | 6/2009 |
| EP | 2096870 A2 | 9/2009 |
| EP | 1700410 B1 | 4/2010 |
| EP | 2323390 A2 | 5/2011 |
| JP | H07183873 | 7/1995 |
| JP | 08186570 | 7/1996 |
| JP | 8289255 A | 11/1996 |
| JP | 9252253 A | 9/1997 |
| JP | 11041211 A | 2/1999 |
| JP | 11112479 | 4/1999 |
| JP | 11164270 A | 6/1999 |
| JP | 2000151426 A | 5/2000 |
| JP | 2000216835 A | 8/2000 |
| JP | 2000513164 A | 10/2000 |
| JP | 2000307435 A | 11/2000 |
| JP | 2000353969 A | 12/2000 |
| JP | 2001036417 | 2/2001 |
| JP | 2001094625 | 4/2001 |
| JP | 2001189665 A | 7/2001 |
| JP | 2001223655 A | 8/2001 |
| JP | 2001251287 A | 9/2001 |
| JP | 2001274776 A | 10/2001 |
| JP | 2001274855 A | 10/2001 |
| JP | 2002073625 A | 3/2002 |
| JP | 2002204219 A | 7/2002 |
| JP | 2002543705 A | 12/2002 |
| JP | 2003018568 A | 1/2003 |
| JP | 2003507985 | 2/2003 |
| JP | 2003092564 A | 3/2003 |
| JP | 2003510734 A | 3/2003 |
| JP | 2003174489 | 6/2003 |
| JP | 2003256321 A | 9/2003 |
| JP | 2003318975 A | 11/2003 |
| JP | 2003319012 | 11/2003 |
| JP | 2003333577 A | 11/2003 |
| JP | 2004048704 A | 2/2004 |
| JP | 2004070712 A | 3/2004 |
| JP | 2004135013 A | 4/2004 |
| JP | 2004165922 A | 6/2004 |
| JP | 2004516717 A | 6/2004 |
| JP | 2004192140 A | 7/2004 |
| JP | 2004193992 A | 7/2004 |
| JP | 2004529533 A | 9/2004 |
| JP | 2004289621 A | 10/2004 |
| JP | 2004343701 A | 12/2004 |
| JP | 2004348824 A | 12/2004 |
| JP | 2004362099 A | 12/2004 |
| JP | 2005094140 A | 4/2005 |
| JP | 2005136546 A | 5/2005 |
| JP | 2005514828 T | 5/2005 |
| JP | 2005204170 A | 7/2005 |
| JP | 2005223433 A | 8/2005 |
| JP | 2005277950 A | 10/2005 |
| JP | 2006503463 A | 1/2006 |
| JP | 2006505177 A | 2/2006 |
| JP | 2006506926 A | 2/2006 |
| JP | 2006074335 A | 3/2006 |
| JP | 2006074421 A | 3/2006 |
| JP | 2006115104 A | 4/2006 |
| JP | 3809957 | 6/2006 |
| JP | 2006174032 A | 6/2006 |
| JP | 2006174045 A | 6/2006 |
| JP | 2006186419 A | 7/2006 |
| JP | 2006519517 A | 8/2006 |
| JP | 2006287422 A | 10/2006 |
| JP | 2006319743 A | 11/2006 |
| JP | 2007013675 A | 1/2007 |
| JP | 2007089137 A | 4/2007 |
| JP | 3976163 | 6/2007 |
| JP | 2007158592 A | 6/2007 |
| JP | 2007174170 A | 7/2007 |
| JP | 2007520961 A | 7/2007 |
| JP | 2007228205 A | 9/2007 |
| JP | 2008011404 A | 1/2008 |
| JP | 2008016907 A | 1/2008 |
| JP | 2008502212 A | 1/2008 |
| JP | 2008508761 A | 3/2008 |
| JP | 2008508762 A | 3/2008 |
| JP | 2008283232 A | 11/2008 |
| JP | 2008283571 A | 11/2008 |
| JP | 2008543142 A | 11/2008 |
| JP | 2008546361 A | 12/2008 |
| JP | 2009027598 A | 2/2009 |
| JP | 2009522921 A | 6/2009 |
| JP | 2009522922 A | 6/2009 |
| JP | 2009171558 A | 7/2009 |
| JP | 2009527949 A | 7/2009 |
| JP | 2009277182 A | 11/2009 |
| JP | 2009544991 A | 12/2009 |
| JP | 2010539816 A | 12/2010 |
| JP | 2010539832 A | 12/2010 |
| JP | 2011087103 A | 4/2011 |
| JP | 4971144 B2 | 7/2012 |
| KR | 1020030071815 | 9/2003 |
| KR | 1020030074386 A | 9/2003 |
| KR | 20040107152 A | 12/2004 |
| KR | 20040107401 A | 12/2004 |
| KR | 20050009376 A | 1/2005 |
| KR | 100809086 B1 | 3/2008 |
| KR | 20080083299 A | 9/2008 |
| KR | 20090098919 A | 9/2009 |
| KR | 20100028156 A | 3/2010 |
| RU | 99117925 A | 7/2001 |
| RU | 2189629 C2 | 9/2002 |
| RU | 2265960 C2 | 12/2005 |
| RU | 2290768 C1 | 12/2006 |
| RU | 2297663 C2 | 4/2007 |
| RU | 2312390 C2 | 12/2007 |
| RU | 2357279 C2 | 5/2009 |
| TW | I246841 B | 1/2006 |
| TW | I354908 | 12/2011 |
| TW | I355168 | 12/2011 |
| WO | WO9634463 A1 | 10/1996 |
| WO | WO-9750183 A1 | 12/1997 |
| WO | WO9804973 A1 | 2/1998 |
| WO | WO9832231 | 7/1998 |
| WO | WO-9832256 A1 | 7/1998 |
| WO | WO0014921 A1 | 3/2000 |
| WO | WO0018017 | 3/2000 |
| WO | WO0052600 A1 | 9/2000 |
| WO | WO0120786 A1 | 3/2001 |
| WO | WO0157667 A1 | 8/2001 |
| WO | WO0158130 A2 | 8/2001 |
| WO | WO0158131 A2 | 8/2001 |
| WO | WO0227988 A2 | 4/2002 |
| WO | WO0247391 A1 | 6/2002 |
| WO | 02063461 A1 | 8/2002 |
| WO | WO-03046742 A1 | 6/2003 |
| WO | WO03056703 | 7/2003 |
| WO | WO03105350 | 12/2003 |
| WO | WO-03105484 A1 | 12/2003 |
| WO | WO2004008735 A2 | 1/2004 |
| WO | WO2004015948 A1 | 2/2004 |
| WO | WO2004019521 A1 | 3/2004 |

(56) References Cited

FOREIGN PATENT DOCUMENTS

| | | |
|---|---|---|
| WO | WO2004030273 A1 | 4/2004 |
| WO | WO2004034589 A2 | 4/2004 |
| WO | WO-2004036824 A1 | 4/2004 |
| WO | WO2004040831 A1 | 5/2004 |
| WO | WO-2004047019 A2 | 6/2004 |
| WO | WO2004047455 A1 | 6/2004 |
| WO | WO-2004088988 A1 | 10/2004 |
| WO | WO-2004109538 A1 | 12/2004 |
| WO | WO2005036753 A2 | 4/2005 |
| WO | WO2005041421 A1 | 5/2005 |
| WO | WO2005078982 A1 | 8/2005 |
| WO | WO-2005107123 | 11/2005 |
| WO | WO2005112250 A2 | 11/2005 |
| WO | WO-2006013459 A1 | 2/2006 |
| WO | WO2006020826 A2 | 2/2006 |
| WO | WO-2006036276 | 4/2006 |
| WO | 2006060036 A1 | 6/2006 |
| WO | WO-2006057938 A2 | 6/2006 |
| WO | WO2006084503 A1 | 8/2006 |
| WO | WO-2006116102 A2 | 11/2006 |
| WO | WO-2006135878 A2 | 12/2006 |
| WO | WO2007042916 | 4/2007 |
| WO | 2007078253 A2 | 7/2007 |
| WO | WO2007090834 A2 | 8/2007 |
| WO | WO-2007098397 A2 | 8/2007 |
| WO | WO-2007098480 A1 | 8/2007 |
| WO | 2008011549 A2 | 1/2008 |
| WO | WO-2008023328 A3 | 4/2008 |
| WO | WO2008054100 A1 | 5/2008 |
| WO | 2008086313 A1 | 7/2008 |
| WO | WO2008085013 A1 | 7/2008 |
| WO | WO-2008131023 A1 | 10/2008 |
| WO | 2008144004 A1 | 11/2008 |
| WO | WO2008148708 A1 | 12/2008 |
| WO | WO2008156390 A1 | 12/2008 |
| WO | WO-2009036378 | 3/2009 |
| WO | WO-2009065526 A1 | 5/2009 |
| WO | WO-2009137705 A2 | 11/2009 |
| WO | 2009143741 A1 | 12/2009 |
| WO | WO2010085361 A2 | 7/2010 |
| WO | WO2010088420 A1 | 8/2010 |
| WO | WO2010120804 A1 | 10/2010 |
| WO | WO-2011038013 | 3/2011 |
| WO | WO-2011038034 A1 | 3/2011 |
| WO | 2011059286 A2 | 5/2011 |
| WO | 2011070552 A1 | 6/2011 |
| WO | 2011102792 A1 | 8/2011 |
| WO | WO-2012021540 | 2/2012 |
| WO | WO-2012109614 A1 | 8/2012 |

OTHER PUBLICATIONS

3GPP TS 26.234 V9.1.0, "3rd Generation Partnership Project; Technical Specification Group Services and System Aspects; Transparent end-to-end Packet-switched Streaming Service (PSS); Protocols and codecs (Release 9)", Dec. 2009, p. 179.

3GPP TS 26.244, V9.1.0, 3rd Generation Partnership Project; Technical Specification Group Services and System Aspects; Transparent end-to-end packet switched streaming service (PSS); 3GPP file format (3GP), (Release 9), Mar. 2010, 55 pp.

3GPP TS 26.247, v1.5.0, 3rd Generation Partnership Project; Technical Specification Group Services and System Aspects Transparent end-to-end Packet-switched Streaming Service (PSS); Progressive Download and Dynamic Adaptive Streaming over HTTP (3GP-DASH) (Release 10), 2010.

3rd Generation Partnership Project, Technical Specification Group Services and System Aspects Transparent end-to-end packet switched streaming service (PSS), 3GPP file format (3GP) (Release 8), 3GPP Standard, 3GPP TS 26.244, 3rd Generation Partnership Project (3GPP), Mobile Competence Centre, 650, Route des Lucioles, F-06921 Sophia-Antipolis Cedex, France, No. V8.1.0, Jun. 1, 2009, pp. 1-52, XP050370199.

3rd Generation Partnership Project; Technical Specification Group Services and System Aspects; Transparent end-to-end packet switched streaming service (PSS); 3GPP file format (3GP), (Release 9), 3GPP Standard; 3GPP TS 26.244, 3rd Generation Partnership Project (3GPP), Mobile Competence Centre; 650 Route des Lucioles; F-06921 Sophia-Antipolis Cedex; France No. V9.2.0, Jun. 9, 2010, pp. 1-55, XP050441544, retrieved Jun. 9, 2010.

A. Mimnaugh et al. "Enabling Mobile Coverage for DVB-T" Digital Fountain Whitepaper Feb. 29, 2008, pp. 1-9, XP002581808 Retrieved from the Internet: URL:http://www.digitalfountain.com/ufiles/library/DVB-T-whitepaper.pdf> [retrieved on May 10, 2010].

Afzal, et al., "Video Streaming over MBMS: A System Design Approach", Journal of Multimedia, vol. 1, No. 5, Aug. 2006, pp. 25-35.

Aggarwal, C. et al.: "A Permutation-Based Pyramid Broadcasting Scheme for Video-on-Demand Systems," Proc. IEEE Int'l Conf. on Multimedia Systems, Hiroshima, Japan Jun. 1996.

Aggarwal, C. et al.: "On Optimal Batching Policies for Video-on-Demand Storage Servers," Multimedia Systems, vol. 4, No. 4, pp. 253-258 (1996).

Albanese, A., et al., "Priority Encoding Transmission", IEEE Transactions on Information Theory, vol. 42, No. 6, pp. 1-22, Nov. 1996.

Alex Zambelli,"IIS Smooth Streaming Technical Overview", Microsoft Mar. 25, 2009, XP002620446, Retrieved from the Internet: URL:http://www.microsoft.com/downloads/en/details.aspx?FamilyID=03d22583-3ed6-44da-8464-b1b4b5ca7520, [retrieved on Jan. 21, 2011].

Aljoscha Smolic; et al., "Development of a New MPEG Standard for Advanced 3D Video Applications", IEEE International Symposium on Image and Signal Processing and Analysis, Sep. 16, 2009, pp. 400-407, XP031552049, ISBN: 978-953-184-135-1.

Almeroth, at al., "The use of multicast delivery to provide a scalable and interactive video-on-demand service", IEEE Journal on Selected Areas in Communication, 14(6): 1110- 1122. (1996).

Alon, et al.: "Linear Time Erasure Codes with Nearly Optimal Recovery," Proceedings of the Annual Symposium on Foundations of Computer Science, US, Los Alamitos, IEEE Comp. Soc. Press, vol. Symp. 36, pp. 512-516 (Oct. 23, 1995) XP000557871.

Amin Shokrollahi: "LDPC Codes: An Introduction" Internet Citation 2 Apr. 1, 2003, XP002360065 Retrieved from the Internet: URL: http://www.ipm.ac.ir/homepage/Amin 2. pdf [retrieved on Dec. 19, 2005].

Amon P et al., "File Format for Scalable Video Coding", IEEE Transactions on Circuits and Systems for Video Technology, IEEE Service Center, Piscataway, NJ, US, vol. 17, No. 9, Sep. 1, 2007, pp. 1174-1185, XP011193013, ISSN: 1051-8215, DOI:10.1109/TCSVT.2007.905521.

Anonymous: [Gruneberg, K., Narasimhan, S. and Chen, Y., editors] "Text of ISO/IEC 13818-1:2007/PDAM 6 MVC operation point descriptor", 90 MPEG Meeting; Oct. 26-30, 2009; XIAN; (Motion Picture Expertgroup or ISO/IEC JTC1/SC29/WG111), No. N10942, Nov. 19, 2009, XP030017441.

Anonymous: "Text of ISO/IEC 14496-12 3rd Edition", 83 MPEG Meeting; Jan. 14-18, 2008; Antalya; (Motion Pictureexpert Group or ISO/IEC JTC1/SC29/WG11), No. N9678, Apr. 22, 2008, XP030016172.

Anonymous: "Text of ISO/IEC 14496-15 2nd edition", 91 MPEG Meeting; Jan. 18-22, 2010; Kyoto; (Motion Picture ExpertGroup or ISO/IEC JTC1/SC29/WG11), No. N11139, Jan. 22, 2010, XP030017636.

Anthony Vetro, et al., "Joint Draft 8.0 on Multiview Video Coding", Joint Video Team (JVT) of ISO/IEC MPEG & ITU-T VCEG (ISO/IEC JTC 1/SC29/WG11 and ITU-T SG16 Q.6) 28th Meeting: Hannover, DE, 20-25, Document: JVT-AB204, Jul. 2008, pp. 1-63.

Apple Inc., "On the time-stamps in the segment-inbox for httpstreaming (26.244, R9)", TSG-SA4#58 meeting, Vancouver, Canada, Apr. 2010, p. 5.

Bar-Noy, et al., "Competitive on-line stream merging algorithms for media-on-demand", Draft (Jul. 2000), pp. 1-34.

Bar-Noy et al. "Efficient algorithms for optimal stream merging for media-on-demand," Draft (Aug. 2000), pp. 1-43.

Bigloo, A. et al.: "A Robust Rate-Adaptive Hybrid ARQ Scheme and Frequency Hopping for Multiple-Access Communication Systems," IEEE Journal on Selected Areas in Communications, US, IEEE Inc, New York (Jun. 1, 1994) pp. 917-924, XP000464977.

(56) References Cited

OTHER PUBLICATIONS

Bitner, Jr., et al.: "Efficient Generation of the Binary Reflected Gray code and Its Applications," Communications of the ACM, pp. 517-521, vol. 19 (9), 1976.
Blorner, et al., "An XOR-Based Erasure-Resilient Coding Scheme," ICSI Technical Report No. TR-95-048 (1995) [avail. At. ftp://ftp.icsi.berkeley.edu/pub/techreports/1995/tr-95-048.pdf].
Byers et al., "Accessing Multiple Mirror Sites in Parallel: Using Tornado Codes to Speed Up Downloads," International Computer Science Institute Technical Report TR-98-021 (1998); pp. 275-283.
Byers, J.W. et al.: "A Digital Fountain Approach to Reliable Distribution of Bulk Data," Computer Communication Review, Association for Computing Machinery. New York, US, vol. 28, No. 4 (Oct. 1998) pp. 56-67 XP000914424 ISSN:0146-4833.
Charles Lee L.H, "Error-Control Block Codes for Communications Engineers", 2000, Artech House, XP002642221 pp. 39-45.
Chen, et al,, U.S. Appl. No. titled "Frame Packing for Asymmetric Stereo Video".
Chen, et al., U.S. Patent Application titled "One-Stream Coding for Asymmetric Stereo Video".
Chen Ying et al., "Coding techniques in Multiview Video Coding and Joint Multiview Video Model", Picture Coding Symposium, 2009, PCS 2009, IEEE, Piscataway, NJ, USA, May 6, 2009, pp. 1-4, XP031491747, ISBN: 978-1-4244-4593-6.
Clark G.C., et al., "Error Correction Coding for Digital Communications, System Applications," Error Correction Coding for Digital Communications, New York, Plenum Press, US, Jan. 1, 1981, pp. 339-341.
D. Gozalvez et,al. "AL-FEC for Improved Mobile Reception of MPEG-2 DVB-Transport Streams" Hindawi Publishing Corporation, International Journal of Digital Multimedia Broadcasting vol. 2009, Dec. 31, 2009 , pp. 1-10, XP002582035 Retrieved from the Internet: URL:http://www.hindawi.com/journals/ijdrnb/2009/614178.html> [retrieved on May 12, 2010].
Dan, A. et al.: "Scheduling Policies for an On-Demand Video Server with Batching," Proc. ACM Multimedia, pp. 391-398 (Oct. 1998).
Davey, M.C. et al., "ISO/IEC 14496-15/FDIS, International Organization for Standardization Organization Internationale De Normalization ISO/IEC JTC1/SC29/WG11 Coding of Moving Pictures and Audio", ISO/IEC 2003, Aug. 11, 2003, pp. 1-34.
David Singer, et al., "ISO/IEC 14496-15/FDIS, International Organization for Standardization Organization Internationale de Normalization ISO/IEC JTC1/SC29/WG11 Coding of Moving Pictures and Audio", ISO/IEC 2003, Aug. 11, 2003, pp. 1-34.
Digital Fountain: "Raptor code specification for MBMS file download," 3GPP SA4 PSM AD-HOC #31 (May 21, 2004) XP002355055 pp. 1-6.
Digital Fountain: "Specification Text for Raptor Forward Error Correction," TDOC S4-050249 of 3GPP TSG SA WG 4 Meeting #34 [Online](Feb. 25, 2005) pp. 1-23, XP002425167, Retrieved from the Internet: URL:http://www.3gpp.org/ftp/tsg_sa/WG4_CODEC/TSGS4_34/Docs.
"Digital Video Broadcasting (DVB); Guidelines for the implementation of DVB-IP Phase 1 specifications; ETSI TS 102 542" ETSI Standards, LIS, Sophia Antipoliscedex, France, vol. BC, No. V1.2.1, Apr. 1, 2008, XP014041619 ISSN: 0000-0001 p. 43 p. 66 pp. 70, 71.
Eager, et al. "Minimizing bandwidth requirements for on-demand data delivery," Proceedings of the International Workshop on Advances in Multimedia Information Systems, pp. 80-87 (Indian Wells, CA Oct. 1999).
Eager, et al., "Optimal and efficient merging schedules for video-on-demand servers", Proc. ACM Multimedia, vol. 7, pp. 199-203 (1999).
Esaki, et al.: "Reliable IP Multicast Communication Over ATM Networks Using Forward Error Correction Policy," IEICE Transactions on Communications, JP, Institute of Electronics Information and Comm. ENG. Tokyo, vol. E78-V, No. 12, (Dec. 1995), pp. 1622-1637, XP000556183.
Feng, G., Error Correcting Codes over $Z_{2m}$ for Algorithm-Based Fault-Tolerance, IEEE Transactions on Computers, vol. 43, No. 3, Mar. 1994, pp. 370-374.

Fernando, et al., "httpstrearning of MPEG Media-Response to CfP", 93 MPEG Meeting; Jul. 26-30, 2010; Geneva; (Motion Picture Expert Group or ISO/IEC JTC1/SC3E29/WG11), No. M17756, Jul. 22, 2010, XP030046346.
Fielding, et al., "Hypertext Transfer Protocol-HTTP/1.1," Network Working Group, RFC 2616, Jun. 1999, 165 pp.
Frojdh, et al., "File format sub-track selection and switching," ISO/IEC JTC1/SC29/WG11 MPEG2009 M16665, London UK., Jul. 2009, 14 pp.
Gao, L. et al.: "Efficient Schemes for Broadcasting Popular Videos," Proc. Inter. Workshop on Network and Operating System Support for Digital Audio and Video, pp. 1-13 (1998).
Gemmell, et al., "A Scalable Multicast Architecture for One-To-Many Telepresentations", Multimedia Computing and Systems, 1998/ Proceedings. IEEE International Conference on Austin, TX, USA Jun. 28-Jul. 1, 1998, Los Alamitos, CA USA, IEEE Comput, Soc, US, Jun. 28, 1998, pp. 128-139, XP010291559.
Goyal: "Multiple Description Coding: Compression Meets the Network," In Signal Processing Magazine, IEEE, vol. 18., Issue 5 (Sep. 2001) pp. 74-93 URL:http://www.rle.mit.edu/stir/documents/Goyal_SigProcMag2001_MD.pdf [Nov. 4, 2007].
Gozalvez D et, al: "Mobile reception of DVB-T services by means of AL-FEC protection" Proc. IEEE Intern. Symposium on Broadband Multimedia Systems and Broadcasting (BMSB '09), IEEE Piscataway, NJ, USA, May 13, 2009, pp. 1-5, XP031480155 ISBN: 978-1-4244-2590-7.
Grineberg, et al., "Deliverable D3.2 MVC/SVC storage format" Jan. 29, 2009, XP002599508 Retrieved from the Internet: URL:http://www.ist-sea.eu/Public/SEA_D3.2_HHI FF_20090129.pdf [retrieved on Sep. 1, 2010] paragraph [02.3].
Hagenauer, J.: "Soft is better than hard" Communications, Coding and Cryptology, Kluwer Publication May 1994, XP002606615 Retrieved from the Internet: URL: http://www.Int.ei.turn.de/veroeffentlichungen/1994/ccc94h.pdf [retrieved on Oct. 25, 2010].
He Wenge et al., "Asymmetric Stereoscopic Video Encoding Algorithm Based on Joint Compensation Prediction", IEEE International Conference on Communications and Mobile Computing, Jan. 6, 2009, pp. 191-194, XP031434775, ISBN: 978-0/7695-3501-2.
Hershey, et al,, "Random Parity Coding (RPC)", 1996 IEEE International Conference on Communications (ICC). Converging Technologies for Tomorrow's Applications. Dallas, Jun. 23-27, 1996, IEEE International Conference on Communications (ICC, New York, IEEE, US, vol. 1, Jun. 23, 1996, pp. 122-126, XP000625654.
Hitachi Ltd, et al., "High-Definition Multimedia Interface," Specification Version 1.4, Jun. 5, 2009; 425 pp.
Hua, et al., "Skyscraper broadcasting: A new broadcsting system for metropolitan video-on-demand systems", Proc. ACM SIGCOMM, pp. 89-100 (Cannes, France, 1997).
Ian Trow, "Is 3D Event Coverage Using Existing Broadcast Infrastructure Technically Possible?", International Broadcasting Conference, Sep. 9-13, 2009, XP030081671, pp. 4-5, "3D transmission over broadcast infrastructure" pp. 7-8, "Screen signaling" —Conclusions on 3D systems.
IETF RFC 2733: Rosenberg, J. et al. An RTP Payload Format for Generic Forward Error Correction, Network Working Group, RFC 2733 (Dec. 1999).
Information Technology-Generic Coding of Moving Pictures and Audio: Systems, Amendment 4: Transport of Multiview Video over ITU-T Rec H.222.0 | ISO/IEC 13818-1 "Text of ISO/IEC 13818-1:2007/FPDAM 4—Transport of Multiview Video over ITU-T Rec H.222.0 | ISO/IEC 13818-1," Lausanne, Switzerland, 2009, 21 pp.
International Standard ISO/IEC 14496-12, Information Technology—Coding of audio-visual objects—Part 12: ISO base media file format, Third Edition, Oct. 15, 2008, 120 pp.
International Telecommunication Union, "ITU-T H.264, Series H: Audiovisual and Multimedia Systems, Infrastructure of audiovisual services—Coding of moving video, Advanced video coding for generic audiovisual services," Mar. 2010, 669 pp.
ISO/IEC 13818-1, "Information technology-Generic coding of moving pictures and associated audio information: Systems," Second edition, Dec. 1, 2000, 174 pp.

(56) References Cited

OTHER PUBLICATIONS

ISO/IEC JTC 1/SC 29, ISO/IEC FCD 23001-6, Information technology—MPEG systems technologies—Part 6: Dynamic adaptive streaming over HTTP (DASH), Jan. 28, 2011.
"Joint Draft 8.0 on Multiview Video Coding", 28th JVT meeting, Hannover, Germany, Document: JVT-AB204 (rev.1), Jul. 2008. available from http://wftp3.itu.int/av-arch/jvt-site/2008_07_Hannover/JVT-AB204.
Juhn, L. et al.: "Adaptive Fast Data Broadcasting Scheme for Video-on-Demand Service," IEEE Transactions on Broadcasting, vol. 44, No. 2, pp. 182-185 (Jun. 1998).
Juhn, L. et al.: "Harmonic Broadcasting for Video-on-Demand Service," IEEE Transactions on Broadcasting, vol. 43, No. 3, pp. 268-271 (Sep. 1997).
Kallel, "Complementary Punctured Convolutional (CPC) Codes and Their Applications", IEEE Transactions on Communications, IEEE Inc., New York, US, Vol. 43, No. 6, Jun. 1, 1995, pp. 2005-2009.
Kimata H et al., "Inter-View Prediction With Downsampled Reference Pictures", ITU Study Group 16—Video Coding Experts Group—ISO/IEC, MPEG & ITU-T VCEG(ISO/IEC JTC1/SC29/WG11 and ITU-T SG16 Q6), No. JVT-W079, Apr. 19, 2007, XP030007039.
Kozamernik F: "Media streaming over the Internet", Internet Citation, Oct. 2002, XP002266291, Retrieved from the Internet: URL: http://www.ebu.ch/trev_292-kozarnerni k.pdf [retrieved on Jan. 8, 2004] "section Video codecs for scalable streaming".
Lin, S. et al.: "Error Control Coding-Fundamentals and Applications," 1983, Englewood Cliffs, pp. 288, XP002305226.
Luby Digital Fountain A Shokrollahi Epfl M Watson Digital Fountain T Stockhammer Nomor Research M: "Raptor Forward Error Correction Scheme for Object Delivery; rfc5053.txt", IETF Standard, Internet Engineering Task Force, IETF, CH, Oct. 1, 2007, XP015055125, ISSN: 0000-0003.
Luby, et al., "Analysis of Low Density Codes and Improved Designs Using Irregular Graphs", 1998, Proceedings of the 30th Annual ACM Symposium on Theory of Computing, May 23, 1998, pp. 249-258, XP000970907.
Luby, et al., "Flute-File Delivery over Unidirectional Transport", IETF RFC 3926, pp. 1-29, (Oct. 2004).
Luby et al,, "Improved Low-Density Parity-Check Codes Using Irregular Graphs and Belief Propogation", Information Theory, 1998, Proceedings. 1998 IEEE International Symposium on Cambridge, MA, USA Aug. 16-21, 1998; New York, NY, USA; IEEE; US Aug. 16, 199.
Luby et, al. "Layered Coding Transport (LCT) Building Block", IETF RFC 5651, pp. 1-42, (Oct. 2009).
Luby, et al.: "Analysis of Low Density Codes and Improved Designs Using Irregular Graphs," International Computer Science Institute Technical Report TR-97-045 (Nov. 1997) [available at ftp://ftp.icsi.berkeley.edu/pub/techreports/1997/tr-97-045.pdf].
Luby, M., et, al. "Forward Error Correction (FEC) Building Block", IETF RFC 5052, pp. 1-31, (Aug. 2007).
Luby, M., et al., "Raptor Forward Error Correction Scheme for Object Delivery", IETF RFC5053, pp. 1-46 (Sep. 2007).
Luby. M., et al., "RaptorQ Forward Error Correction Scheme for Object Delivery", IETF draft ietf-rmt-bb-fec-raptorq-04, Reliable Multicast Transport, pp. 1-68, (Aug. 24, 2010).
Luby, M., et al., "Request for Comments: 3453: The Use of Forward Error Correction (FEC) in Reliable Multicast," Internet Article, [Online]Dec. 2002, pp. 1-19.
Luby, M. et al.: "Efficient Erasure Correction Codes," 2001, IEEE Transactions on Information Theory, vol. 47, No. 2, pp. 569-584, XP002305225.
Luby M et al: "IPTV Systems, Standards and Architectures: Part II-Application Layer FEC In IPTV Services"IEEE Communications Magazine, IEEE Service Center, Piscataway, US LNKDDOI: 10.1109/MCOM.2088.4511656, vol. 46, No. 5, May 1, 2008, pp. 94-101, XP011226858 ISSN: 0163-6804.
Luby, M, et al.: "Practical Loss-Resilient Codes: Tornado Codes," 29th Annual ACM Symposium on Theory of Computing, vol. SYMP. 29, May 4, 1997, pp. 1-10, XP002271229.
Luby, Michael G. "Analysis of Random Processes via And-Or Tree Evaluation," Proceedings of the 9th Annual ACM-SIAM Symposium on Discrete Algorithms,TR-97-0, 1998, pp. 364-373, (search date: Jan. 25, 2010) URL: <http://portal.acm.prg.citation.cfm?id=314722>.
Mandelbaum D.M., "An Adaptive-Feedback Coding Scheme Using Incremental Redundancy", IEEE Trans on Information Theory, vol. May 1974, May 1974, pp. 388-389, XP002628271, the whole document.
Marpe, et al., "The H.264/MPEG4 Advanced Video Coding Standard and its Applications," Standards Report, IEEE Communications Magazine, Aug. 2006, pp. 134-143.
Matsuoka H., et al:, "Low-Density Parity-Check Code Extensions Applied for Broadcast-Communication Integrated Content Delivery", Research Laboratories, NTT DOCOMO, Inc., 3-6, Hikari-No-Oka, Yokosuka, Kanagawa, 239-8536, Japan.
Min-Goo Kim: "On systematic punctured convolutional codes", IEEE Trans on Communications, vol. 45, No. 2, Feb. 1997, XP002628272, the whole document, pp. 133-139.
Huller, et al., "A test-bed for the dynamic adaptive streaming over HTTP featuring session mobility" MMSys '11 Proceedings of the second annual ACM conference on Multimedia systems, Feb. 23-25, 2011, San Jose, CA, pp. 271-276.
Naguib, Ayman, et al., "Applications of Space-Time Block Codes and Interference.Suppression for High Capacity and High Data Rate Wireless Systems," IEEE, 1998, pp. 1803-1810.
Narayanan, et al., "Physical Layer Design for Packet Data Over IS-136", Vehicular Technology Conference, 1997, IEEE 47th Phoenix, AZ, USA May 4-7, 1997, New York, NY, USA, IEEE, US May 4, 1997, pp. 1029-1033.
Nokia Corp., "Usage of 'mfra' box for Random Access and Seeking," S4-AHI127, 3GPP TSG-SA4 Ad-Hoc Meeting, Dec. 14-16, 2009, Paris, FR, 2 pp.
Nonnenmacher, et al., "Parity-Based Loss Recovery for Reliable Multicast Transmission", IEEE/ACM Transactions on Networking, IEEE Inc. New York, US, vol. 6, No. 4, Aug. 1, 1998, pp. 349-361.
Ozden, B. et al.: "A Low-Cost Storage Service for Movie on Demand Databases," Proceedings of the 20th Very Large DataBases (VLDB) Conference, Santiago, Chile (1994).
PA. Chou, A. Mohr, A. Wang, S. Mehrotra, "FEC and Pseudo-ARQ for Receiver-Driven Layered Multicast of Audio and Video," pp. 440-449, IEEE Computer Society, Data Compression Conference (2000).
Pantos R et al., "HTTP Live Streaming; draft-pantos-http-live-streaming-OT.txt ", HTTP Live Streaming; Draft-Pantos-HTTP-Live-Streaming-01;Txt, Internet Engineering Task Force, IETF; Standardworkingdraft, Internet Society (ISOC) 4, Rue des Falaises CH-1205 Geneva, Switzerland, No. 1, Jun. 8, 2009, XP015062692.
Paris, et al., "A low bandwidth broadcasting protocol for video on demand", Proc. International Conference on Computer Communications and Networks, vol. 7, pp. 690-697 (Oct. 1998).
Paris, et al., "Efficient broadcasting protocols for video on demand", International Symposium on Modeling, Analysis and Simulation of Computer and Telecommunication systems (MASCOTS), vol. 6, pp. 127-132 (Jul. 1998).
Perkins, et al.: "Survey of Packet Loss Recovery Techniques for Streaming Audio,", IEEE Network; Sep./Oct. 1998, pp. 40-48.
Petition decision for Petition Under 37 C.F.R. § 1.78 to Accept an Unintentionally Delayed Priority Claim under 35 U.S.C. § 120 in U.S. Pat. No. 7,532,132, dated Jul. 21, 2011, 2 pages.
Petition under 37 C.F.R. § 1.78 to Accept an Unintentionally Delayed Priority Claim under 35 U.S.C. § 120 in U.S. Pat. No. 7,532,132, dated May 27, 2011, 2 pages.
Plank J. S., "A Tutorial on Reed-Solomon Coding for Fault-Tolerance I N Raid-Like Systems", Software Practice & Experience, Wiley & Sons, Bognor Regis, GB, vol. 27, No. 9, Sep. 1, 1997, pp. 995-1012, XP00069594.
Pless and WC Huffman EDS V S: Algebraic geometry codes, Handbook of Coding Theory, 1998, pp. 871-961, XP002300927.

(56) References Cited

OTHER PUBLICATIONS

Pursley, et al.: "Variable-Rate Coding for Meteor-Burst Communications," IEEE Transactions on Communications, US IEEE Inc. New York (1989) vol. 37, No. 11, pp. 1105-1112 XP000074533.
Pursley, M. et al.: "A Correction and an Addendum for Variable-Rate Coding for Meteor-Burst Communications," IEEE Transactions on Communications, vol. 43, No. 12 pp. 2866-2867 (Dec. 1995).
Pyle, et al., "Microsoft httpsmooth Streaming: Microsoft response to the Call for Proposal on httpstreaming", 93 MPEG Meeting; Jul. 26, 2010-Jul. 30, 2010; Geneva; (Motion Picture Expert Group or ISO/IEC JTC1/SCE29/WG11), No. M17902, Jul. 26-30, 2010, XP030046492.
Qualcomm Europe S A R L: "Baseline Architecture and Definitions for HTTP Streaming", 3GPP Draft; S4-090603_HTTP_Streaming_Architecture, 3rd Generation Partnership Project (3GPP), Mobile Competence Centre; 650, Route des Lucioles; F-06921 Sophia-Antipolis Cedex; France, No. Kista; 20090812, Aug. 12, 2009, XP050356889.
Qualcomm Incorporated: "Use Cases and Examples for Adaptive httpstrearning", 3GPP Draft; S4-100408-Usecases-HSD, 3rd Generation Partnership Project (JGPP); Mobile Competence Centre; 650, Route des Lucioles; F-06921 Sophia-Antipolis Cedex; France, vol. SA WG4, No. Prague, Czech Republic; 20100621, Jun. 17, 2010, XP050438085, [retrieved on Jun. 17, 2010].
Rangan, et al., "Designing an On-Demand Multimedia Service," IEEE Communication Magazine, vol. 30, pp. 56-64, (Jul. 1992).
RealNetworks Inc, et al., "Format for httpstreaming Media Presentation Description", 3GPP Draft; S4-100020, 3RD Generation Partnership Project (3GPP), Mobile Competence Centre; 650, Route des Lucioles; F-06921 Sophia-Antipolis Cedex; France, vol. SA WG4, No. S t Julians, Malta; 20100125, Jan. 20, 2010, XP050437753, [retrieved on Jan. 20, 2010].
Research in Motion UK Limited; "An MPD delta file for httpstreaming", 3GPP Draft; S4-100453, 3rd Generation Partnership Project (SGPP), Mobile Competence Centre; 650, Route des Lucioles; F-06921 Sophia-Antipolis Cedex; France, vol. SA WG4, No. Prague, Czech Republic; 20100621, Jun. 16, 2010, XP050438066, [retrieved on Jun. 16, 2010].
Rhyu, et al., "Response to Call for Proposals on httpstrearning of MPEG Media", 93 MPEG Meeting; Jul 26-30, 2010; Geneva; (Motion Picture Expert Group or ISO/IEC JTC1/SCE29/WG11) No. M17779, Jul. 26, 2010, XP030046369.
Rizzo, L. "Effective Erasure Codes for Reliable Computer Communication Protocols," Computer Communication Review, 27 (2) pp. 24-36 (Apr. 1, 1997), XP000696916.
Roca, V., et, al. "Low Density Parity Check (LDPC) Staircase and Triangle Forward Error Correction (FEC) Schemes", IETF RFC 5170 (Jun. 2008), pp. 1-34.
Roca, V. et al.: "Design, Evaluation and Comparison of Four Large Block FEC Codecs, LDPC, LDGM, LDGM Staircase and LDGM Triangle, plus a Reed-Solomon Small Block Fec Codec," INRIA Research Report RR-5225 (2004).
Rost, S. et al.: "The Cyclone Server Architecture: streamlining delivery of popular content," 2002, Computer Communications, vol. 25, No. 4, pp. 403-412.
Roth, R., et al., "A Construction of Non-Reed-Solomon Type MDS Codes", IEEE Transactions of Information Theory, vol. 35, No. 3, May 1989, pp. 655-657.
Roth, R., "On MDS Codes via Cauchy Matrices", IEEE Transactions on Information Theory, vol. 35, No, 6, Nov. 1989, pp. 1314-1319.
Schwarz, Heiko et al., "Overview of the Scalable Video Coding Extension of the H.264/AVC Standard", IEEE Transactions on Circuits and Systems for Video Technology, Vol. 17, No. 9, Sep. 2007, pp. 1103-1120.
Seshan, S. et al.: "Handoffs in Cellular Wireless Networks: The Daedalus Implementation.And Experience," Wireless Personal Communications, NL; Kluwer Academic Publishers, vol. 4, No. 2 (Mar. 1, 1997) pp. 141-162, XP000728589.

Shacham: "Packet Recovery and Error Correction in High-Speed Wide-Area Networks," Proceedings of the Military Communications Conference. (Milcom), US, New York, IEEE, vol. 1, pp. 551-557 (1989) XP000131876.
Shierl T; Gruneberg K; Narasimhan S; Vetro A: "ISO/IEC 13818-1:20071FPDAM 4-Information Technology Generic Coding of Moving Pictures and Audio Systems amendment 4: Transport of Multiview Video over ITU-T Rec H.222.0 ISO/IEC 13818-1" ITU-T Rec.H.222.0(May 2006)FPDAM 4, vol. MPEG2009, No. 10572, May 11, 2009, pp. 1-20, XP002605067 p. 11, last two paragraphs sections 2.6.78 and 2.6.79 table T-1.
Shokrollahi, A.: "Raptor Codes," Internet Citation [Online] (Jan. 13, 2004) XP002367883, Retrieved from the Internet: URL:http://www.cs.huji.ac.il/labs/danss/p2p/resources/raptor.pdf.
Shokrollahi, Amin. "Raptor Codes," IEEE Transactions on Information Theory, Jun. 2006, vol. 52, No. 6, pp. 2551-2567, (search date: Feb. 1, 2010) URL: <http://portal.acm.org/citation.cfm?id=1148681>.
Shokrollahi et al., "Design of Efficient Easure Codes with Differential Evolution", IEEE International Symposium on Information Theory, Jun. 25, 2000, pp. 5-5.
Sincoskie, W. D., "System Architecture for Large Scale Video on Demand Service," Computer Network and ISDN Systems, pp. 155-162, (1991).
Stockhammer, "WD 0.1 of 23001-6 Dynamic Adaptive Streaming over HTTP (DASH)", MPEG-4 Systems, International Organisation for Standardisation, ISO/IEC JTC1/SC29/WG11, Coding of Moving Pictures and Audio, MPEG 2010 Geneva/m11398, Jan. 6, 2011, 16 pp.
Sullivan et al., Document: JVT-AA007, "Editors' Draft Revision to ITU-T Rec. H.264IISO/IEC 14496-10 Advanced Video Coding-In Preparation for ITU-T SG 16 AAP Consent (in integrated form)," Joint Video Team (JVT) of ISO/IEC MPEG & ITU-T VCEG (ISO/IEC JTC1/SC29/WG11 and ITU-T SG16 Q.6), 30th Meeting: Geneva, CH, Jan. 29-Feb. 3, 2009, pp. 1-683, http://wftp3.itu.int/av-arch/jvt-site/2009_01_Geneva/JVT-AD007.zip.
Sun, et al., "Seamless Switching of Scalable Video Bitstreams for Efficient Streaming," IEEE Transactions on Multimedia, vol. 6, No. 2, Apr. 2004, pp. 291-303.
Telefon AB LM Ericsson, et al., "Media Presentation Description in httpstreaming", 3GPP Draft; S4-10080-MPD, 3rd Generation Partnership Project (3GPP), Mobile Competence Centre; 650, Route des Lucioles; F-06921 Sophia-Antipolis Cedex; France, vol. SA WG4, No. St Julians, Malta; 20100125, Jan. 20, 2010, XP050437773, [retrieved on Jan. 20, 2010].
Thomas Wiegand, et al., "Joint Draft ITU-T Rec. H.264 | ISO/IEC 14496-10 / Amd.3 Scalable video coding", Joint Video Team (JVT) of ISO/IEC MPEG & ITU-T VCEG (ISO/IEC JTC1/SC29/WG11 and ITU-T SG16 Q.6) 24th Meeting: Geneva, Switzerland, Jun. 29-Jul. 5, 2007, pp. 1-559.
Tiago Gasiba et, al. "System Design and Advanced Receiver Techniques for MBMS Broadcast Services" PROC. 2006 International Conference on Communications (ICC 2006), Jun. 1, 2006, pp. 5444-5450, XP031025781 ISBN; 978-1-4244-0354-7.
U.S. Appl. No. 12/840,146, by Ying Chen et al., filed Jul. 20, 2010.
U.S. Appl. No. 12/908,537, by Ying Chen et al., filed Oct. 20, 2010.
U.S. Appl. No. 12/908,593, by Ying Chen et al., filed Oct. 20, 2010.
U.S. Appl. No. 13/082,051, by Ying Chen et al., filed Apr. 7, 2011.
U.S. Appl. No. 13/205,559, by Ying Chen et al., filed Aug. 8 2011.
U.S. Appl. No. 13/205,565, by Ying Chen et al., filed Aug. 8, 2011.
U.S. Appl. No. 13/205,574, by Ying Chen et al., filed Aug. 8, 2011.
Universal Mobile Telecommunications System (UMTS); LTE; Transparent end-to-end Packet-switched Streaming Service (PSS); Protocols and codecs (3GPP TS 26.234 version 9.3.0 Release 9), Technical Specification, European Telecommunications Standards Institute (ETSI), 650, Route des Lucioles; F-06921 Sophia-Antipolis; France, vol. 3GPP SA, No. V9.3.0, Jun. 1, 2010, XP014047290, paragraphs [5.5.4.2], [5.5.4.3], [5.5.4.4], [5.4.5], [5.5.4.6]paragraphs [10.2.3], [11.2.7], [12.2.3], [12.4.2]paragraphs [12.6.3], [12.6.3.1], [12.6.4], [12.6.6].
Viswanathan, et al., "Metropolitan area video-on-demand services using pyramid broadcasting", Multimedia Systems, 4(4): 197-208 (1996).

(56) References Cited

OTHER PUBLICATIONS

Viswanathan, et al., "Pyramid Broadcasting for Video-on-Demand Service", Proceedings of the SPIE Multimedia Computing and Networking Conference, vol. 2417, pp. 66-77 (San Jose, CA, Feb. 1995).
Viswanathan,Suhramaniyam R., "Publishing in Wireless and Wireline Environments," Ph. D Thesis, Rutgers, The State University of New Jersey (Nov. 1994), 180 pages.
Wang,"On Random Access", Joint Video Team (JVT) of ISO/IEC MPEG & ITU-T VCEG (ISO/IEC JTC/SC29/WG11 and ITU-T SG16 Q.6), 4th Meeting: Klagenfurt, Austria, Jul. 22-26, 2002, p. 13.
Watson, M., et, al. "Asynchronous Layered Coding (ALC) Protocol Instantiation", IETF RFC 5775, pp. 1-23, (Apr. 2010).
Wenger, et al., RFC 3984, "RTP Payload Format for H.264 Video," Feb. 2005, 84 pp.
Wong, J.W., "Broadcast delivery", Proceedings of the IEEE, 76(12): 1566-1577, (1988).
Yamauchi, Nagamasa. "Application of Lost Packet Recovery by Front Error Correction to Internet Multimedia Transfer" Proceedings of Workshop for Multimedia Communication and Distributed Processing, Japan, Information Processing Society of Japan (IPS), Dec. 6, 2000, vol. 2000, No. 15, pp. 145-150.
Yin et al., "Modified Belief-Propogation algorithm for Decoding of Irregular Low-Density Parity-Check Codes", Electronics Letters, IEE Stevenage, GB, vol. 38, No. 24, Nov. 21, 2002, pp. 1551-1553.
Ying Chen et al: "Response to the CfP on HTTP Streaming: Adaptive Video Streaming based on AVC", 93 MPEG Meeting; Jul. 26-30, 2010; Geneva; (Motion Picture Expert Group or ISO/IEC JTC1/SC29/WG11), No. M17909, Jul. 26, 2010, XP030046499.
Zorzi, et al.: "On the Statistics of Block Errors in Bursty Channels," IEEE Transactions on Communications, vol. 45, No. 6, Jun. 1997, pp. 660-667.
Bross, et al., "High efficiency video coding (HEVC) text specification draft 6," Joint Collaborative Team on Video Coding (JCT-VC) of ITU-T SG16 WP3 and ISO/IEC JTC1/SC29/WG11 JCTVC-H1003, 7th Meeting: Geneva, CH, Nov. 21-30, 2011, pp. 259.
Bross, et al., "High efficiency video coding (HEVC) text specification draft 7," Joint Collaborative Team on Video Coding (JCT-VC) of ITU-T SG16 WP3 and ISO/IEC JTC1/SC29/WG11 9th Meeting: Geneva, CH, Apr. 27-May 7, 2012, JCTVC-I1003_d21, pp. 290.
Bross, et al., "High efficiency video coding (HEVC) text specification draft 8," Joint Collaborative Team on Video Coding (JCT-VC) of ITU-T SG16 WP3 and ISO/IEC JTC1/SC29/WG11 10th Meeting: Stockholm, SE, Jul. 11-20, 2012, JCTVC-J1003_d7, pp. 261.
Bross et al., "WD4: Working Draft 4 of High-Efficiency Video Coding," JCTVC-F803_d2, (JCT-VC) of ITU-T SG16 WP3 and ISO/IEC JTC1/SC29/WG11 Joint Collaborative Team on Video Coding, 6th Meeting, Torino, IT, Jul. 14-22, 2011, 226 pages.
Bross et al., "WD5: Working Draft 5 of High-Efficiency Video Coding," JCTVC-G1103_d2, (JCT-VC) of ITU-T SG16 WP3 and ISO/IEC JTC1/SC29/WG11 Joint Collaborative Team on Video Coding, 7th Meeting, Geneva, Switzerland (Nov. 2011), 214 pages.
Cataldi et al., "Sliding-Window Raptor Codes for Efficient Scalable Wireless Video Broadcasting With Unequal Loss Protection", IEEE Transactions on Image Processing, Jun. 1, 2010, pp. 1491-1503, vol. 19, No. 6, IEEE Service Center, XP011328559, ISSN: 1057-7149, DOI: 10.1109/TIP.2010.2042985.
Choi S: "Temporally enhanced erasure codes for reliable communication protocols" Computer Networks, Elsevier Science Publishers B.V., Amsterdam, NL, vol . 38, No. 6, Apr. 22, 2002, pp. 713-730, XP004345778, ISSN: 1389-1286, DOI:10.1016/S1389-1286(01)00280-8.
European Search Report—EP10013235—Search Authority—The Hague—Aug. 20, 2012.
Gracie et al., " Turbo and Turbo-Like Codes: Principles and Applications in Telecommunications", Proceedings of the IEEE, Jun. 1, 2007, pp. 1228-1254, vol. 95, No. 6, IEEE, XP011189323, ISSN: 0018-9219, DOI: 10.1109/JPROC.2007.895197.
Huawei et al., "Implict mapping between CCE and PUCCH for ACK/NACK TDD", 3GPP Draft; R1-082359, 3rd Generation Partnership Project (3GPP), Mobile Competence Centre; 650, Route Des Lucioles ; F-06921 Sophia-Antipolis Cedex; France, vol. RAN WG1, No. Warsaw, Poland, Jun. 24, 2008, XP050110650, [retrieved on Jun. 24, 2008].
ITU-T H.264, Series H: Audiovisual and Multimedia Systems, Infrastructure of audiovisual services—Coding of moving video, Advanced video coding for generic audiovisual services, The International Telecommunication Union. Jun. 2011, 674 pp.
Jiang., File Format for Scalable Video Coding, PowerPoint Presentation for CMPT 820, Summer 2008.
Jin Li, "The Efficient Implementation of Reed-Solomon High Rate Erasure Resilient Codes" Proc. 2005 IEEE International Conference on Acoustics, Speech, and Signal Processing, Philadelphia, PA, USA, IEEE, Piscataway, NJ, vol . 3, Mar. 18, 2005, pp. 1097-1100, XP010792442, DOI: 10.1109/ICASSP.2005.1415905 ISBN: 978-0-7803-8874-1.
Kimura et al., "A Highly Mobile SDM-OFDM System Using Reduced-Complexity-and-Latency Processing", IEEE International Symposium on Personal, Indoor and Mobile Radio Communications (PIMRC), Sep. 1, 2007, pp. 1-5, IEEE, XP031168836, ISBN: 978-1-4244-1143-6, DOI: 10.1109/PIMRC.2007.4394758.
Lee L., et al.,"VLSI implementation for low density parity check decoder", Proceedings of the 8th IEEE International Conference on Elecctronics, Circuits and Systems, 2001. ICECS 2001, Sep. 2, 2001, vol. 3, pp. 1223-1226.
Luby Qualcomm Incorporated, "Universal Object Delivery using RaptorQ; draft-luby-uod-raptorq-OO.txt", Internet Engineering Task Force (IETF), Standardworkingdraft, Internet Society (ISOC), Mar. 7, 2011, pp. 1-10, XP015074424, [retrieved on Mar. 7, 2011] .
MacKay, "Fountain codes Capacity approaching codes design and implementation", IEE Proceedings: Communications, Dec. 9, 2005, pp. 1062-1068, vol. 152, No. 6, Institution of Electrical Engineers, XP006025749, ISSN: 1350-2425, DOI: 10.1049/IP-C0M:20050237.
Nokia: "Reed-Solomon Code Specification for. MBMS Download and Streaming Services", 3GPP Draft; 54-050265_RS_SPEC, 3rd Generation Partnership Project (3GPP), Mobile Competence Centre; 650, Route des Lucioles; F-06921 Sophia-Antipolis Cedex; France, vol. SA WG4, No. San Diego, USA; 20050415, Apr. 15, 2005, XP050287675, [retrieved on Apr. 15, 2005].
Pantos, "HTTP Live Streaming draft-pantos-http-live-streaming-02", Informational, Internet-Draft, Intended status: Informational, Expires: Apr. 8, 2010, http://tools.ietf.org/html/draft-pantos-http-live-streaming-02, pp. 1-20, Oct. 5, 2009.
Thomas Wiegand et al.,"WD1: Working Draft 1 of High-Efficiency Video Coding", JCTVC-C403, Joint Collaborative Team on Video Coding (JCT-VC), of ITU-T SG16 WP3 and ISO/IEC JTC1/SC29/WG11, 3rd Meeting: Guangzhou, CN, Oct. 7-15, 2010.
Todd, "Error Correction Coding: Mathematical Methods and Algorithms", Mathematical Methods and Algorithms, Jan. 1, 2005, pp. 451-534, Wiley, XP002618913.
Tsunoda T., et al., "Reliable Streaming Contents Delivery by Using Multiple Paths," Technical Report of The Institute of Electronics, Information and Communication Engineers, Japan, Mar. 2004, vol. 103, No. 692, pp. 187-190, NS2003-331, IN2003-286.
Wiegand et al., "WD3: Working Draft 3 of High-Efficiency Video Coding," Document JCTVC-E603, 5th Meeting: Geneva, CH, Mar. 16-23, 2011,193 pp.
Wiegand T. et al., "WD2: Working Draft 2 of High-Efficiency Video Coding", 20110128, No. JCTVC-D503, Jan. 28, 2011, XP002679642, Retrieved from the Internet: URL: http://wftp3.itu.int/av-archictvc-site/2011_01_D_Daegu/ [retrieved on Jul 11, 2012].
Yamanouchi N., et al., "Internet Multimedia Transmission with Packet by Using Forward Error Correction," Proceedings of DPS Workshop, The Information Processing Society of Japan, Dec. 6, 2000, vol. 2000, No. 15, pp. 145-150.
Anonymous: "Technologies under Consideration", 100. MPEG Meeting;Apr. 30-May 4, 2012; Geneva; (Motion Picture Expert Group or ISO/IEC JTC1 /SC29/WG11) No. N12682, Jun. 7, 2012, XP030019156.
Gil A., et al., "Personalized Multimedia Touristic Services for Hybrid Broadcast/Broadband Mobile Receivers," IEEE Transactions on Consumer Electronics, 2010, vol. 56 (1), pp. 211-219.

(56) References Cited

OTHER PUBLICATIONS

Hannuksela M.M., et al., "DASH: Indication of Subsegments Starting with SAP, 97. MPEG Meeting; Jul. 18-22, 2011; Torino; (Motion Picture Expert Group or ISO/IEC JTC1/SC29/WG11)" No. m21096, Jul. 21, 2011, XP030049659.

Hannuksela M.M., et al., "ISOBMFf: SAP definitions and 'sidx' box", 97. MPEG Meeting; Jul. 18-22, 2011; Torino; (Motion Picture Expert Group or ISO/IEC JTC1/SC29/WG11) No. m21435, Jul. 22, 2011, XP030049998.

Li, M., et al., "Playout Buffer and Rate Optimization for Streaming over IEEE 802.11 Wireless Networks", Aug. 2009, Worcester Polytechnic Institute, USA.

Michael G et al., "Improved low-density parity-check codes using irregular graphs", Information Theory, IEEE Transactions on,Feb. 2001,vol. 47, No. 2, pp. 585-598.

Ohashi A et al., "Low-Density Parity-Check (LDPC) Decoding of Quantized Data," Technical Report of the Institute of Electronics, Information and Communication Engineers, Aug. 23, 2002, vol. 102, No. 282, pp. 47-52, RCS2002-154.

Roumy A., et al., "Unequal Erasure Protection and Object Bundle Protection with the Generalized Object Encoding Approach", Inria-00612583, Version 1, Jul. 29, 2011, 25 pages.

Schulzrinne, et al., "Real Time Streaming Protocol (RTSP)" Network Working Group, Request for Comments: 2326, Apr. 1998, pp. 1-92.

Stockhammer T., et al., "DASH: Improvements on Representation Access Points and related flags", 97. MPEG Meeting; Jul. 18-22, 2011; Torino; (Motion Picture Expert Group or ISO/IEC JTC1/SC29/WG11) No. m20339, Jul. 24, 2011, XP030048903.

Wadayama T, "Introduction to Low Density Parity Check Codes and Sum-Product Algorithm," Technical Report of The Institute of Electronics, Information and Communication Engineers, Dec. 6, 2001, vol. 101, No. 498, pp. 39-46, MR2001-83.

Yamazaki M., et al., "Multilevel Block Modulation Codes Construction of Generalized DFT," Technical Report of the Institute of Electronics, Information and Communication Engineers, Jan. 24, 1997, vol. 96, No. 494, pp. 19-24, IT96-50.

3GPP: "3rd Generation Partnership Project; Technical Specification Group Services and system Aspects; Multimedia Broadcast/Multicast Service (MBMS); Protocols and codecs (Release 6)", Sophia Antipolis, France, Jun. 1, 2005, XP002695256, Retrieved from the Internet: URL:http://www.etsi.org/deliver/etsits/126300_126399/126346/06.01.00_60/ts_126346v060100p.pdf.

3rd Generation Partnership Project; Technical Specification Group Services and System Aspects; Transparent end-to-end Packet-switched Streaming Service (PSS); Progressive Download and Dynamic Adaptive Streaming over HTTP (3GP-Dash) (Release 10), 3GPP Standard; 3GPP TS 26.247, 3rd Generation Partnership Project (3GPP), Mobile Competence Centre; 650, Route des Lucioles; F-06921 Sophia-Antipolis Cedex; France, vol. SA WG4, No. V10.0.0, Jun. 17, 2011, pp. 1-94, XP050553206, [retrieved on Jun. 17, 2011].

Anonymous: "Technologies under Consideration", 98. MPEG Meeting; Nov. 28, 2011-Feb. 12, 2011; Geneva; (Motion Picture Expert Group or ISO/IEC JTC1/SC29/WG11) No. N12330, Dec. 3, 2011, XP030018825.

Anonymous: "Text of ISO/IEC IS 23009-1 Media Presentation Description and Segment Formats", 98. MPEG Meeting; Nov. 28, 2011-Feb. 12, 2012; Geneva; (Motion Picture Expert Group or ISO/IEC JTC1/SC29/WG11) No. N12329, Jan. 6, 2012, XP030018824.

Atis: "PTV Content on Demand Service", IIF-WT-063R44, Nov. 11, 2010, pp. 1-124, XP055045168, Retrieved from the Internet: URL:ftp://vqeg.its.bldrdoc.gov/DocumentsNQEG_Atlanta_Nov.10/MeetingFiles/Liaison/IIFWT-063R44_Content_on_Demand.pdf [retrieved on Nov. 22, 2012].

Bouazizi I., et al., "Proposals for ALC/Flute server file format (14496-12Amd.2)", 77. MPEG Meeting; Jul. 17-21, 2006; Klagenfurt; (Motion Pictureexpert Group or ISO/IEC JTC1/SC29/WG11), No. M13675, Jul. 12, 2006, XP030042344, ISSN: 0000-0236.

"Digital Video Broadcasting (DVB); Framing structure, channel coding and modulation for digital terrestrial television; ETSI EN 300 744" ETSI Standards, LIS, Sophia Antipolis Cedex, France, V1.6.1, pp. 9, Jan. 10, 2009.

Frojdh P., et al., "Study on 14496-12:2005/PDAM2 ALU/ FLUTE Server File Format", 78.MPEG Meeting; Oct. 23-27, 2006; Hangzhou: (Motion Picturexpert Group or ISO/IEC JTC1/SC29/WG11) No. M13855, Oct. 13, 2006, XP030042523, ISSN: 0000-0233.

Kim J., et al., "Enhanced Adaptive Modulation and Coding Schemes Based on Multiple Channel Reportings for Wireless Multicast Systems", 62nd IEEE Vehicular Technology Conference, VTC-2005-Fall, Sep. 25-28, 2005, vol. 2, pp. 725-729, XP010878578, DOI: 10.11 09/VETECF.2005.1558019, ISBN: 978-0-7803-9152-9.

Luby et al., RaptorQ Forward Error Correction Scheme for Object Delivery draft-ietf-rmt-bb-fec-raptorq-00, Qualcomm, Inc. Jan. 28, 2010.

Moriyama, S., "5. Present Situation of Terrestrial Digital Broadcasting in Europe and USA", Journal of the Institute of Image Information and Television Engineers, Nov. 20, 1999, Vol. 53, No. 11, pp. 1476-1478.

Motorola et al: "An Analysis of DCD Channel Mapping to BCAST File Delivery Sessions; OMA-CD-DCD-2007-0112-INP_DCD_Channel_Mapping_to_BCAST_File_Delivery", OMA-CD-DCD-2007-0112-INP_DCD_Channel_Mapping_BCAST_File_Delivery, Open Mobile Alliance (OMA), 4330 La Jolla Village Dr., Suite 110 San Diego, CA 92122; USA Oct. 2, 2007, pp. 1-13, XP064036903.

Bross, et al., "High efficiency video coding (HEVC) text specification draft 6," JCTVC-H1003, Joint Collaborative Team on Video Coding (JCT-VC) of ITU-T SG16 WP3 and ISO/IEC JTC1/SC29/WG11, 8th Meeting: San Jose, CA, USA, Feb. 1-10, 2012, 259 pp.

Makoto N., et al., "On Tuning of Blocking LU decomposition for VP2000 series" The 42th Information Processing Society of Japan Conference (1st term in 1991), Feb. 25, 1991, pp. 71-72, 4B-8.

Miller G., et al., "Bounds on the maximum likelihood decoding error probability of low density parity check codes", Information Theory, 2000. Proceedings. IEEE International Symposium on, 2000, p. 290.

Muramatsu J., et al., "Low density parity check matrices for coding of multiple access networks", Information Theory Workshop, 2003. Proceedings. 2003 IEEE , Apr. 4, 2003, pp. 304-307.

Qualcomm Incorporated: "RaptorQ Technical Overview", pp. 1-12, Oct. 1, 2010.

Samukawa, H. "Blocked Algorithm for LU Decomposition" Journal of the Information Processing Society of Japan, Mar. 15, 1993, vol. 34, No. 3, pp. 398-408.

3GPP TSG-SA4 #57 S4-100015, IMS based PSS and MBMS User Service extensions, Jan. 19, 2010, URL: http://www.3gpp.org/ftp/tsg_sa/WG4_CODEC/TSGS4_57/docs/S4-100015.zip.

3rd Generation Partnership Project; Technical Specification Group Services and System Aspects; Transparent end-to-end Packet-switched Streaming Service (PSS);Protocols and codecs(Release 9) 3GPP TS 26.234 V9.3.0, Jun. 23, 2010 pp. 85-102, URL, http://www.3gpp.org/ftp/TSG_SA/WG4_CODEC/TSGS4_59/Docs/S4-100511.zip, 26234-930.zip.

Lee, J.Y., "Description of Evaluation Experiments on ISO/IEC 23001-6, Dynamic Adaptive Streaming over HTTP", ISO/IEC JTC1/SC29/WG11MPEG2010/N11450, Jul. 31, 2010, 16 pp.

Luby M., "Simple Forward Error Correction (FEC) Schemes," draft-luby-rmt-bb-fec-supp-simple-00.txt, pp. 1-14, Jun. 2004.

Luby M., "LT Codes", Foundations of Computer Science, 2002, Proceedings, The 43rd Annual IEEE Symposium on, 2002.

Morioka S., "A Verification Methodology for Error Correction Circuits over Galois Fields", Tokyo Research Laboratory, IBM Japan Ltd, pp. 275-280, Apr. 22-23, 2002.

Qualcomm Incorporated: "Adaptive HTTP Streaming: Complete Proposal", 3GPP TSG-SA4 AHI Meeting S4-AHI170, Mar. 2, 2010, URL, http://www.3gpp.org/FTP/tsg_sa/WG4_CODEC/Ad-hoc_MBS/Docs_AHI/S4-AH170_CR_AdaptiveHTTPStreaming-Full.doc.

Qualcomm Incorporated: "Corrections to 3GPP Adaptive HTTP Streaming", 3GPP TSG-SA4 #59 Change Request 26.234 CR0172 S4-100403, Jun. 16, 2010, URL, http://www.3gpp.org/FTP/tSG_sa/

(56) References Cited

OTHER PUBLICATIONS

WG4 Codec/TSGS4_59/Docs/S4-100403.zip, S4-100403_CR_26234-0172-AdaptiveHTTPStreaming-Rel-9.doc.

Chikara S., et al., "Add-on Download Scheme for Multicast Content Distribution Using LT Codes", IEICE. B, Communications, Aug. 1, 2006, J89-B (8), pp. 1379-1389.

Hasan M a., et al., "Architecture for a Low Complexity Rate-Adaptive Reed-Solomon Encoder", IEEE Transactions on Computers, IEEE Service Center, Los Alamitos, CA, US, vol. 44, No. 7, Jul. 1, 1995, pp. 938-942, XP000525729, ISSN: 0018-9340, DOI: 10.1109/12.392853.

Tetsuo M., et al., "Comparison of Loss Resilient Ability between Multi-Stage and Reed-Solomon Coding", Technical report of IEICE. CQ, Communications Quality, vol. 103 (178), Jul. 4, 2003, pp. 19-24.

Gerard F., et al., "HTTP Streaming MPEG media—Response to CFP", 93. MPEG Meeting, Geneva Jul. 26-30, 2010.

Supplementary European Search Report—EP08831086—Search Authority—Munich—Oct. 6, 2014.

Watson M., et al., "Forward Error Correction (FEC) Framework draft-ietf-fecframe-framework-11," 2011, pp. 1-38, URL,http://tools.ietf.org/pdf/draft-ietf-fecframe-framework-11.pdf.

Watson M., et al., "Raptor FEC Schemes for FEC FRAME draft-ietf-fecframe-raptor-04," 2010, pp. 1-21, URL,http://tools.ietf.org/pdf/draft-ietf-fecframe-raptor-04.pdf.

Qualcomm Incorporated: "RatorQ Forward Error Correction Scheme for Object Delivery draft-ietf-rmt-bb-fec-raptorq-04", Internet Engineering Task Force, IETF, pp. 1-68, Aug. 24, 2010.

Ramsey B, "HTTP Status: 206 Partial Content and Range Requests," May 5, 2008 obtained at http://benramsey.com/blog/2008/05/206-partial-content-and-range-requests/.

\* cited by examiner

Revised SSM format

| O | G | H | F | Check | B | L | V | M | B1 | M1 |
|---|---|---|---|-------|---|---|---|---|----|----|
| 1 | 1 | 1 | 1 | 4 | 1 | (H+2) | variable bytes | variable bytes | | optional |

O = offset of first source packet in current block from first referenced in SSM

FIG. 10

| R | SBN | PP | ESI | K | J | X | FEC Repair Symbols | SSM Fragment |
|---|-----|----|----|---|---|---|--------------------|--------------|
| 4b | 12b | 1 | 2 | 2 | 1 | 1 | | |

FIG. 15

| $P_{SSM}$ vs. $P_{FEC}$ | Protection Period (ms) | | | | | |
|---|---|---|---|---|---|---|
| | 125 | | 250 | | 500 | |
| 3% | $4.9*10^{-5}$ | $5.3*10^{-3}$ | $1.5*10^{-4}$ | $5.1*10^{-3}$ | $3.6*10^{-8}$ | $5.2*10^{-4}$ |
| 5% | $3.4*10^{-7}$ | $4.6*10^{-4}$ | $1.2*10^{-8}$ | $8.0*10^{-5}$ | $2.6*10^{-16}$ | $2.3*10^{-7}$ |
| 8% | $1.7*10^{-11}$ | $2.0*10^{-6}$ | $5.2*10^{-17}$ | $4.1*10^{-9}$ | $6.4*10^{-31}$ | $1.8*10^{-14}$ |
| 10% | $1.2*10^{-13}$ | $1.1*10^{-7}$ | $3.1*10^{-21}$ | $1.7*10^{-11}$ | $1.8*10^{-41}$ | $1.1*10^{-15}$ |
| Protection up to Max Loss Rate | $P_{SSM}$ | $P_{FEC}$ | $P_{SSM}$ | $P_{FEC}$ | $P_{SSM}$ | $P_{FEC}$ |

FIG. 25

GENERATING AND COMMUNICATING SOURCE IDENTIFICATION INFORMATION TO ENABLE RELIABLE COMMUNICATIONS

PRIORITY

This application claims the benefit under 35 U.S.C. 119(e) of and is a non-provisional of U.S. Application Ser. No. 60/971,884 filed Sep. 12, 2007 and U.S. Application Ser. No. 61/093,277 filed Aug. 29, 2008. All of these applications are incorporated by reference in their entirety for all purposes.

CROSS-REFERENCES

The following references are included here and are incorporated by reference for all purposes:

U.S. Pat. No. 6,307,487 entitled "Information Additive Code Generator and Decoder for Communication Systems" issued to Luby (hereinafter "Luby I");

U.S. Pat. No. 7,418,651 entitled "File Download and Streaming System" to Luby, et al. (hereinafter "Luby II");

U.S. Pat. No. 7,068,729 entitled "Multi-Stage Code Generator and Decoder for Communication Systems" issued to Shokrollahi, et al. (hereinafter "Shokrollahi I");

U.S. Published Patent Application No. 2006/0036930 published Feb. 16, 2006 and entitled "Method and Apparatus for Fast Encoding of Data Symbols According to Half-Weight Codes" to Luby, et al. (hereinafter "Luby III"); and U.S. Pat. No. 6,856,263 entitled "Systems and Processes for Decoding Chain Reaction Codes Through Inactivation" issued to Shokrollahi, et al. (hereinafter "Shokrollahi II").

U.S. Published Patent Application No. 2007/0300127 published Dec. 27, 2007 entitled "Code Generator and Decoder for Communications Systems Operating Using Hybrid Codes to Allow for Multiple Efficient Users of the Communications Systems" to Watson et al. (hereinafter "Watson").

U.S. Patent U.S. Pat. No. 7,249,291, issued Jul. 24, 2007 entitled "System and Method for Reliably Communicating the Content of a Live Data Stream" issued to Jens Rasmussen, et al. (hereinafter "Rasmussen").

FIELD OF THE INVENTION

The present invention relates to encoding and decoding data in communications systems, and more specifically to communication systems that encode and decode data to account for errors and gaps in communications.

BACKGROUND OF THE INVENTION

Transmission of files and streams between a sender and a recipient over a communications channel has been the subject of much literature. Preferably, a recipient desires to receive an exact copy of data transmitted over a channel by a sender with some level of certainty. Where the channel does not have perfect fidelity, which characterizes most physically realizable systems, one concern is how to deal with data that is lost or corrupted in transmission. Lost data (erasures) are often easier to deal with than corrupted data (errors) because the recipient cannot always recognize when the transmitted data has been corrupted.

Many error-correcting codes have been developed to correct erasures and/or errors. Typically, the particular code used is chosen based on some information about the infidelities of the channel through which the data is being transmitted, and the nature of the data being transmitted. For example, where the channel is known to have long periods of infidelity, a burst error code might be best suited for that application. Where only short, infrequent errors are expected, a simple parity code might be best.

Another commonly used technique for providing reliable data delivery is the use of data retransmission. For example, the well-known TCP/IP protocol uses packet retransmission of lost or missing packets to ensure reliable delivery of data. Another example is the HTTP protocol, which is built on top of TCP/IP and uses the reliability of the TCP/IP protocol to provide reliable data delivery. Enhancements of other protocols to use retransmission, such as the RTP protocol, have also been suggested as a way of coping with lost or missing packets at receivers.

Another technique that has been suggested for the improvement of streaming applications is to send initial data for a stream in one channel to a receiver and then to transition over to sending the main data stream in a second channel to a receiver. For example, Rasmussen suggests such a method. As another example, initial data may be sent to a receiver via a unicast connection to ensure that the receiver has enough data quickly to start the play-out of a video or multi-media stream, and then the receiver may switch over to a multicast connection to receive further data for the stream.

"Communication", as used herein, refers to data transmission, through space and/or time, such as data transmitted from one location to another or data stored at one time and used at another. The channel is that which separates the sender and receiver. Channels in space can be wires, networks, fibers, wireless media, etc. between a sender and receiver. Channels in time can be data storage devices. In realizable channels, there is often a nonzero chance that the data sent or stored by the sender is different when it is received or read by the recipient and those differences might be due to errors introduced in the channel.

Data transmission is straightforward when a transmitter and a receiver have all of the computing power and electrical power needed for communications, and the channel between the transmitter and receiver is reliable enough to allow for relatively error-free communications. Data transmission becomes more difficult when the channel is in an adverse environment, or the transmitter and/or receiver has limited capability. In certain applications, uninterrupted error-free communication is required over long periods of time. For example, in digital television systems it is expected that transmissions will be received error-free for periods of many hours at a time. In these cases, the problem of data transmission is difficult even in conditions of relatively low levels of errors.

Another scenario in which data communication is difficult is where a single transmission is directed to multiple receivers that may experience widely different data loss conditions. Furthermore, the conditions experienced by one given receiver may vary widely or may be relatively constant over time.

One solution to dealing with data loss (errors and/or erasures) is the use of forward error correcting (FEC) techniques, wherein data is coded at the transmitter in such a way that a receiver can correct transmission erasures and errors. Where feasible, a reverse channel from the receiver to the transmitter enables the receiver to relay information about these errors to the transmitter, which can then adjust its transmission process accordingly. Often, however, a reverse channel is not available or feasible, or is available only with limited capacity. For example, in cases in which the transmitter is transmitting to a large number of receivers, the transmitter might not be able to maintain reverse channels from all the receivers. In another example, the communication channel may be a storage medium.

For example, data may be transmitted chronologically forward through time, and causality precludes a reverse channel that can fix errors before they happen. As a result, communication protocols often need to be designed without a reverse channel or with a limited capacity reverse channel and, as such, the transmitter may have to deal with widely varying channel conditions without prior knowledge of those channel conditions. One example is a broadcast or multicast channel, where reverse communication is not provided, or if provided is very limited or expensive. Another example where such a situation is relevant is a storage application, where the data is stored encoded using FEC, and then at a later point of time the data is recovered, possibly using FEC decoding.

Another solution is based on retransmission that is based on a receiver understanding which packets are not received and then sending requests to the sender to retransmit those missing packets. The identification of which packets are missing is often based on sequence numbers carried within the packets. Examples of such protocols include TCP/IP, NORM, RTP with retransmission, etc.

Another solution is based on the combination of FEC and retransmission. In this case, FEC may be proactively sent and then for example only if the receiver loses more than can be recovered by the FEC decoder does the receiver request retransmission of packets, or transmission of additional FEC packets in order to provide enough packets to the FEC decoder for recovering the original source packets. As another example, no FEC may be sent initially, and only if there are missing packets would the receiver request additional packets that may be FEC packets that can be used to recover the original source packets. For example, this may be a solution of interest in the case of sending the original source stream via multicast and then the requested packets are also sent in either in the same stream or in a different multicast stream. For example, different receivers may lose different numbers of packets, and then a sender sending the requested packets may send for example the maximum number of FEC packets requested by all receivers that will allow all receivers to recover the original source independent of their individual packet loss patterns.

In the case of a packet protocol used for data transport over a channel that can lose packets, a file, stream, or other block of data to be transmitted over a packet network is partitioned into source symbols (that may all be of equal size or that may vary in size depending on the block size or on other factors). Encoding symbols are generated from the source symbols using an FEC code, and the encoding symbols are placed and sent in packets. The "size" of a symbol can be measured in bits, whether or not the symbol is actually broken into a bit stream, where a symbol has a size of M bits when the symbol is selected from an alphabet of $2^M$ symbols. In such a packet-based communication system, a packet-oriented erasure FEC coding scheme might be suitable.

A file transmission is called reliable if it enables the intended recipient to recover an exact copy of the original file despite erasures and/or other corruption of the data transmitted over a network. A stream transmission is called reliable if it enables the intended recipient to recover an exact copy of each part of the stream in a timely manner despite erasures and/or corruption within the network. Both file transmission and stream transmission can instead be not entirely reliable, but somewhat reliable, in the sense that some parts of the file or stream are not recoverable or, for streaming, some parts of the stream might be recoverable but not in a timely fashion. It is often the goal to provide as high reliability as possible depending on some constraining conditions, where examples of constraints might be timely delivery for streaming applications, or the type of network conditions over which a solution is expected to operate.

Packet loss often occurs because sporadic congestion causes the buffering mechanism in a router to reach its capacity, forcing it to drop incoming packets. Other causes of packet loss include weak signal, intermittent signal, and noise interference wherein corrupted packets are discarded. Protection against erasures during transport has been the subject of much study.

In a system in which a single transmission is directed to more than one receiver, and in which different receivers experience widely different conditions, transmissions are often configured for the some set of conditions between the transmitter and any receiver, and any receivers that are in worse conditions may not receive the transmission reliably.

Erasure codes are known which provide excellent recovery of lost packets in such scenarios. For example, Reed-Solomon codes are well known and can be adapted to this purpose. However, a known disadvantage of Reed-Solomon codes is their relatively high computational complexity. Chain reaction codes, including LT™ chain reaction codes and Raptor™ multi-stage chain reaction ("MSCR") codes, provide excellent recovery of lost packets, and are highly adaptable to varying channel conditions. See, for example, Luby I, which describes aspects of chain reaction codes, and Shokrollahi I, which describes aspects of multi-stage chain reaction codes. Herein, the term "chain reaction code" should be understood to include chain reaction codes or multi-stage chain reaction codes, unless otherwise indicated.

Retransmission protocols are also known to be a good way to recover lost packets. TCP/IP, NORM, UDP and RTP based retransmission protocols are all examples of such retransmission protocols. In addition, using a combination of erasure code protocols and retransmission protocols can be quite useful for recovering lost packets. Retransmission protocols include any protocol where a receiver request specific packets or numbers of packets to be sent to the receiver, and where a sender may send specific packets or numbers of packets to that receiver, or to groups of receivers, in response.

Some communication systems use transport protocols, such as RTP, that include information usable to identify the position or sequence of a source packet relative to other source packets in the same stream. By providing sequence information for each packet, a receiver may detect and correct packets that are received out of network order. A receiver can also detect when packets have been lost, and when combined with application layer FEC techniques, such as those of DVB-IPI (see, for example, the descriptions in Watson), the receiver may be able to recover the lost packets and effectively mask network reliability imperfections. DVB details are known from the reference for the DVB-IPI standard: "DVB Blue-Book A086r4 (03/07)/ETSI Technical Specification 102 034 v1.3.1", which is available at the URL: http://www.dvb.org/technology/standards/a086r4.dTS102034.V1.3.1.pdf.

Many deployed communication systems use transport level protocols that do not include any form of timing or sequence information. For example, it is common practice in IPTV networks to deliver MPEG2 Transport Stream packets over "raw UDP". The only sequence information available to a receiver is embedded in the audio and video elementary stream, which may be hard to access, or unreliable, and not generally available at the transport level. Consequently, there is no inherent mechanism at the transport level with raw UDP streams that allow a receiver to recognize when a packet is received out of network order or to identify missing packets. While well-known mechanisms, such as application layer FEC ("AL-FEC"), may be used to efficiently recover lost packets, the absence of transport level sequence information on source stream packets limits the direct applicability of such recovery techniques. These same issues apply to retransmission solutions and to combinations of retransmission and AL-FEC solutions. Thus, this is a general problem with some existing approaches.

Another problem with some communications systems is that the parts are interrelated. In some cases, it may be necessary or desirable to increase the reliability of a communications system after deployment. However, while an improvement in network reliability may be needed, it is typically not feasible to replace or upgrade all receiving devices in the network at once or at all. For example, it might turn out that actual network packet loss is higher than initially planned, due to degradations in network reliability, increased traffic load, expansions and/or changes in the network, etc., or the quality of service requirements may need to increase to match competitive services, but it might be impractical to get new receivers out to all nodes of the communications system at once or to distribute them over time and have some receiving stations out of commission until the new receivers arrive.

In order to ensure that legacy devices are unaffected by protocol enhancements, such as AL-FEC or retransmission or combinations of AL-FEC and retransmission, used by upgraded or new receivers, it is necessary to continue to deliver source packets using the same transport level protocol. Furthermore, to ensure that source packets delivered to a legacy device do not become more susceptible to burst loss, it is necessary to maintain the same source packet timing distribution or inter-packet timing. In some communication systems, source packets within a source block may be transmitted with a smaller inter-packet gap to allow repair packets to be delivered immediately after the associated source packets; such techniques would increase the exposure of the source stream to burst loss and therefore degrade the transport effectiveness for a legacy device.

In order to deliver the best possible service at the lowest cost, communications systems must simultaneously balance conflicting resource constraints. Network bandwidth is a critical resource constraint. Transmitting and receiving devices need to enable efficient use of network bandwidth in supporting a reliable service. The available CPU processing on receiving devices is typically a severe limitation, meaning that any transport reliability enhancement method must require only a modest amount of computing effort. In addition, it is also often necessary, particularly with streaming media, to limit the incremental latency associated with reliable transport methods so that the end-user does not perceive a reduction in system responsiveness.

BRIEF SUMMARY OF THE INVENTION

According to one embodiment of the invention, a method of generating Source Identification information or data, referred to as Source Identification data or information, from a source stream is described. The method can operate on an original source stream and generate relatively compact Source Identification information or data that may be used by a receiving device to identify the position of source packets relative to other source packets, and to identify lost or corrupted source packets. Source Identification information or data generation methods can result in a compact representation of the source packet identification, which enables the Source Identification information for a block of source packets to be delivered using a relatively small amount of network bandwidth. The computational load of deriving the Source Identification information is small.

The Source Identification data may be combined with forward error correction ("FEC") techniques to enable recovery of lost or corrupted source packets. The Source Identification data may also be combined with retransmission techniques, and combinations of FEC techniques and retransmission techniques to enable recover of lost or corrupted source packets. The Source Identification data may also be used with techniques that identify at a receiver in which order a sequence of source packets are sent from a sender to that receiver, even when some sent packets are lost, corrupted or re-ordered.

In another embodiment of the invention, method and apparatus might be provided that enable reliable delivery of Source Identification data so that the identity or relative position of source packets can be determined at a receiving device and by extension, the absence of a received source packet can be derived. To provide reliable delivery of the Source Identification, packets that carry the Source Identification can be transmitted in a manner than minimizes exposure to burst loss or periodic loss patterns. Since the Source Identification data is derived from the source packet content, two or more source packets may share the same the Source Identification data and variations of these methods can protect against such Source Identification collisions at the receiver.

According to another embodiment of the invention, a method of transmitting data over a communications channel is provided, the method comprising the step of transmitting an original unmodified source stream, and transmitting FEC repair data and Source Identification data as additional streams that can be used to efficiently recover lost or corrupted packets in the original unmodified source stream.

According to another embodiment of the invention, a method of transmitting data over a communication channel is provided, the method comprising the step of transmitting an original unmodified source stream, and transmitting Source Identification data as additional streams that can be used to identify which data is missing or corrupted from the received data and request retransmission. In a further enhancement of this embodiment, retransmitted data is also identified using Source Identification information. In a further enhancement of this embodiment, out of order data reception is identified and re-ordered using Source Identification information. In a further enhancement, Source Identification information is used to both recover lost or corrupted data in the original unmodified source stream using FEC and used to identify which data is missing or corrupted from the original source stream and to request retransmission of missing or corrupted data, or transmission of additional repair data that can be used to recover the data in the unmodified source stream. In a further enhancement of this embodiment, a first repair stream is transmitted along with the original unmodified source stream. In a further enhancement of this embodiment, a second repair stream is transmitted in response to any requests for retransmission. In a further enhancement of this embodiment, one or more of the various streams are cached.

According to another embodiment of the invention, the Source Identification information identifies which block of data within an unmodified source stream of data that source packets are associated with. In this case, a unique identifier for each unmodified source packet may not be able to be generated, i.e., the Source Identification information may be used to identify the block of data a source packet is associated with, but may not be able to differentiate the source packets within a block from one another.

According to another embodiment of the invention, a method of receiving data transmitted over a communications channel is provided, the method comprising the steps of: (1) for a non-FEC enabled receiver or for zero or more of the FEC enabled receivers, receiving the original unmodified source stream; (2) for one or more of the FEC enabled receivers, receiving an original unmodified source stream and some or all of the additional streams of FEC repair data and Source Identification data and using this to efficiently recover lost packets from the original source stream.

According to another embodiment of the invention, a method of receiving data transmitted over a communications channel is provided, the method comprising the steps of: (1) for a non-retransmission enabled receiver or for zero or more of the retransmission enabled receivers, receiving the original unmodified source stream; (2) for one or more of the retransmission enabled receivers, receiving an original unmodified source stream and some or all of the additional streams of retransmission repair data and Source Identification data and using this to efficiently recover lost packets from the original source stream.

According to another embodiment of the invention, a method of receiving data transmitted over a communications channel is provided, the method comprising the steps of: (1) for a non-FEC and non-retransmission enabled receiver or for zero or more of the FEC and retransmission enabled receivers, receiving the original unmodified source stream; (2) for one or more of the FEC and retransmission enabled receivers, receiving an original unmodified source stream and some or all of the additional streams of FEC and retransmission repair data and Source Identification data and using this to efficiently recover lost packets from the original source stream.

According to another embodiments of the invention, a method of receiving data transmitted over a communications channel is provided, the method comprising the steps of: (1) for an FEC enabled or retransmission enabled receiver, determining if a particular stream that is being received has associated FEC repair data or retransmission data available; (2) if FEC repair data or retransmission data is available, receiving some or all of the additional streams of FEC and retransmission repair data as needed and Source Identification data and using this to efficiently recover lost packets from the original source stream.

According to another embodiment of the invention, a method of transmitting data over a communications channel is provided, the method comprising the step of transmitting an original unmodified source stream, and transmitting additional streams of related data that can be used to efficiently recover lost packets in the original unmodified source stream.

As will be clear to those of skill in the art upon review of this disclosure, the methods described herein can be naturally extended to many variations of the above, including sending multiple layers of FEC repair data, sending the source stream to one IP address and the additional streams to other IP addresses, sending retransmission data individually to receivers, sending the same retransmission data via broadcast or multicast to multiple receivers, sending a combination of FEC repair data and retransmission data to receivers, sending FEC repair data to one set of receivers and sending retransmission to a second set of receivers, sending all streams to the same IP address but distinguished by using different port numbers within the packets, sending some of the streams to only certain portions of the receivers and not others, etc.

A better understanding of the nature and the advantages of the embodiments disclosed herein may be realized by reference to the remaining portions of the specification.

BRIEF DESCRIPTION OF THE DRAWINGS

FIG. 10 is a block diagram that shows an example of another possible Source Identification data format.

FIG. 15 is a block diagram that shows a possible format for packets that comprise both FEC repair data and Source Identification data.

FIG. 25 is a table that shows some example results of protection of streams with FEC repair data and Source Identification data.

Figure 1:
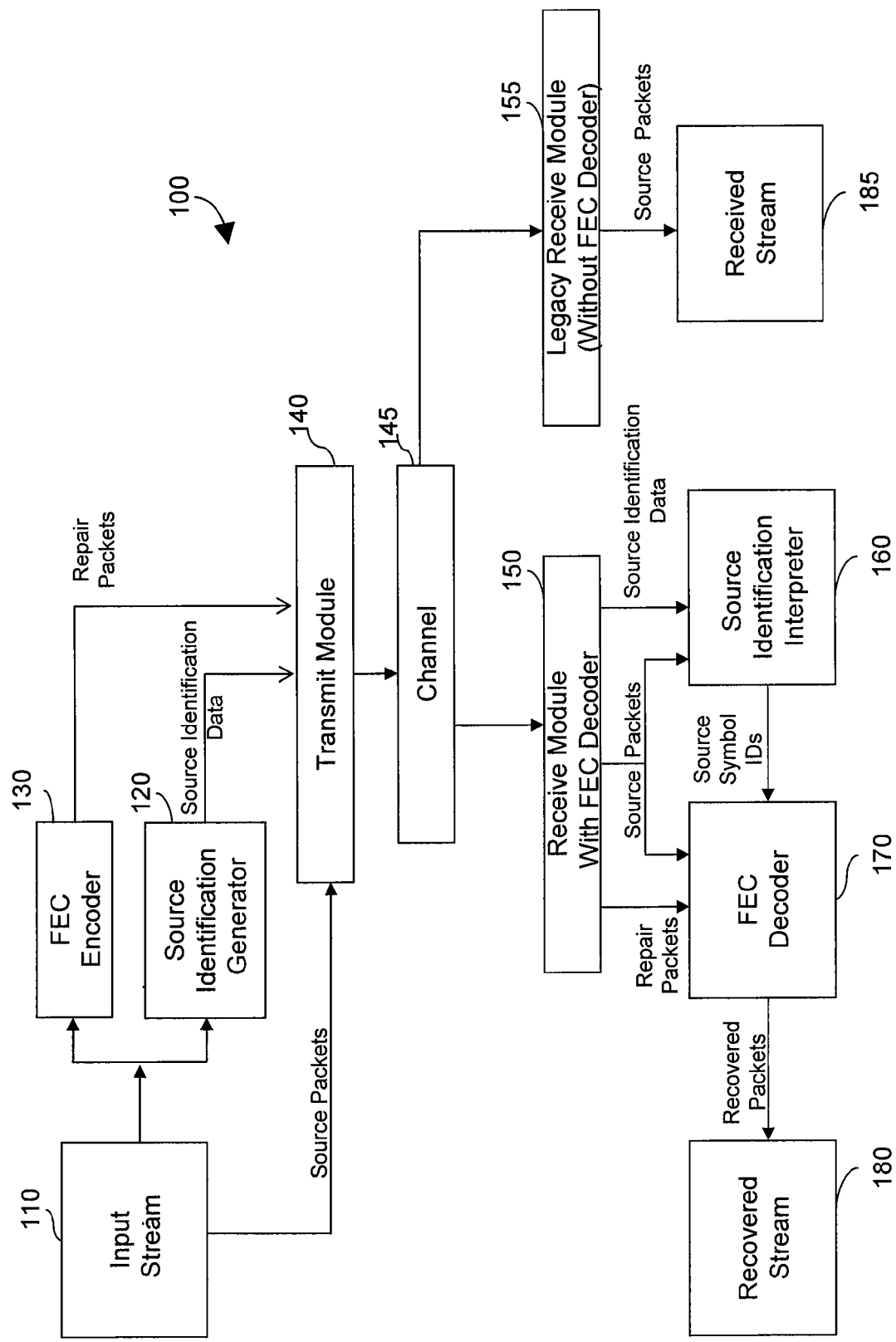
FIG. 1 is a block diagram of a communications system that can generate and use one or more of the Source Identification techniques described herein used in conjunction with FEC repair techniques.

A further understanding of the nature and the advantages of the inventions disclosed herein may be realized by reference to the remaining portions of the specification and the attached drawings.

DETAILED DESCRIPTION OF SPECIFIC EMBODIMENTS

It is to be understood that the various functional blocks described herein may be implemented by a combination of hardware and/or software, and that in specific implementations some or all of the functionality of some of the blocks may be combined. Similarly, it is also to be understood that the various methods described herein may be implemented by a combination of hardware and/or software. Thus, where a computational step is performed, which might be described as "we then do step X", it should be understood that such descriptions include electronic hardware and/or software, or the like, performing those steps, typically as part of a communications process and not involving human or manual interaction.

In some embodiments described herein, data to be encoded is segmented into "source blocks," each block comprising a number of packets of data, known as "source packets," with the number of source packets in a block possibly varying between blocks. For each source block, a number of "FEC repair" packets are generated by the encoder, the number also possibly varying between blocks. "Source packets" and "FEC repair", (or "repair") packets have the characteristic that a receiver receiving a combination of source and repair packets greater than or equal in number to the number of source packets has some non-zero probability of recovering all the source packets.

Source Identification Data Types and Uses

In some embodiments herein, Source Identification data can refer to data from which the positions of source symbols (which can be sent in packets or other units of transport, hereafter referred to more generally as source data units) relative to other source symbols, as well as the positions of lost source symbols, can be identified at a receiving device. As used herein, a Source Symbol Map or Source System Map (both can be referenced as an "SSM") is one form of Source Identification data or information. For the purposes of this disclosure, a Source Symbol Map and Source System Map are used interchangeably with Source Identification data. In some embodiments herein, Source Identification data can refer to data from which the positions of sent packets in a stream of packets relative to other packets, comprising the positions of both received and lost packets, can be identified at a receiving device. In some embodiments herein, Source Identification data can refer to data that is used at a sender to identify packets or symbols or other units of data that are requested for retransmission from a receiver. Source Identification data can be used at a receiver to recover lost symbols or packets or other units of data from a combination of source and repair symbols or packets. Source Identification data can be used to identify which symbols or packets or other units of data is lost in order to request their retransmission. Source Identification data can also be used to determine the original sending order of packets or symbols relative to other packets or symbols at a receiver. Source Identification data may be considered as a single part, may be partitioned into sub-parts, or may be thought of as a stream, whereas the single part, sub-parts or stream of Source Identification data may be used to identify all or parts of the source data units, for example a part of Source Identification data may be used to identify those source data units within a source block. As one skilled in the art will recognize, there are many other possible uses of Source Identification data that are not enumerated herein, but which can be easily surmised using the methods and processes disclosed herein. Possible different types and uses of Source Identification data include, but are not limited to, the following:

(1) Determining identification labels for known source data units method—the ability to determine a short identification label for each known source data unit from the Source Identification data. One example use is that a receiver can send labels for received source data units to a sender so that source data units associated with labels not received can be transmitted from the sender to the receiver. A variant of this method allows identification labels to be determined for a restricted set of possible source data units, for example those source data units that belong to a particular source block, or those source data units that are sent within a specified period of time.

(2) Determining identification labels for all source data units method—the ability to determine a short identification label for all source data units, whether the source data unit is known or unknown, from the Source Identification data. One example use is that a receiver can send labels of missing source data units to a sender so that source data units associated with labels received can be transmitted from the sender to the receiver. A variant of this method allows identification labels to be determined for a restricted set of possible source data units, for example those source data units that belong to a particular source block, or those source data units that are sent within a specified period of time.

(3) Determining positioning method—the ability to determine a position for each source data unit with respect to an ordering of all of the source data units, for both known and unknown source data units, where the ordering is determined by the Source Identification data but may be different than the sending order of the data units or different than the order of the source data units within the stream or file. One example use is that a sender and receiver can use this information to determine where to place source data units within a source block for FEC encoding and FEC decoding. A variant of this method allows positions to be determined for a restricted set of possible source data units, for example those source data units that belong to a particular source block, or those source data units that are sent within a specified period of time.

(4) Determining sequencing method—the ability to determine the position of each source data unit with respect to a sending order sequence or other source-determined order sequence (such as the order of the source data units in a file, or the order of the data in an audio-video stream) of all of the source data units, for both known and unknown source data units, from the Source Identification data. One example use is that a receiver can use this ordering to determine in what order to deliver data units to an application, for example in what order to write the data units to a file, or in what order to send the data units for a media stream to a media player. A variant of this method allows positions to be determined for a restricted set of possible source data units, for example those source data units that belong to a particular source block, or those source data units that are sent within a specified period of time.

When the determining positioning method is used in conjunction with an FEC method, the ordering of the source symbols within a source block can be according to the positions from the determining positioning method, and in this case the Source Identification method may interact with how the FEC encoding and decoding methods operate. On the other hand, when the determining sequencing method is used in conjunction with an FEC method, the ordering of the source symbols within a source block can be according to the sequencing, and since the sequencing is generally not dictated by the determining sequencing method, in this case the Source Identification method may be largely independent of how the FEC encoding and decoding methods operate. In some cases, a Source Identification method may be used which is a combination of a determining positioning method and a determining sequencing method, e.g., there may be some initial Source Identification data which is used to determine positions of source symbols within a source block, then FEC decoding is performed to recover source symbols according to their positions, and then there may be some additional Source Identification data that is part of the source block that is used to determine the sequencing of the recovered source symbols for delivery to an application.

When the determining positioning method is used in conjunction with a Retransmission method, source packets that are requested for retransmission by a receiver can be identified by their positions, e.g., the receiver can send the position of a source packet requested for retransmission to a sender. In these cases, since the sequencing order may be different than the position order, the sender may send the retransmitted packets according to their sequence order, and the receiver may determine the sequencing based on the original order of reception of source packets not lost and the order of reception of retransmitted source packets. When the determining sequencing method is used in conjunction with a retransmission method, source packets that are requested for retransmission by a receiver can be identified by their sequencing, e.g., the receiver can send the sequence number of a source packet requested for retransmission to a sender. In some cases, a Source Identification method may be used which is a combination of a determining positioning method and a determining sequencing method, e.g., there may be some initial Source Identification data which is used to determine positions within a source block that is sent during the original transmission of source packets, and then there may be some additional Source Identification data that is sent during retransmission that is used to determine the sequencing of the source packets for delivery to an application, for example the sequence numbers of the retransmitted source packets.

As one skilled in the art will recognize, there are many variants of the above. For example, the Source Identification methods can be used in conjunction with combinations of FEC methods and Retransmission methods, in which case the requests for retransmission may be for particular source packets, for particular repair packets, or for a specified number of repair packets instead of for particular repair packets.

Example of Using a Source Identification Method in Conjunction with an FEC Method FIG. 1 is a block diagram of a communications system that can generate and use the Source Identification techniques described herein used in conjunction with FEC repair methods.

In communications system 100, input stream or file 110 is provided to a Source Identification generator 120. Source Identification generator 120 generates Source Identification data that contains information about the relative positions of source packets or symbols within the stream of packets or symbols. All source symbols or packets may have the same size, which is typically determined by the use of communications system 100, or the symbol size or packet size can vary from use to use or can be varied within a stream. The generations of Source Identification data may be independent of source symbol size or packet size.

The input stream or file 110 may be provided to the FEC encoder 130. In some embodiments, the FEC encoder 130 performs systematic FEC encoding, which generates FEC repair symbols based on one or more of the input source symbols and their positions, and often places these FEC repair symbols in repair packets for transmission.

It is worth noting that there may be source packets constructed from input stream or file 110 that are used for transmission over communication channels, the construction of these source packets may be independent of the source symbol size. There may or may not be a one-to-one mapping between source packets and source symbols. The source packets may or may not be of variable length.

The source packets from input stream or file 110, the Source Identification data from Source Identification generator 120, and the FEC repair symbols from FEC encoder 130, are provided to a transmit module 140. The transmit module 140 may send Source Identification data and FEC repair symbols in packets to a channel 145; the Source Identification data and FEC repair symbols may or may not be combined in packets during this process. These packets, along with the source packets, are transmitted over a channel 145.

The channel 145 may be an erasure channel, but that is not a requirement for proper operations of communications system 100. Typically the original source packets are sent as a logically separate data stream from other packets. Examples of logically separate data streams include, but not limit to, streams sent over different multicast groups, or streams sent to different ports. The data streams sent to channel 145 may be received by receive modules 150 and 155. Receive module 150 is intended to work with FEC decoder, whereas receive module 155 is a legacy device that may not include FEC decoding. It should be noted that the communications system 100 may be designed such that the legacy receive module 155 only receives source packets, or receives a combination of packets but filters out packets other than source packets.

The legacy receive module 155 can be enabled to recognize and handle the source packets from channel 145. If any repair packets or Source Identification data arrive, they can be on a logically separate stream and can be ignored (silently dropped) by the legacy receive module 155. The received stream 185 is produced from legacy receive module 155.

The receive module 150 can logically differentiate Source Identification data, repair symbols from source packets. The source packets and Source Identification data are provided to Source Identification interpreter 160, from which source symbol IDs identifying source symbols carried in source packets can be identified. The Source Identification data, which provides relationship between received source symbol values and their positions, are sent to the FEC decoder 170.

In addition, the FEC decoder 170 also takes as input the FEC repair symbols and the source packets, both are provided from receive module 150. The FEC decoder 170 tries to recover missing source packets, if any. The received source packets, along with any recovered missing source packets from FEC decoder 170, are reassembled if necessary, to produce recovered stream or file 180. The source packets sent as the recovered input stream or file 180, may be sent in exactly or approximately the original order in which they were sent from input stream 110.

There are many variants of the communication system 100. For example, an FEC encoder 130 may not be used, or the FEC encoder 130 may be replaced with a Retransmitter sender module that receives request for retransmission of lost or missing packets and retransmits those packets based on Source Identification data. As another example, an FEC decoder 170 may not be used, or the FEC decoder 170 may be replaced with a Retransmitter receiver module that determines which packets or symbols are lost or missing based on Source Identification data and sends requests for those missing packets or symbols, and upon receipt of resent packets or symbols places them into their proper order and passes them on as a Recovered stream 180. As another example, FEC encoder 130 and FEC decoder 170 may not be used, and instead a Packet re-orderer may be used in place of an FEC decoder 170 to reorder mis-ordered received source packets based on Source Identification information. As another example, FEC encoder 130 and FEC decoder 170 may be enhanced to comprise handling of both FEC repair and retransmission logic and methods. As another example, some parts of Source Identification data may be sent directly to a receiver, whereas other parts of Source Identification data may be recovered as part of the FEC recovery process.

The communication system 100 can be used for delivery of streams, files, or other types of data.

Seamless Upgrade Paths

There are a variety of reasons why a full upgrade of a communications system may take a prolonged period of time. For example, it could be the case that older devices may not have the capability to support the upgraded system due to limitations in computational resources or memory. As another example, some devices are designed with the characteristic that they cannot be upgraded, and thus the upgrade can only occur when the device is replaced with a new device in which the upgrade is already installed. In other cases, even if in theory an upgrade is possible, it may in practice be too expensive or risky to upgrade a large number of devices because of the expense of installing upgrade software remotely on millions of devices and making sure that the upgrade is working correctly, as well as troubleshooting problems during installation, etc. Furthermore, if there are a large number of devices installed and they all need to be upgraded before the system is operational again, then it could be practically impossible to shut down the system during the upgrade, as would be the case with a large operational deployment of an IPTV service with thousands, tens of thousands, or even millions of receivers, which could take days or months to fully upgrade.

In such cases, a seamless upgrade path is highly desirable but is often difficult to accomplish.

With respect to deployment of FEC protection of streaming data within a system that did not previously use FEC, there is a well-known potential seamless upgrade path. The way this is done is to design the application of the FEC in such a way that the original source stream is sent, and then additional FEC repair data is sent in a logically separate stream that can be used by upgraded receivers to support a much higher quality stream playout, while at the same time older receivers that have not been upgraded can simply ignore the FEC repair data and still operate as before using the original source stream of data. The possibility of this seamless upgrade path is one of the primary reasons that systematic FEC codes are preferable for streaming applications. A systematic FEC code has the property that the original source data is included and sent as part of the FEC encoded data, and in this context the additional FEC data that is generated and sent is called the FEC repair data.

An obstacle to this seamless upgrade path is that the association between the FEC repair data and the original source data stream from which the FEC repair data is generated needs to be determined at receivers. In particular, for many FEC schemes, source symbols or packets that comprise an original source data stream can be identified and/or sequenced by source symbol identifiers or packet identifiers, and source symbol identifiers or packet identifiers can be used by an FEC decoder to recover missing or lost source data from received FEC repair data. However, in many streaming systems, such source symbol or packet identifiers are not included, are only partially included, are not completely reliable, or are difficult to access in the original source stream. While there are transport protocols, such as RTP, that natively include sequence information at each source packet which can be used as a source packet identifier and/or sequencer, many deployed communication systems do not make use of these protocols, as a result no timing or sequence information is included in the original source packets or accessible at the transport layer. As an example, IPTV deployments often use UDP packets that carry MPEG2 TS units, and in these deployments identifiers are often not readily accessible or available at the transport level. Furthermore, adding identification data to symbols or packets in the original source stream is not possible for a variety of reasons. Among these reasons are that existing deployed devices would not work if the original source stream is modified in any way, or that the existing communication protocols are desired not to be changed or impossible to change for a variety of other reasons. In these situations the simple seamless upgrade path described above is not possible, and other methods and processes are needed.

To maintain compatibility with legacy devices in these systems, and to allow usage of communication systems that do not natively include packet or symbol or data sequencing or identification information, the methods introduced herein disclose methods to send the source packet sequence or identifier information in a logically separate stream, so that a capable receiver can gather this information together with FEC repair data and recover erased or lost or missing or corrupted source packets or symbols. The Source Identification data, as outlined in one embodiment, can capture and represent this information. In some embodiments, this identifier or sequence information is sent in one of the channels that FEC repair data are sent, although this is not absolutely required.

Figure 2:
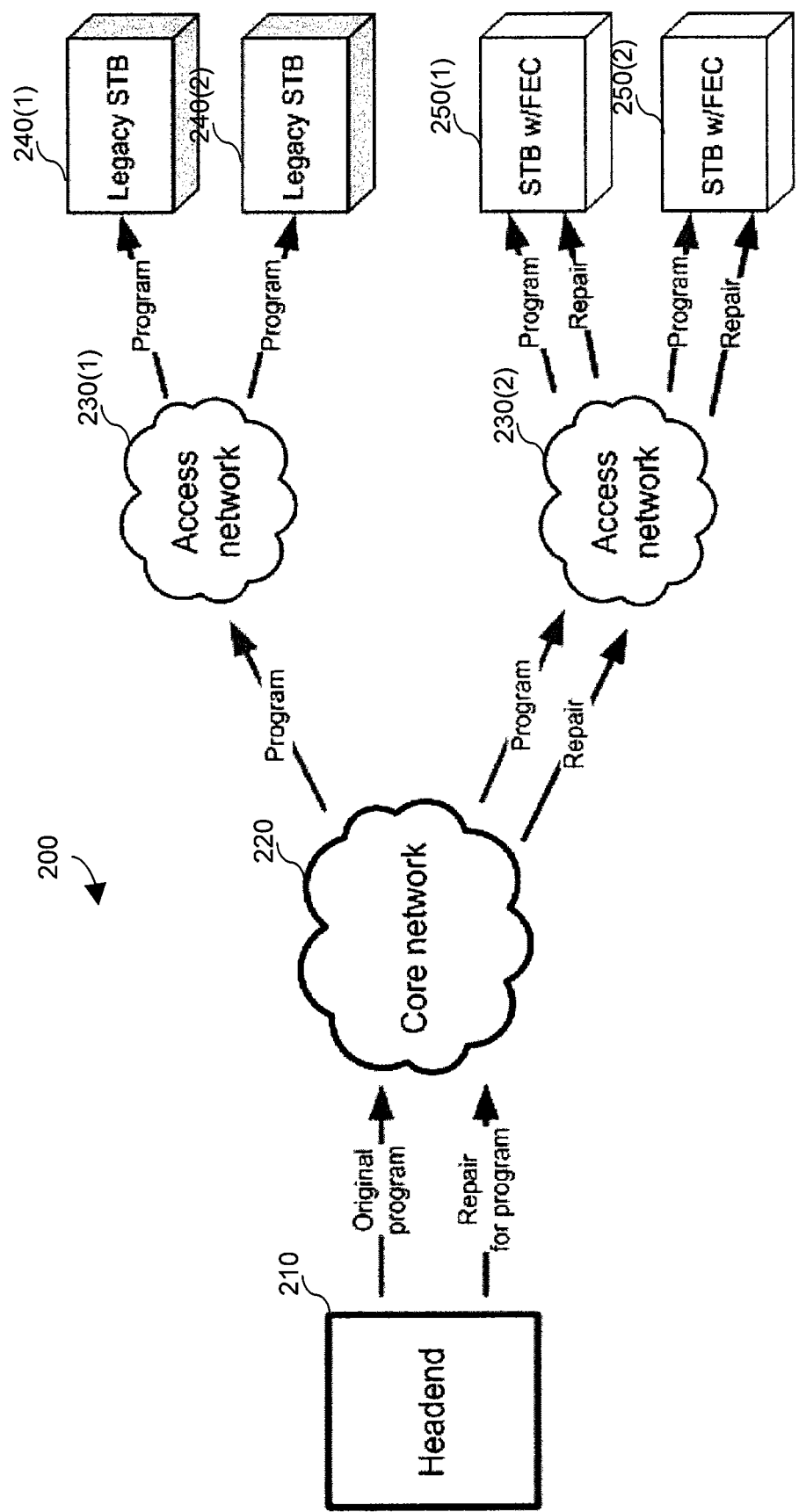
FIG. 2 is a block diagram of a communication system that supports both legacy set-top boxes and FEC-enabled set-top boxes.

FIG. 2 shows an example of a seamless upgrade path for a communication system 200 that is using a mixture of devices that do and that do not support FEC methods. A Headend device 210 generates and sends to the core network 220 both an original program that comprises original source data, and repair for program that comprises FEC repair data and Source Identification data. The core network 220 sends the original program to Access Networks 230(1), 230(2), does not send the repair program to Access Network 230(1) in which there are legacy set-top boxes (STBs) 240(1), 240(2) that do not support FEC, and does send the repair program to Access Network 230(2) in which there are STBs 250(1), 250(2) that do support FEC methods. There are many variations of the communication system 200, including variations where a legacy STB 240(1) does receive the repair program but only uses the original program, including variations where there is no distinction between a core network and an access network, including variations where the original program and repair program are sent as one logical stream, including variations where retransmission methods are supported instead of or in combination with FEC methods, including variations where set-top boxes are other types of receiving devices, including variations where some receiving devices do not support the Source Identification data methods and some receiving devices support the Source Identification data methods in conjunction with FEC methods and other receiving devices support the Source Identification methods in conjunction with retransmission methods and other receiving devices support the Source Identification methods in conjunction with both retransmission methods and FEC methods and other receiving devices support the Source Identification methods in conjunction with data re-ordering methods, including variations where there are multiple sending devices, including variations where the sending and/or generating device for a repair for program is either logically or physically different from the sending and/or generating device for an original program, including variations where sending devices are at least sometimes receiving devices or vice versa, including variations where the Source Identification data methods are supported for reasons other than FEC methods or retransmission methods, for example to support data re-ordering methods.

It is desirable that a communication systems that supports Source Identification methods and associated recovery methods (such as FEC methods and retransmission methods) has as few differences as possible in terms of signaling and data delivery compared to a communication system that does not support such methods. For example, it is desirable if no special pre-signaling is required to indicate whether a particular stream supports Source Identification methods and associated methods, where pre-signaling might include for example an electronic program guide or its equivalent. For example, for a variety of reasons, some streams of data may support Source Identification methods and associated recovery methods and other streams may not, either at the same time or at different points in time. For example, it might be the case that initially no streams support Source Identification methods, and then over time more and more streams support Source Identification methods and eventually all streams might support Source Identification methods. It can be highly desirable to not have to signal whether streams do or do not support Source Identification methods, for example not having to include in an electronic programming guide whether or not each stream listed in the guide supports Source Identification methods.

Figure 3:
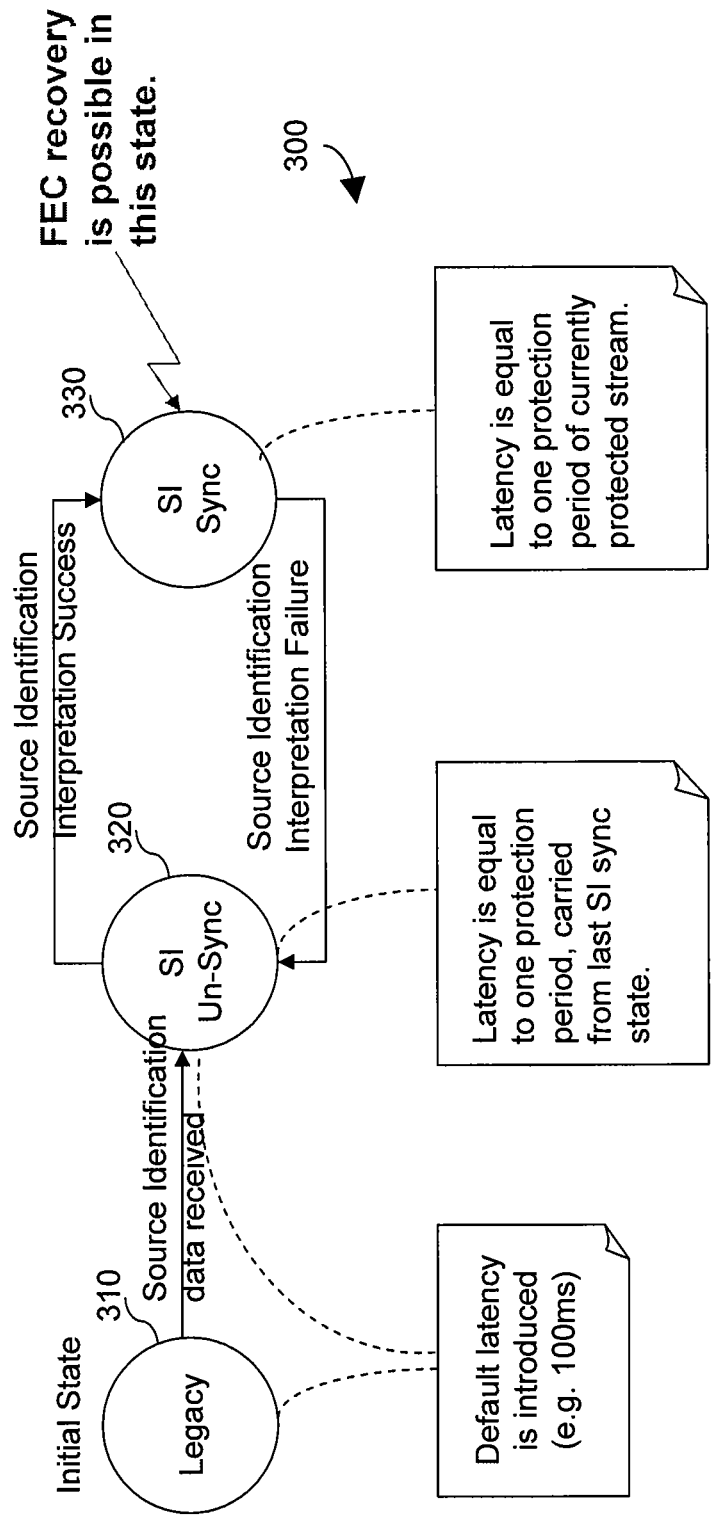
FIG. 3 is a state diagram of a FEC-enabled receiver determining whether or not repair is available for a particular stream.

FIG. 3 shows an example of possible state diagram 300 that might be used as logic in a receiving device that supports Source Identification methods and FEC methods wherein no pre-signaling is needed to indicate whether a particular stream uses Source Identification methods and FEC methods. In state diagram 300, a receiver starts in the legacy state 310 when first joining a stream, i.e., the receiver initially assumes that the stream is being sent does not use Source Identification methods and FEC methods. Nevertheless, in legacy state 310 the receiver continually monitors reception of packets for the current stream, and if Source Identification data (or FEC repair data) is received then the receiver moves to the SI Un-Sync state 320 in the state diagram. It may be some time, e.g., 100 ms, before the first Source Identification data (or FEC repair data) arrives at the receiver for a stream that uses Source Identification methods and FEC methods, which introduces some latency into moving into the SI Un-Sync state 320. Once the receiver is in the SI Un-Sync state 320, the receiver continually receives both FEC repair data if it is available, as well as Source Identification data that the receiver attempts to use to interpret the identify and/or determine the relative ordering of received and missing source packets or symbols. If the receiver can interpret the current Source Identification data then the receiver moves to the SI Sync state 330. While in the SI Sync state 330 the receiver may use the interpretation of the Source Identification data to identify and/or determine the relative ordering of received and missing source packets or symbols, and in turn use this to use received FEC repair data to recover parts of the original source stream of data. If the receiver is in the SI Sync state 310 and can no longer interpret the current Source Identification data then the receiver moves to the SI Un-Sync state 320 until the current Source Identification data can be interpreted again. The amount of latency in moving between the SI Sync state 310 and the SI Un-Sync state 320 may be on the order of a protection period, i.e., the period of time it takes to receive on source block of data from the stream, if the source data is organized into source block and is the Source Identification data is organized source block by source block.

There are many variants of state diagram 300. For example, retransmission methods may be used in place of FEC methods or in conjunction with FEC methods. As another example, re-ordering methods may be used in place of FEC methods. As another example, other data may be carried in addition to Source Identification data, for example to indicate whether FEC repair or retransmission methods are in use, or what type of FEC code is being used, or what type of retransmission methods are in use for the stream.

Figure 4:
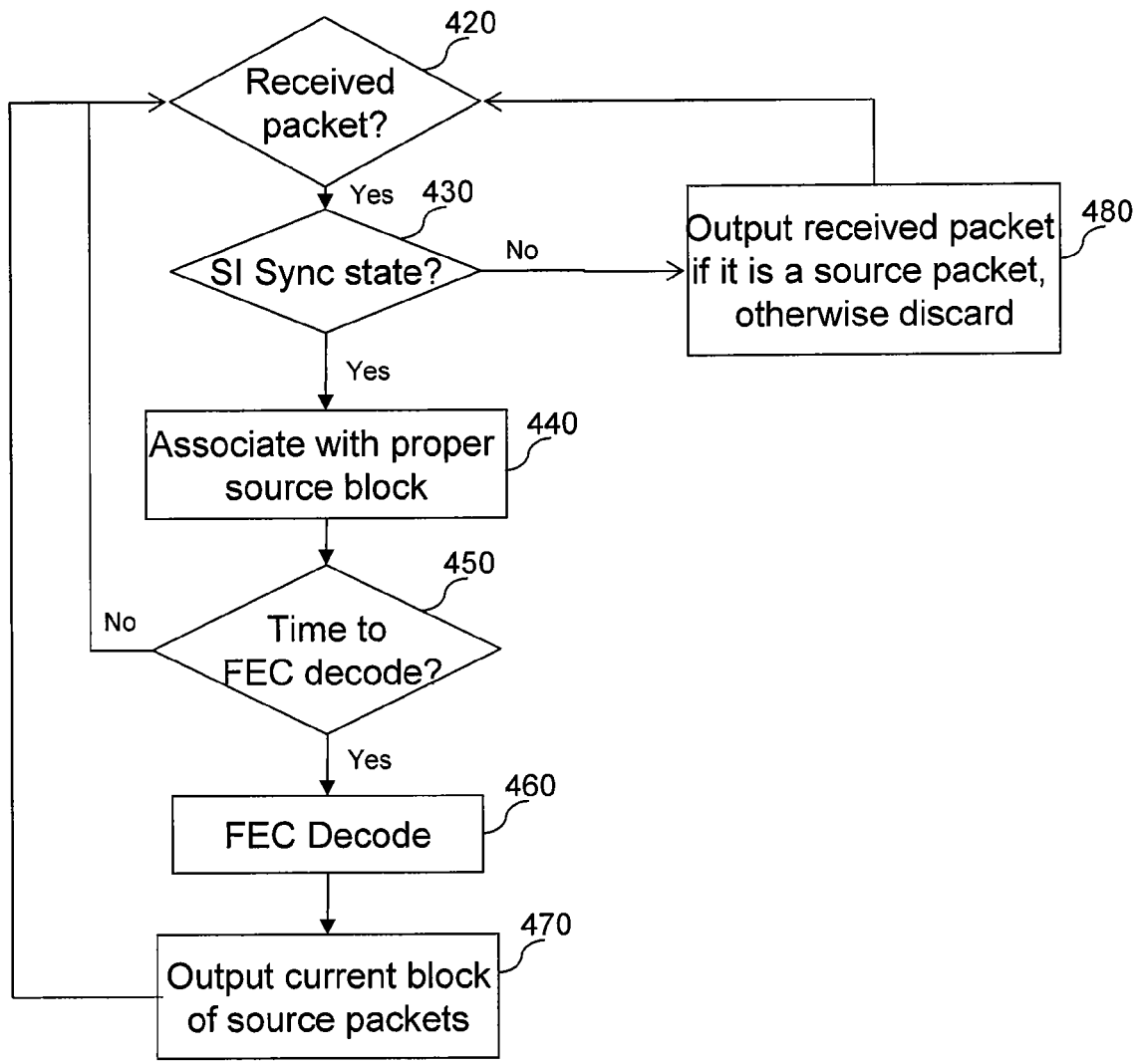
FIG. 4 is a flow chart for a possible FEC-enabled receiver.

FIG. 4 provides an example of a process flow chart that might be used within a receiving device that supports Source Identification methods and FEC methods. In step 420, the process monitors reception of packets, and when a packet is received the process moves to step 430. In step 430, the process checks to see if SI Sync state is the current state (corresponding to being at SI Sync 330 in FIG. 3). If SI Sync is the current state in step 430 then the process move to step 440. In step 440, the process associates the received packet with the appropriate source block based on Source Identification data, and the process proceeds to step 450. In step 450 the process checks to see if it is time to FEC decode the current source block, and if it is not then the process moves back to step 420 to receive additional packets, but if it is then the process move to step 460 and uses received source and repair packets, and the associated Source Identification data that relates repair packets to source packets, to FEC decode the current source block, and then in step 470 the current source block is output (to for example a media player on the receiving device), the next source block becomes the current source block, and the processing continues on to step 420. If SI Sync is not the current state in step 430 then the process move to step 480. In step 480, the received packet is output (to for example a media player device) if it is a source packet, otherwise it is discarded, and processing returns to step 420.

Many of the details are not shown in FIG. 4. For example, FIG. 4 does not show the reception of Source Identification data that is used to determine the association between source and repair packets and the order of packets, and that is used to determine the status of SI Sync state in step 430. There are many variants of the process shown in FIG. 4. For example, in step 420 multiple packets may be received before proceeding to step 430.

Relationship Between Packets and Symbols

Forward erasure correction codes often operate on symbols chosen from a fixed alphabet. For example, the symbols may be chosen from an alphabet of size $2^M$ in which case there is an obvious mapping between symbols and strings of M binary digits. Such symbols are hereinafter referred to as having a size of M bits. Data is often sent over a communications channel in the form of packets. In some cases, there is a one-to-one mapping between symbols and packets. In other cases, including for example those described in Luby II, packets may be larger than symbols, with a packet comprising several symbols. Additionally, symbols and packets may comprise the same data but the bit order and placement may differ, or additional information may be placed into the FEC symbols which is not contained explicitly within the packet, for example a binary representation of the packet length. Equally, data may be present in packets that are not present in the FEC symbols, for example data that does not need to be protected by the FEC code because it comprises fields that are not used or have the same value in every packet or because it could be recovered in other ways.

Retransmission methods may also be based on symbols, wherein a symbol may be a byte or some large unit of data. For example, a receiver may request a certain byte range from a file or from a stream of data to be resent.

Relationship Between Source Blocks and Symbols

Many forward error correction codes operate on discrete collections of source symbols, known as source blocks. For example, a source block may comprise all the source symbols of a file, or all the source symbols of a particular fragment in time of a streaming service.

Each source symbol is given a unique identification within the source block where it belongs. This identification is often not part of the source packet data, but it is often a piece of information used for the FEC decode process.

Retransmission methods may also be based on source blocks, and re-ordering methods may also be based on source blocks. For example, a source block may be of a size that conveniently fits into a receiver memory, and for example it may be convenient to identify a block of data that is brought into memory or written from memory to disk. As another example, a source block may be of a size that corresponds to an amount of data sent over a particular period of time, and for example it may be convenient to distinguish data that is sent during one period of time versus another period of time based on to which source block the data belongs.

In many of the embodiments of methods described herein source blocks are used. For one skilled in the art it should be recognized that source blocks are not an essential ingredient of the methods, and that there are variants of the methods that do not use source blocks.

Receivers

In order for a receiver to utilize the FEC repair data, the receiver often needs to be able to obtain Source Identification data, which may or may not be delivered to the same channel as the FEC repair data. It is usually necessary for the senders and receivers to use a same protocol in representing Source Identification data. An example of such a protocol is given in specific embodiments. The receiver uses Source Identification data to identify positions of received source packets within their source blocks, as well as positions of missing packets. The FEC repair data are then used to recover these missing packets if possible.

During the upgrade process, a legacy receiver can ignore both Source Identification information and FEC repair data, if received. It receives source packets as before the upgrade, and it will continue to perform at pre-upgrade level until being upgraded.

Source Identification Methods

There are many ways to represent and convey Source Identification data. In general there is a trade-off among bandwidth overhead, CPU load, and Quality of Service (QoS).

Uses of the Source Identification method include the ability to distinguish, identify or order among all source symbols or source packets or other source data units to be sent, for example among all source data that is to be sent for a file or stream. There are other cases where the Source Identification methods can be applied so that source data units that are in close proximity to other source data units (for example in the sending order, or sent within a small window of time) are to be distinguished, identified, or ordered, for example for a stream of data where the amount of reordering, distinguishing, or identifying needs to be only over the maximum amount of source data that is in flight between a sender and a receiver. In these cases, Source Identification methods that partition source data units into multiple source blocks or there equivalent might be appropriate, as methods for doing this are described later within this disclosure. The source block structure used by the Source Identification methods may or may not coincide with the source block structure used by FEC or retransmission methods, if used.

Many of the Source Identification methods described below use hash functions in their descriptions. One of the functions of hash functions is to map long strings to much shorter strings in such a way that distinct long strings are mapped to distinct shorter strings. Equivalently, the hash functions may map values to values. There are many possible hash functions that could be used for the purposes of the methods described herein, for example the hash functions described in the publication entitled "Pairwise Independence and Derandomization", Mike Luby and Avi Wigderson, Foundations and Trends in Theoretical Computer Science, Volume 1, Issue 4, 2005, Print ISSN 1551-305X, Online ISSN 1551-3068 (hereinafter "Hash Functions") could be used. There are many ways to represent a list of hash functions, some of which are described in "Hash Functions", for example by representing the bit sequences that determine how the hash functions are computed on a particular input, or by selecting a small list of hash functions from a family of hash functions and representing the hash function by an index into this list. One example of a possible hash function family can be described by the positive integers (a,b), where a and b range in value between 0 and a positive integer value P, where the hash function determined by the pair (a,b) maps an input X to (a*X+b) modulo P. In this example, a pair of values (a,b) can be used to indicate the selection of the hash function determined by (a,b) if P is fixed or determined by (a,b), or alternatively by the triple (a,b,P) if P is not determined by (a,b). The number of values in the range of a hash function is not restricted to be a prime number, there are well-known methods for hashing similar to those described here that allow the number of values to be any positive number. Another way to indicate a selected hash function from this same family of hash functions (or any family of hash functions) is with respect to a pre-determined list of triples of values $(a_1,b_1,P_1)$, $(a_2,b_2,P_2)$, . . . , $(a_i,b_i,P_i)$, where an index j can be used to indicate the selection of the hash function determined by $(a_j,b_j,P_j)$.

The description of a first Source Identification method follows. Suppose there are K different source data units (for example source packets or symbols) comprising the source data to be sent. Suppose all K source data units have distinct values. Let H be a hash function that maps the K source data units to K L-bit-vectors, $v(0), v(1), \ldots, v(k-1)$. If H is a random hash function then the probability that two of the K L-bit-vectors map to the same value is approximately $K^2/(2^{(L+1)})$, where "^" is the exponentiation function. Thus, to ensure that the K L-bit-vectors are distinct with probability at least 1-eps, the value of L should be approximately 2*log (K)+log(1/eps), where log is the logarithm base 2 operator. As a first example, if K=1000=1e3 and eps=1e−6, then L should be approximately 40 bits or 5 bytes, where "1e3" is the scientific exponential representation of $10^3$ =1000. As a second example, if K=1e6 and eps=1e−12 then L should be approximately 80 bits or 10 bytes. The Source Identification data can be simply the concatenation of the K L-bit vectors, concatenated in the order of the source data units, assuming that a sender and receiver can compute the same hash function H. A sender can compute the Source Identification data from the K source data units by applying the hash function H to each of the source data units to generate the K L-bit vectors. Upon receiving a source data unit, a receiver can apply H to the source data unit to compute the corresponding L-bit vector value, and then from the Source Identification data the receiver can distinguish, identity, and order the received source data unit among, the K source data units, i.e., this is an example of a determining sequencing method. In the first example above the Source Identification data is 5,000 bytes in size, and in the second example above the Source Identification data is 10,000,000 bytes in size. Both of these might be prohibitive in size for certain applications. For some uses of Source Identification data, for example some retransmission methods, a much shorter Source Identification data may be sufficient at the receiver to identify and request a source data unit. For example, in a NACK based retransmission method, the Source Identification data communicated to a receiver may be the description of the hash function H, and a receiver may compute the hash function H on each received source data unit and send to a sender the L-bit vectors to which the received source data units mapped. In this case, the sender can determine which source data units have not been received by the receiver based on which L-bit vectors are received, i.e., this is an example of a determining identification labels for known source data units method. Thus, the amount of Source Identification data communicated to the receiver explicitly may even be zero, assuming that the sender and receiver have pre-established which hash function H to be used. However, in this case a substantial amount of data in the form of source data unit labels may be communicated from a receiver to a sender in order to request retransmission of missing source data units.

A variant of the above Source Identification method is for the sender to repeatedly choose a new hash function H from a family of hash functions and apply H to the K source data units until hash function H maps the K source data units to distinct vectors. Note that L=2*log(K) is sufficient for H to map the K source data units to distinct vectors with probability at least ½. Thus, from a list of log(1/eps) random hash functions, there is at least one hash function that will map the K source data units to distinct vectors with probability at least 1−eps. In this case, the Source Identification data can be the concatenation of the index of the hash function H selected by the sender, the value of K and the K L-bit vectors. A receiver can use the Source Identification data to determine the index of the hash function H to use and the value of K, and then upon receiving a source data unit can apply H to that source data unit to determine the L-bit vector that distinguishes, identifies or orders the source data unit among the K source data units, i.e., this is an example of a determining sequencing method. If K=1,000 then the Source Identification data is 20 bits to identify the hash function, the value of K, and 1,000 20-bit vectors, or approximately 2500 bytes, and if K=1,000,000 then the Source Identification data is 40 bits to identify the hash function, the value of K, and 1,000,000 40-bit vectors, or approximately 5,000,000 bytes.

A third variant of a Source Identification data method follows. A sender can compute the Source Identification data as follows. A first hash function H is chosen to map the K source data units into K distinct L-bit vectors $u(1)$, $u(2), \ldots, u(K)$, for example using the first or second Source Identification data method described above. Let set $S_1 = \{0, 1, \ldots, K-1\}$. Note that in different variants, the size of $S_1$ may be larger or smaller than K, but in certain embodiments K can be a good choice for the size of $S_1$. Choose a hash function $H_1$ that maps L-bit vectors to $S_1$. Use $H_1$ to map $u(1)$, $u(2), \ldots, u(K)$ to $S_1$. A vector $u(i)$ is said to map uniquely with respect to $H_1$ if there is no j such that $u(j)$ maps to the same value as $u(i)$ with respect to $H_1$, and otherwise $u(i)$ is said to experience a collision with respect to $H_1$. If less than a threshold number of $u(1), u(2), \ldots, u(K)$ map uniquely with respect to $H_1$ then choose a new hash function $H_1$ and repeat the above process until the number of $u(1), u(2), \ldots, u(K)$ that maps uniquely with respect to $H_1$ is at least the threshold number. Note that for any i the probability that $u(i)$ maps uniquely with respect to a hash function $H_1$ that is chosen uniformly at random is approximately $1/e$, where e=2.718281828459045, and thus K/e is a reasonable choice of a threshold number, although other threshold numbers can be appropriate depending on the value of K, e.g., as K approaches zero the threshold number might approach or reach K. Once an appropriate $H_1$ is determined, initialize a K-bit vector $V_1$ to K zero bits. For every position j where there is an i such that $u(i)$ maps uniquely to position j with respect to $H_1$, set the jth bit of $V_1$ to one.

Let $u_1(1), \ldots, u_1(K_1)$ be the $K_1$ vectors out of the K vectors that experience collisions with respect to $H_1$. Let set $S_2 = \{0, \ldots, K_1-1\}$ and choose a hash function $H_2$ that maps L-bit vectors to $S_2$. Use $H_2$ to map $u_1(1), \ldots, u_1(K_1)$ to $S_2$. If less than a threshold number of $u_1(1), \ldots, u_1(K_1)$ map uniquely with respect to $H_2$ then choose a new hash function $H_2$ and repeat the above process until the number of $u_1(1), \ldots, u_1(K_1)$ that map uniquely with respect to $H_2$ is at least the threshold number, where the threshold value can depend on $K_1$. Initialize a K-bit vector $V_2$ to K zero bits. For every position j where there is an i such that $u(i)$ maps uniquely to position j with respect to $H_2$, set the jth bit of $V_2$ to one.

The above process can be repeated with additional hash functions $H_3, \ldots, H_h$ until all of $u(1), u(2), \ldots, u(K)$ map uniquely with respect to a hash function. In particular, $H_h$ uniquely maps $u_{h-1}(1), u_{h-1}(2), \ldots, u_{h-1}(K_h)$, where $u_{h-1}(1), u_{h-1}(2), \ldots, u_{h-1}(K_h)$ are the $K_h$ vectors out of the K vectors that experience collisions with respect to $H_1, \ldots, H_{h-1}$.

Figure 5A:
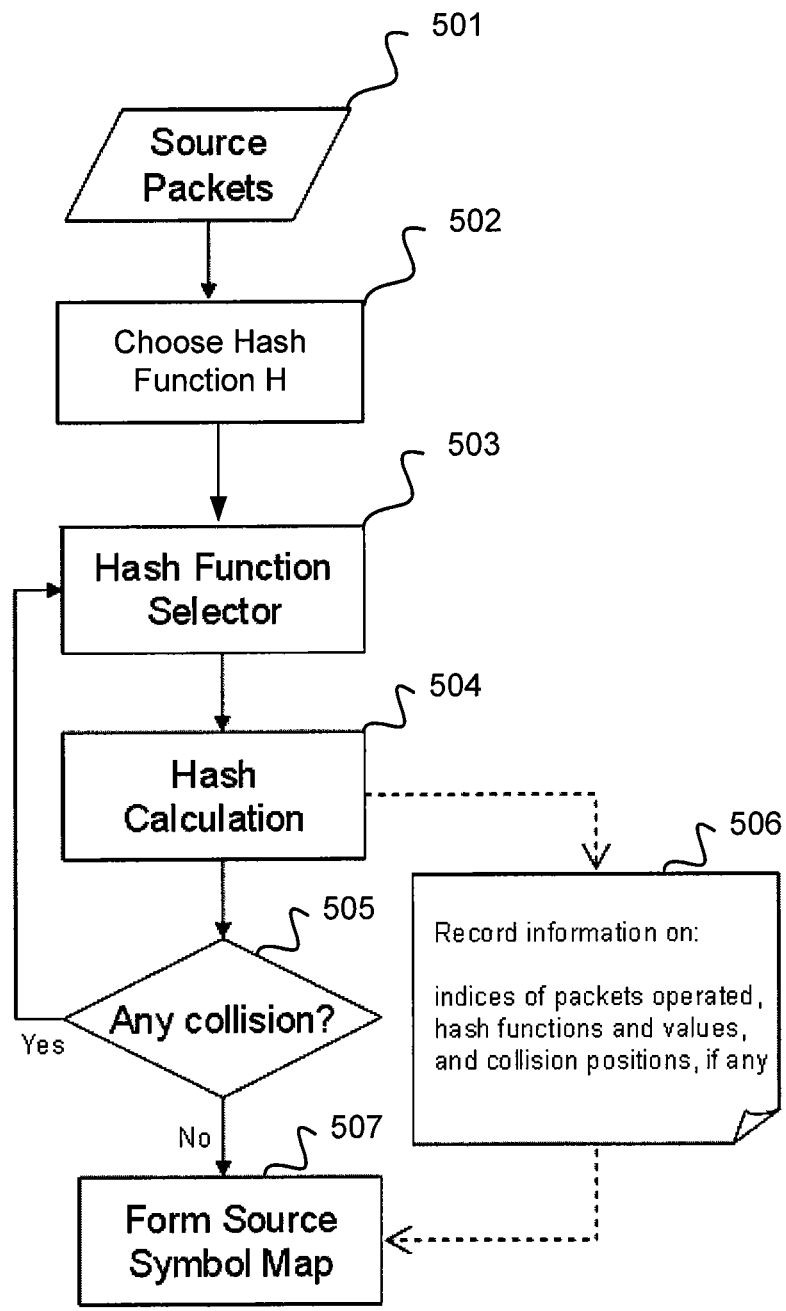
FIG. 5A is a flow chart that shows an example of one of the Source Identification data methods.

The steps of the third variant of a Source Identification data method are outlined in FIG. 5A. A hash function H is chosen (502) that maps the K source packets (501) to distinct vectors $u(1), u(2), \ldots, u(K)$. Next, a hash function is selected (503) to operate on the subset of the K vectors not yet mapped uniquely by a previous hash function (for the first hash function, the subset is the full set of K vectors). The selected hash function is then used to hash the subset of K vectors (504). During this hashing, information is recorded noting the indices of packets operated, hash functions and resulting values, and potential collisions (506). In one embodiment, this data is recorded in a bit vector. Next, the output of the hash function can be analyzed to determine whether any collisions have occurred (505). If there are collisions, the process is repeated with a different hash function. If the no collisions exist, then the recorded information (506) can be used to form a Source Symbol Map (507).

The Source Identification data or equivalently the Source Symbol Map can be the concatenation of the index of the hash function H, the value of K, the number h of additional hash functions, the indices of the hash functions $H_1, \ldots, H_h$, the values of $K_1, \ldots, K_{h-1}$, and the bit-vectors $V_1, \ldots, V_h$. The position of a source data unit can be determined as follows. Apply hash function H to the source data unit to generate an L-bit label u. Apply $H_1, \ldots, H_h$ consecutively to u until there is a first i such that u is uniquely mapped with respect to $H_i$, and let j be the position to which $H_i$ maps u. The position of the source data unit is the total number of bits in $V_1, \ldots, V_{i-1}$ that are set to 1, plus the number of bits in $V_i$ that are set to 1 within the first j bits. This method for determining the ordering of source data units and their positions is an example of a Source Identification method that enables a determining positioning method, i.e., the positions of the source data units are determined based on the Source Identification data, but the positions are not necessarily the sending positions of the source data units. If K=1000 and the threshold number K/e is used then the Source Identification data is the bits needed to identify the hash functions and the values of K, $K_1$, $K_2, \ldots, K_{h-1}$, followed by 2700 bits, or approximately 350 bytes. If K=1,000,000 then the Source Identification data is approximately 340,000 bytes. There are many alternatives and optimizations of this variant possible, as one skilled in the art will recognize, for example the sequence of values $K_1, \ldots, K_{h-1}$ could be chosen differently, the threshold numbers can be chosen differently, the bit-vectors $V_1, \ldots, V_h$ could be multiple bits per entry or a variable number of bits per entry, the last vector $V_h$ can be omitted if it is always the case that all of its bits are set to 1, etc.

Figure 5B:
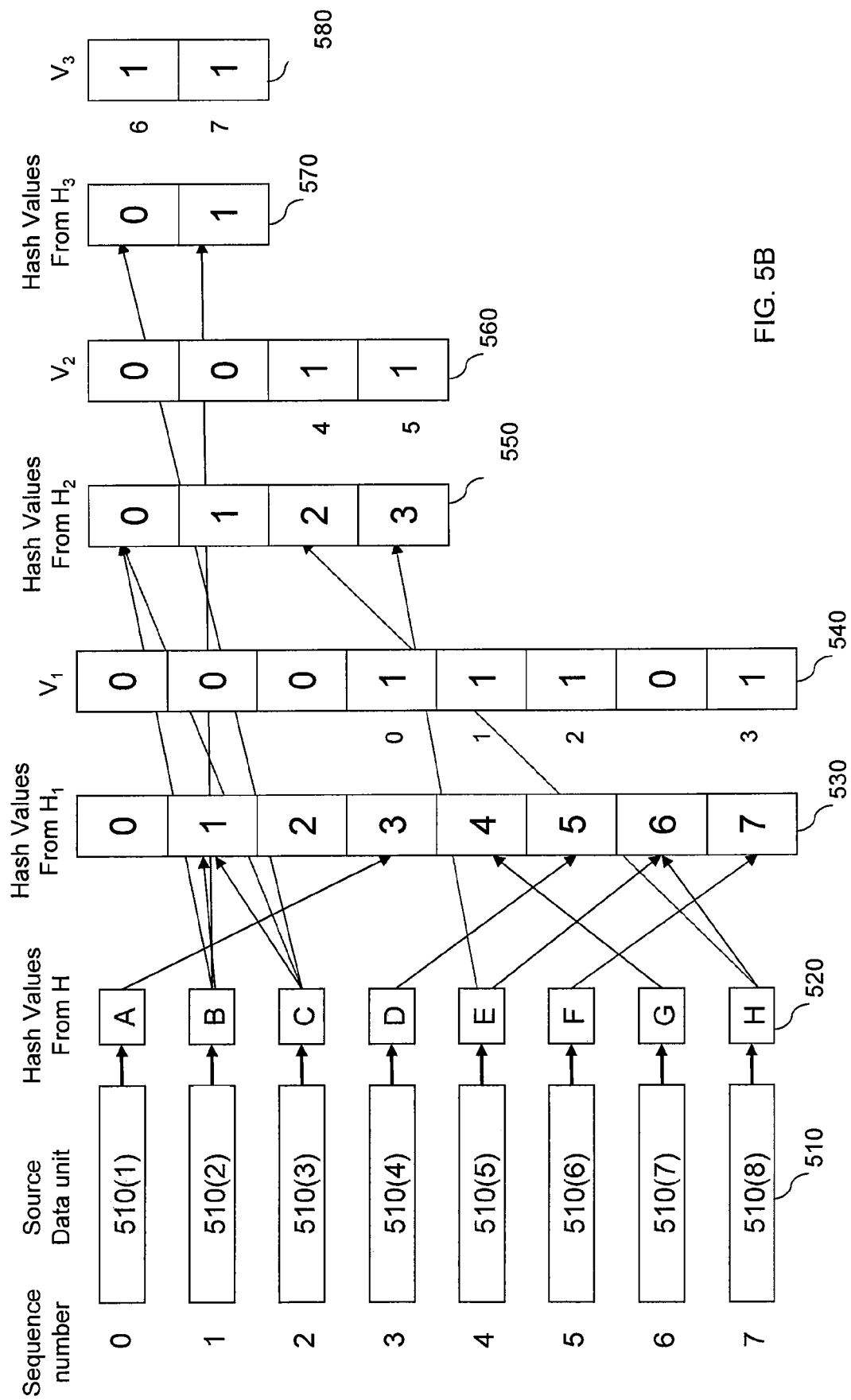
FIG. 5B is a block diagram that shows an example of one of the Source Identification data methods.

FIG. 5B is an illustration of the third variant of the Source Identification data method just described. In the example of FIG. 5B, there are eight data units (510(1), ...,510(8)) for which Source Identification data is to be generated. A first hash function H is chosen that hashes the contents of the eight data units (510) to a set of eight L-bit hash values (520), where H is chosen so that if the eight data unit contents (510) are distinct then so are the eight L-bit hash values (520), where in this example the eight L-bit hash values (520) are denoted A, B, C, D, E, F, G and H, respectively. Note that more than one candidate hash function might be chosen before a suitable hash function H is chosen that maps all source data units to unique hash values. Also note that in some embodiment, applying this initial hash function may be skipped, and the process outlines below may process by operating directly on the source data units (510) rather than on the hash values (520).

Referring to FIG. 5B, a second hash function $H_1$ is chosen that maps each of the L-bit hash values (520) to a hash value that ranges between 0 and 7, where the map defined by $H_1$ is indicated by the arrows from the hash values (520) to the hash values (530). Note that more than one candidate hash function might be chosen before a suitable hash function $H_1$ is chosen so that enough of the hash values (520) map to unique hash values (530), where in this example the threshold number might be that at least four of the hash values (520) map to unique hash values (530). In the bit-vector $V_1$ (540), a value of 1 for bit j indicates that there is a unique hash value (520) that maps to hash value j (530), and a value of 0 for bit j indicates that either zero or two or more hash values (520) map to hash value j (530). In this example, the first bit of $V_1$ is set to 0 because no hash value (520) maps to the value 0 (530) under $H_1$, the second bit of $V_1$ is set to 0 because the hash values B and C (520) both map to the value 1 (530) under $H_1$, the third bit of $V_1$ is set to 0 because no hash value (520) maps to the value 2 (530) under $H_1$, the fourth bit of $V_1$ is set to 1 because the hash value A (520) uniquely maps to the value 3 (530) under $H_1$, the fifth bit of $V_1$ is set to 1 because the hash value G (520) uniquely maps to the value 4 (530) under $H_1$, the sixth bit of $V_1$ is set to 1 because the hash value D (520) uniquely maps to the value 5 (530) under $H_1$, the seventh bit of $V_1$ is set to 0 because the hash values E and H both (520) map to the value 6 (530) under $H_1$, and the eighth bit of $V_1$ is set to 1 because the hash value F (520) uniquely maps to the value 7 (530) under $H_1$. In this example, hash values B, C, E and H (520) do not map to unique values, and thus these four hash values (520) are to be mapped with another hash function $H_2$ to four values 0 through 3 (550), resulting in a collision bit-vector $V_2$ (560). In this example, the hash values E and H (520) are mapped uniquely by $H_2$, whereas the hash values B and C (520) collide under the $H_2$ mapping, and thus the two hash values B and C (520) are to be mapped by another hash function $H_3$ to two values 0 through 1 (570), resulting in a collision bit-vector $V_3$ (580), and in this example all remaining values are mapped uniquely by $H_3$ and thus $H_3$ is the last hash function needed to complete the Source Identification data. The Source Identification data in this example comprises the value h=3, the values K=8, $K_1$=4, $K_2$=2, the representation of the hash functions H $H_1$, $H_2$, $H_3$, and the bit vectors $V_1$, $V_2$, $V_3$.

In the example shown in FIG. 5B, the indices just to the left of the collision bit-vectors $V_1, V_2$, and $V_3$ indicate the positions of the source data units so determined by this Source Identification data, i.e., position 0 corresponds to the packet with sequence number 0, position 1 corresponds to the packet with sequence number 6, position 2 corresponds to the packet with sequence number 3, position 3 corresponds to the packet with sequence number 5, position 4 corresponds to the packet with sequence number 7, position 5 corresponds to the packet with sequence number 4, position 6 corresponds to the packet with sequence number 2, and position 7 corresponds to the packet with sequence number 1. From this Source Identification data, a client can easily compute the positions of any received or missing of the eight source packets. Thus, for example, the positions could be used to order the source packets within a source block for FEC encoding and decoding purposes, and thus the Source Identification data is sufficient for FEC encoding and decoding of source data units. As another example, a receiver may compute the positions of all received source data units, and from this determine the positions of missing source data units. A receiver can send requests for missing source data units, identifying which source data units are being requested via their positions, and a sender can determine which source data units to send in response based on the requested positions. This third variant is an example of a Source Identification method that enables a determining positioning method.

As a fourth variant, the Source Identification data of the third variant can be augmented to include mappings between the sequencing of the K source data units (where for example their sequencing corresponds to the original source data order or as another example to the source data sending order) and their corresponding positions described above for the third variant. For example, the additional sequencing data can comprise an ordered list SEQ=<$seq_0, seq_1, \ldots, seq_{K-1}$> of K sequence numbers, where $seq_j$ is the sequence number of the data unit that has position j. This additional sequencing data can thus comprise a position to sequence mapping.

Figure 6A:
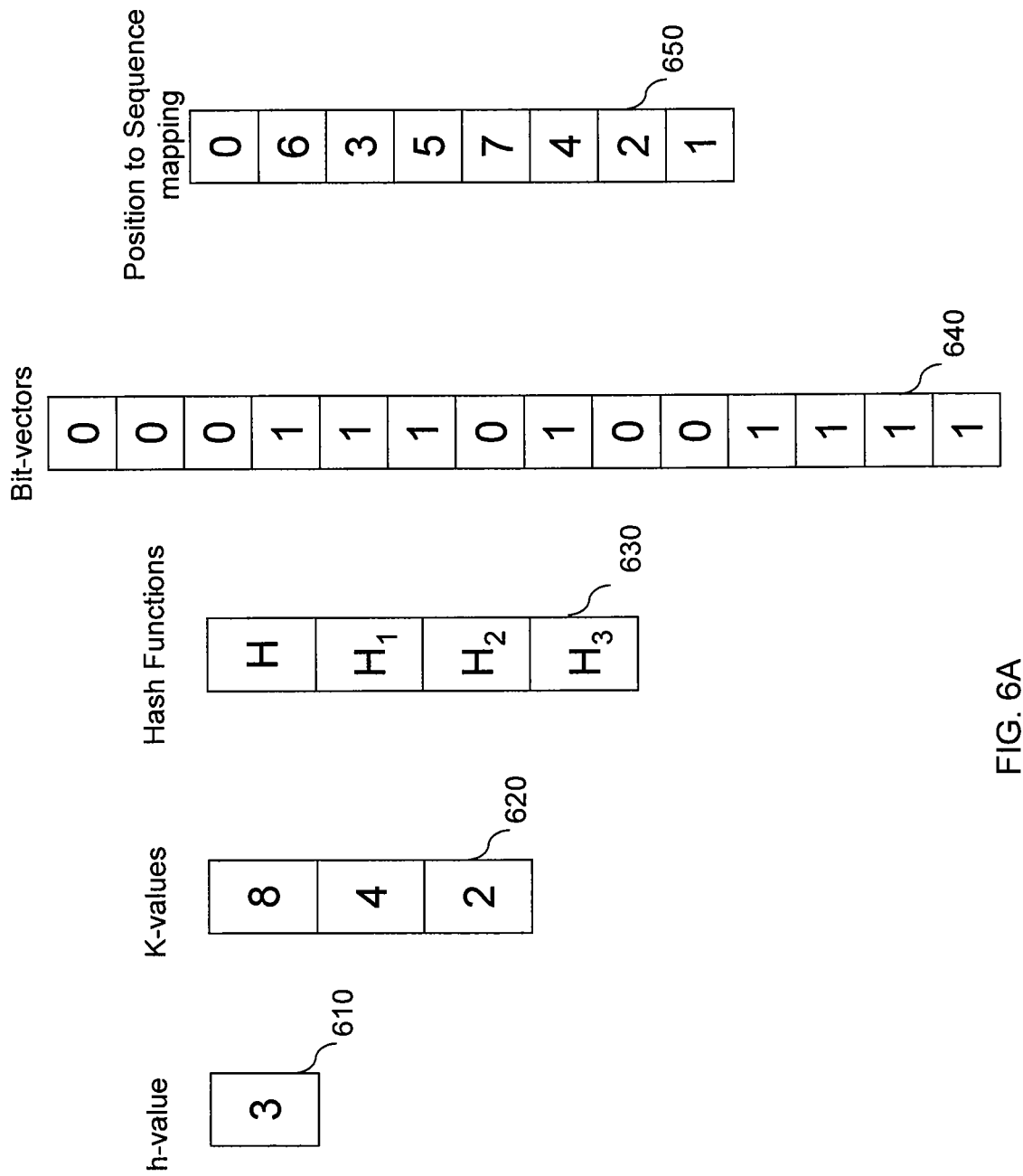
FIG. 6A is a block diagram that shows an example of the formation of some Source Identification data.

An example of the Source Identification data for this fourth variant is shown in FIG. 6A, which is an augmentation of the example shown in FIG. 5B. For the example of FIG. 5B, K=8 and h=3. As shown in FIG. 6A, the h-value is 3 (610), the K-values are K=8, $K_1$=4, $K_2$=2 (620), the four hash functions are H, $H_1, H_2, H_3$ (630), the bit vectors $V_1, V_2, V_3$ of respective sizes 8, 4 and 2 are shown concatenated in (640), and the additional sequencing data comprising K=8 sequence numbers is shown in (650). In this case, the source data unit that is mapped to position 0 according to the hash functions is the source data unit with sequence number 0, the source data unit that is mapped to position 1 has sequence number 6, the source data unit that is mapped to position 2 has sequence number 3, the source data unit that is mapped to position 3 has sequence number 5, the source data unit that is mapped to position 4 has sequence number 7, the source data unit that is mapped to position 5 has sequence number 4, the source data unit that is mapped to position 6 has sequence number 2, and the source data unit that is mapped to position 7 has sequence number 1.

Figure 6B:
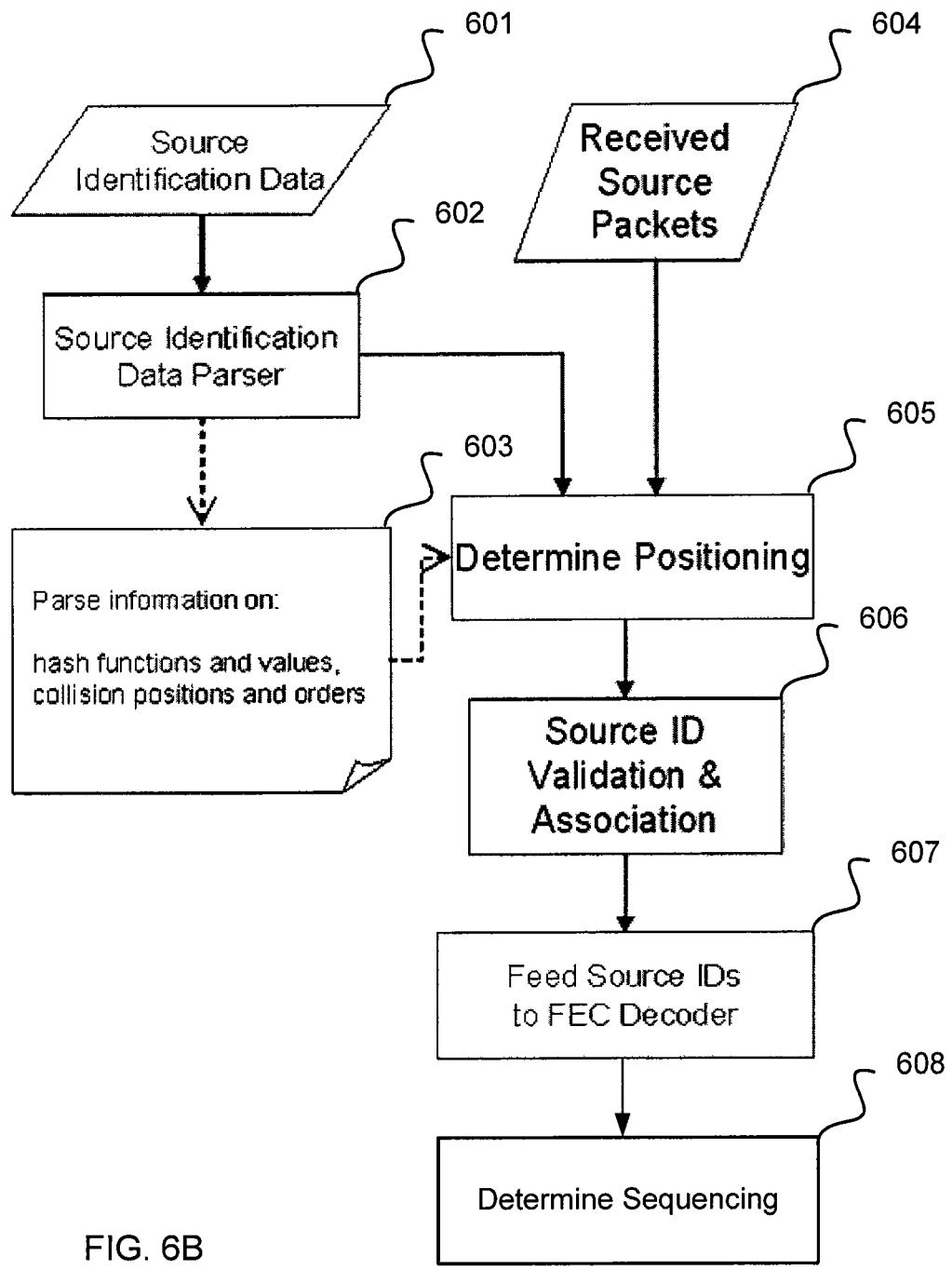
FIG. 6B is a flow chart that shows how a receiver may use Source Identification data to calculate identification information for unmodified received source packets.
Figure 7:
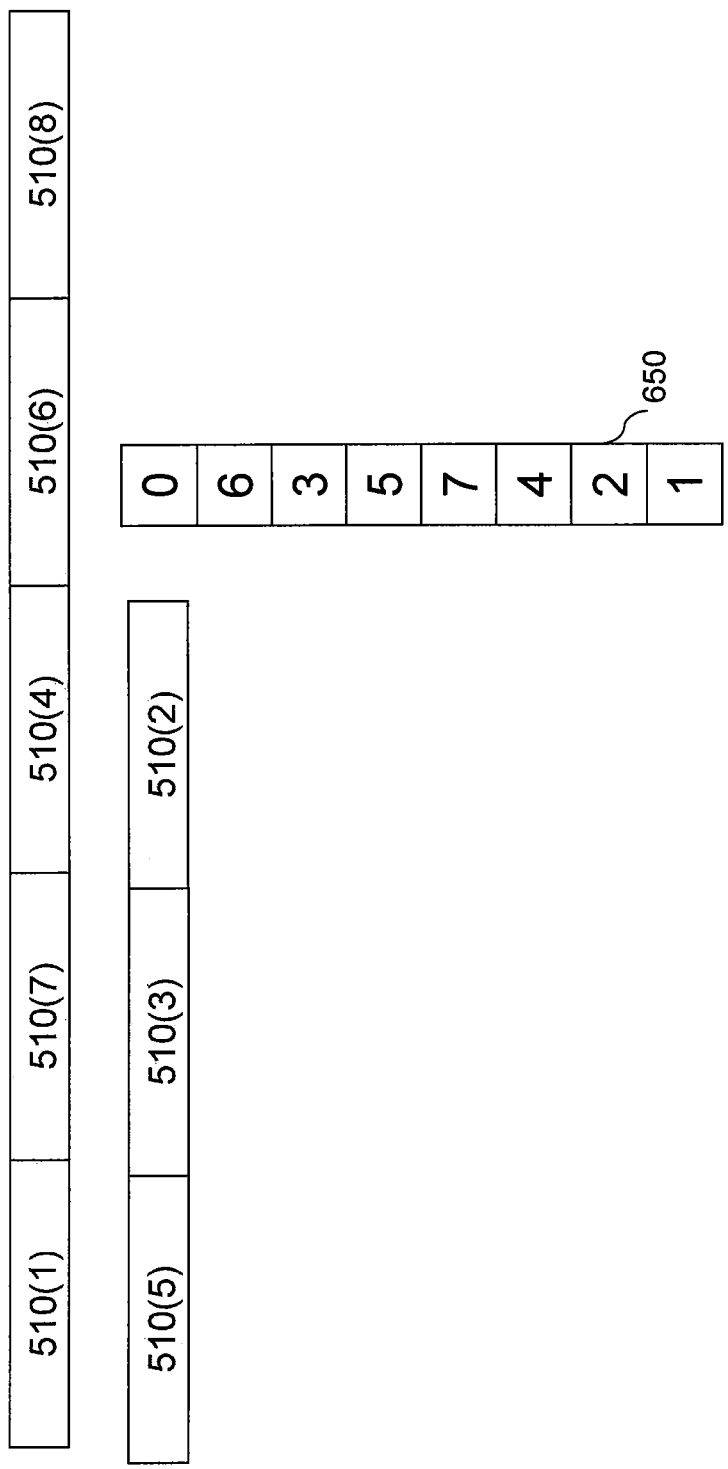
FIG. 7 is a block diagram that shows an example of the formation of some Source Identification data.

For this fourth variant, Source Identification data is sufficient to distinguish, identify and determine the order of the K source data units, i.e., this is an example of a Source Identification method that enables a determining sequencing method. The additional size of the Source Identification data for this fourth variant is K*log(K) beyond the size of the Source Identification data in the third variant. For example, if K=1,000 then the additional Source Identification data size beyond that of the third variant is 1250 bytes, and if K=1,000,000 then the additional size is 2,500,000 bytes. In some implementations of this fourth variant, the portion of the Source Identification data that corresponds to the third variant can be sent to a receiver that enables determining positions of source data units, this can be used to FEC decode the source block (where the ordering of the source data units within the source block are according to their positions), and the additional portion of the Source Identification data that enables determining sequencing of source data units is included within the source block that can be recovered using FEC decoding methods. For example, referring to FIG. 6A and FIG. 6B, the h-value (610), the K-values (620), the hash function descriptions (630) and the bit-vectors (640) can comprise the Source Identification data that is communicated to a receiver in order to determine the positions of the source data units in a source block. This is Source Identification data can be in the form of a Source Symbol Map (601). The information contained in the Source Symbol Map can be parsed (602) to extract the data outlined in FIG. 6A except not including the position-to-sequence mapping (650). (This is also illustrated at 603.) The Source Symbol Map can then be used in a determining positioning method, involving a number of hash calculations and collision resolutions (605), on the received source data units. In one embodiment, the received source data units can be in the form of source packets (604). The received symbols can be validated and associated with positioning information (606) before being fed to an FEC decoder (607). The position-to-sequence mapping data (650) can comprise the Source Identification data that is included in a source block that is available after FEC decoding and used to determine the sequencing of the recovered source data units (608). FIG. 7 shows an example of position-to-sequence mapping data (650) included in a source block comprising a number of Source Data Units (510(1-8)). In FIG. 7, the position-to-sequence mapping data (650) is appended to the end of the Source Data Units (510(1-8)) included in the source block where the order of the source data units in the source block is determined by the position information.

As another variant, the Source Identification data can be further augmented to include the size of each source data unit. This variant is generally not used if all source data unit are the same or approximately the same size. This variant enables the positions of variable size source data units to be more precisely determined.

Figure 8A:
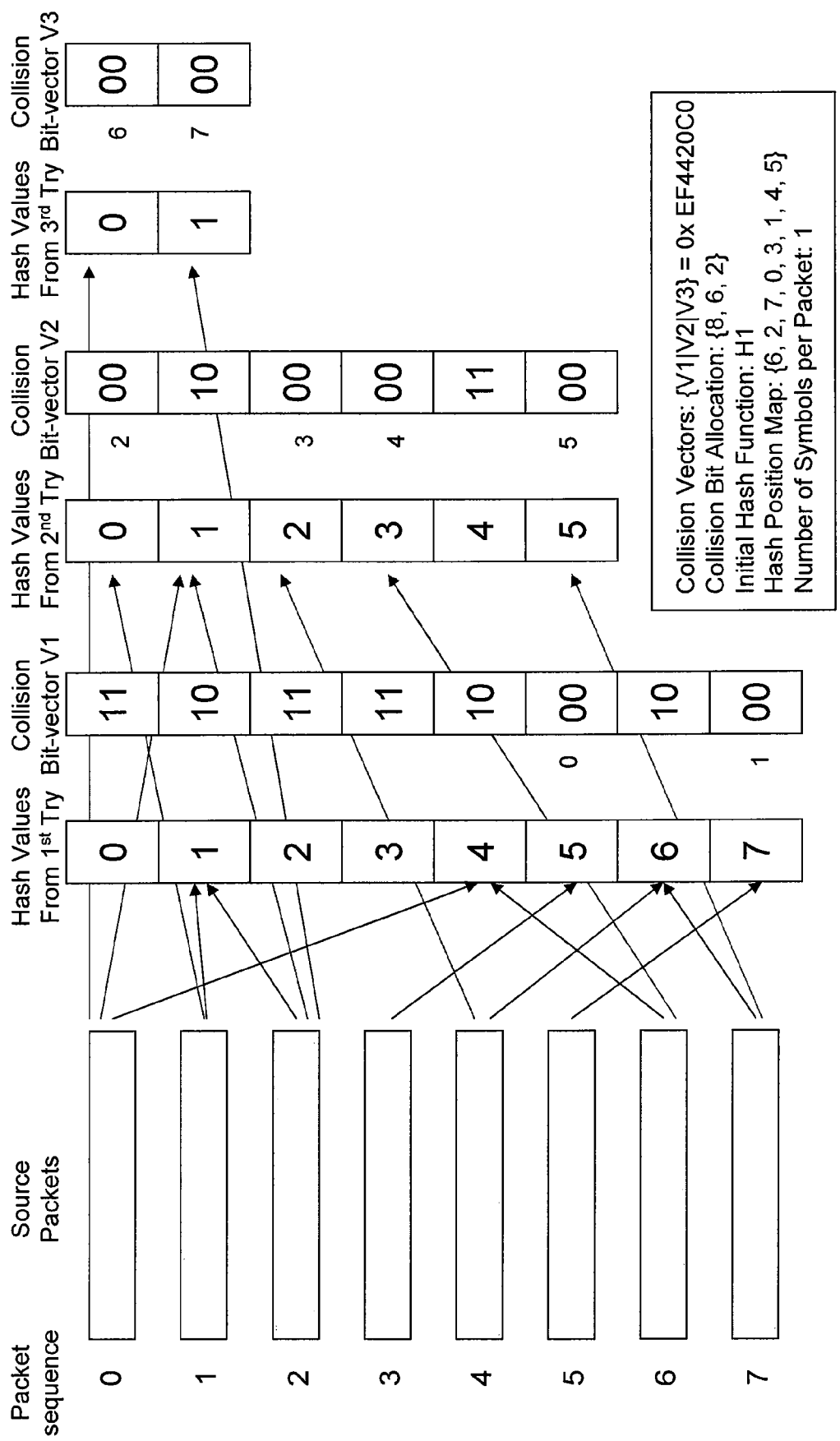
FIG. 8A is a block diagram that shows an example of some of the further details of the formation of Source Identification data.

FIG. 8A is a example of another embodiment of Source Identification data similar to the example in FIG. 5B. One difference between the example shown in FIG. 5B and the example shown in FIG. 8A is that the Bit-Vectors in FIG. 8A include two bits of information rather than just one. This extra data can be used to communicate more details on any collisions, or lack thereof, for the hashing operation at a given level. For example, in FIG. 8A, "11" is used to indicate that none of the hashed values mapped to a particular location in the Bit-vector; "00" is used to indicate that a particular location in the bit vector maps to a unique source packet, and "10" is used to indicate that more than one source packet maps to a particular location. One skilled in the art will recognize that other similar schemes can be used to communicate information such as this.

Figure 8B:
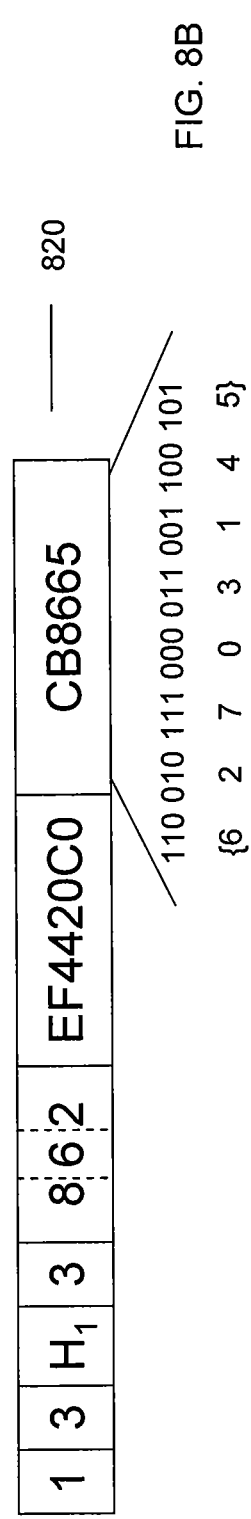
FIG. 8B is a block diagram that shows an example of a possible Source Identification data format.

FIG. 8B illustrates an example of Source Identification information formatted in a data structure (810). The data structure can then be used in a variety of ways. One skilled in the art will recognize that there are many possible formats for the Source Identification information. Any data structure used to organize the Source Identification information can be inserted into each packet or spread across multiple packets that may be optionally FEC protected that is then transmitted to a receiver.

In the data structure (810) embodiment illustrated in FIG. 8B, the approximate size of each of the illustrated fields is listed below the field in bytes. The size of the fields may vary between difference embodiments of the data structure in FIG. 8B, G represents the number of symbols per packet. If G equals 0, this indicates that there are variable length packets. H represents the number of modulo hash attempts used to create the Source Identification information. F is the initial hash function index. Check is a checksum of a source block. B is the hash position map bit allocation. L is the hash collision vector lengths for each iteration of the hashing. In FIG. 8B, L is 2 bytes each for first 2 levels, 1 byte each thereafter. V stores the actual hash collision vectors. M stores the hash position map. In FIG. 8B, each value takes B bits. B1 is an optional field that is only applicable with G=0. B1 stores the bit allocation for variable packet symbol number. M1 is another optional field that is only applicable with G=0. M1 stores the number of symbols in the packets.

FIG. 8B also illustrates an example (820) of this general format using data from FIG. 8A.

How a Receiver Uses the Source Identification Data.

The protocol communicates between senders and receivers the number of hashed packets $\{K, K_1, \ldots, K_n\}$, collision vectors $\{V, V_1, \ldots, V_n\}$, and hash functions $\{H, H_1, \ldots, H_n\}$, where $H_n$ results in no collision, i.e., $V_n$ is all 0's. In addition, we also communicate the mapping between the positions of all K source packets and their corresponding hashed position within vectors $\{V, V_1, \ldots, V_n\}$, as well as the number of symbols in each source packet.

As an example of how receiver can determine the sequence number for a received source data, suppose a receiver receives the fifth source data unit (510(5)) according to the example shown in FIG. 5B. The receiver applies H to this source data unit to obtain the hash value E (520). The receiver applies $H_1$ to E (520) to obtain 6 (530). Since $V_1$ at position 6 is equal to 0 (540), the receiver determines that there is a collision of E (520) with respect to $H_1$ with respect to some other hash value (520), and thus applies $H_2$ to E (520) to obtain 3 (550). Since $V_2$ at position 3 is equal to 1 (560), the receiver determines that E (520) maps uniquely with respect to $H_2$. The receiver can determine the position of this source data unit determined by the hash functions by counting the number of 1's in $V_1$ and adding that to the number of 1's in $V_2$ up to but not including the 1 in position 3 of $V_2$, which is equal to 5 and thus the position of the fifth source data unit is 5. Referring to FIG. 6A, the receiver can determine the sequence number of the fifth source data unit by looking in position 5 of the position-to-sequence mapping (650), which is equal to 4 and thus the sequence number of the fifth data unit is 4. By using similar processes for each received source data unit, the receiver can determine the sequence number of each received source data unit, and since the sequence numbers are consecutive starting at 0 and proceeding up to K−1, this allows the receiver to determine the sequence numbers of all missing source data units.

Figure 9:
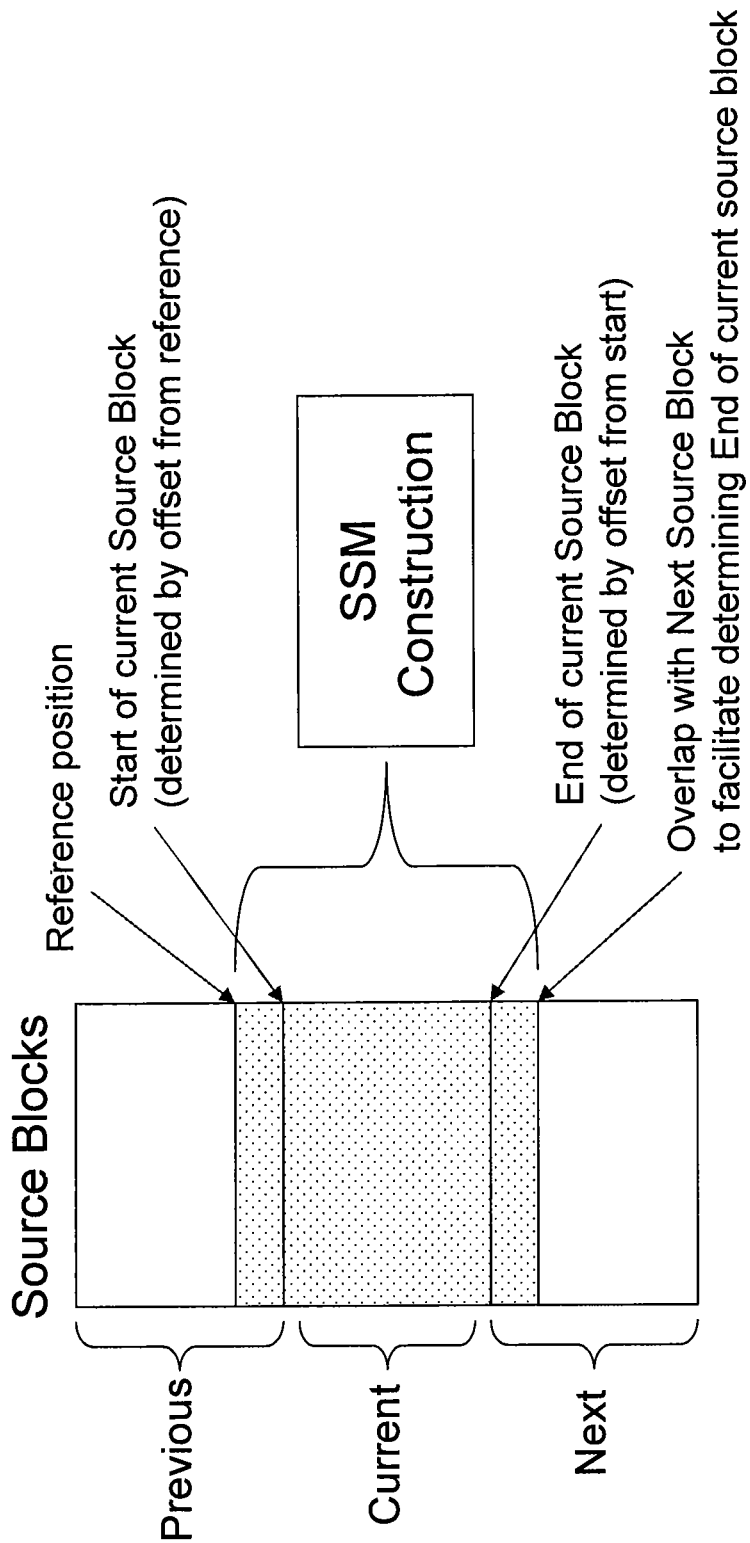
FIG. 9 is a block diagram that shows an example of source block boundaries and overlap with neighboring source blocks in the formation of Source Identification data.

One potential difficulty is the identification of a particular source block when the Source Identification data is used to identify a portion instead of the entire source data, as the source packets themselves may not contain that information, and there may not be an existing synchronization protocol for determination and communication of source block boundary. One possible solution is to use the above Source Identification communication protocol over a wider range of source packets than the source block of interest, i.e., the generated Source Identification data may overlap with previous and next source block. An example of this solution is illustrated in FIG. 9. The source block boundary may be signaled and communicated with respect to its relative position within the entire range of source packets involved. The wider the range of overlap, the more robust this protocol becomes, with the cost of extra bandwidth overhead as well as CPU load.

FIG. 10 illustrates an example of one embodiment, similar to the example shown in FIG. 8B, but where the structure of the Source Identification data has been modified to include a new field, "O," that represents the offset from reference. The offset from reference, as illustrated in FIG. 9, can determine the amount of overlap in the generated Source Identification data between source blocks. This offset can be used to determine the overlap of source data units at both the beginning and at the end of the source block with other adjoining source blocks, respectively. Any packets received within this offset range (that below to adjoining source blocks) can be discarded with respect to determining the sequencing and positioning of source data units within the source block covered by this Source Identification data. (Other Source Identification data that covers adjoining source blocks to which these discarded packets belong can handle determining how these packets are sequence or positioned within these other adjoining source blocks.)

Figure 11A:
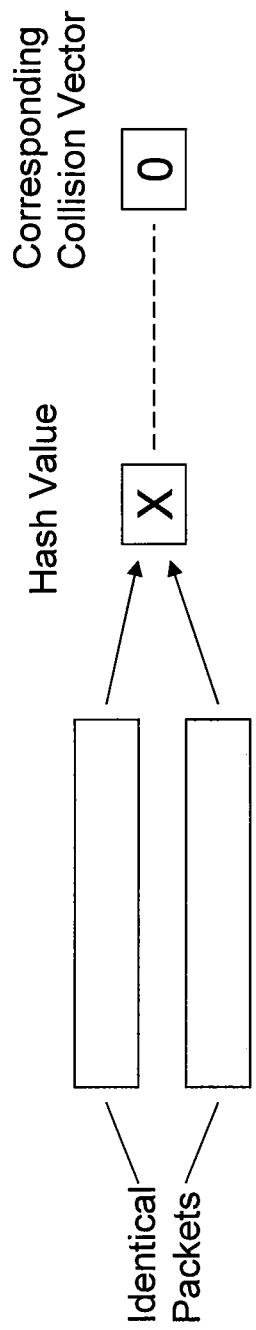
FIG. 11A is a block diagram that shows an example of two identical packets hashing to the same value.

Another potential problem is that two or more source packets within a single source block may be identical. These identical packets will always have hash collision regardless of the hash function applied to the packets. In the hash position map, both packet sequences will map to the same hash position. This is illustrated in FIG. 11A.

Figure 11B:
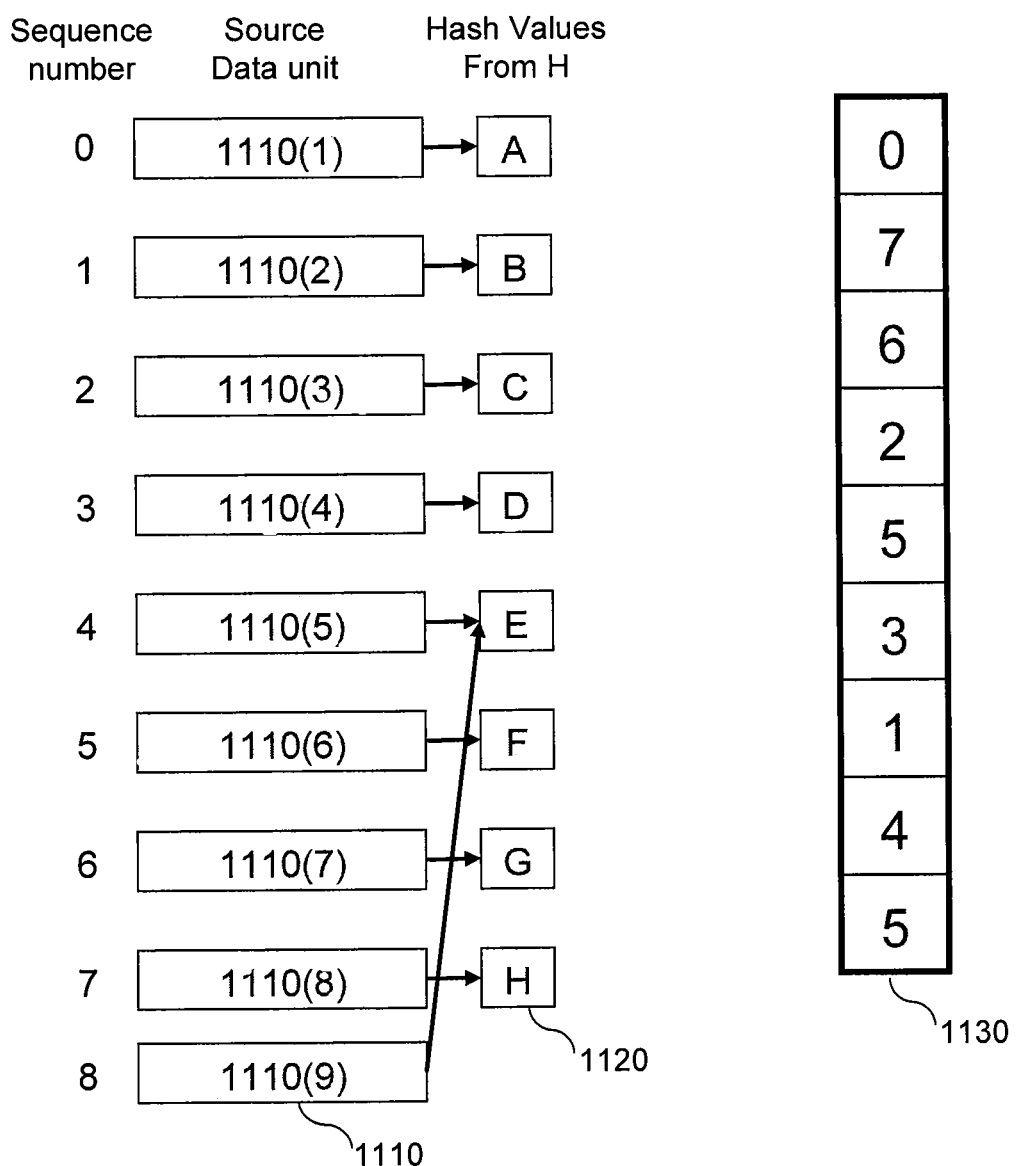
FIG. 11B is a block diagram that shows a sequence-to-position mapping that can handle identical packets.

A method can be devised that indicates which source packets are identical and communicates this piece of information to the receiving device. This method thus reduces the problem for the receiver to just dealing with source packets that are all different from each other, in which case the aforementioned protocol can be applied. For our communications purpose, a collision resulting from identical packets is NOT marked in the collision bit vectors assuming that the two packets are identical and that they don't collide with any other different packets in a hash function. The same output value implies the existence of identical source packets. An example of such a method is the following. Instead of using a position-to-sequence mapping, for example (650) as shown in FIG. 6A, use a sequence-to-position mapping. Then, each identical packet, independent of its sequence number, maps to the same position, and for each identical packet the sequence-to-position map can list at its sequence number the same position to which it maps. For example, suppose there are nine source data units (1110) as shown in FIG. 11B with corresponding hash values from H shown (1120), which are the same hash values (520) shown in FIG. 5B. Suppose the positioning determined by these hash values (1120) is the same as shown in FIG. 5B. Then, the sequence-to-positioning mapping (1130) shows that the identical source data units with sequence numbers 4 and 8 are both mapped to the source data unit in position 5. When using this method, it might be useful to indicate both the number of source data units in the sequence and the number of unique source data units as part of the Source Identification data, e.g., 9 and 8 in the example of FIG. 11B.

Figure 12:
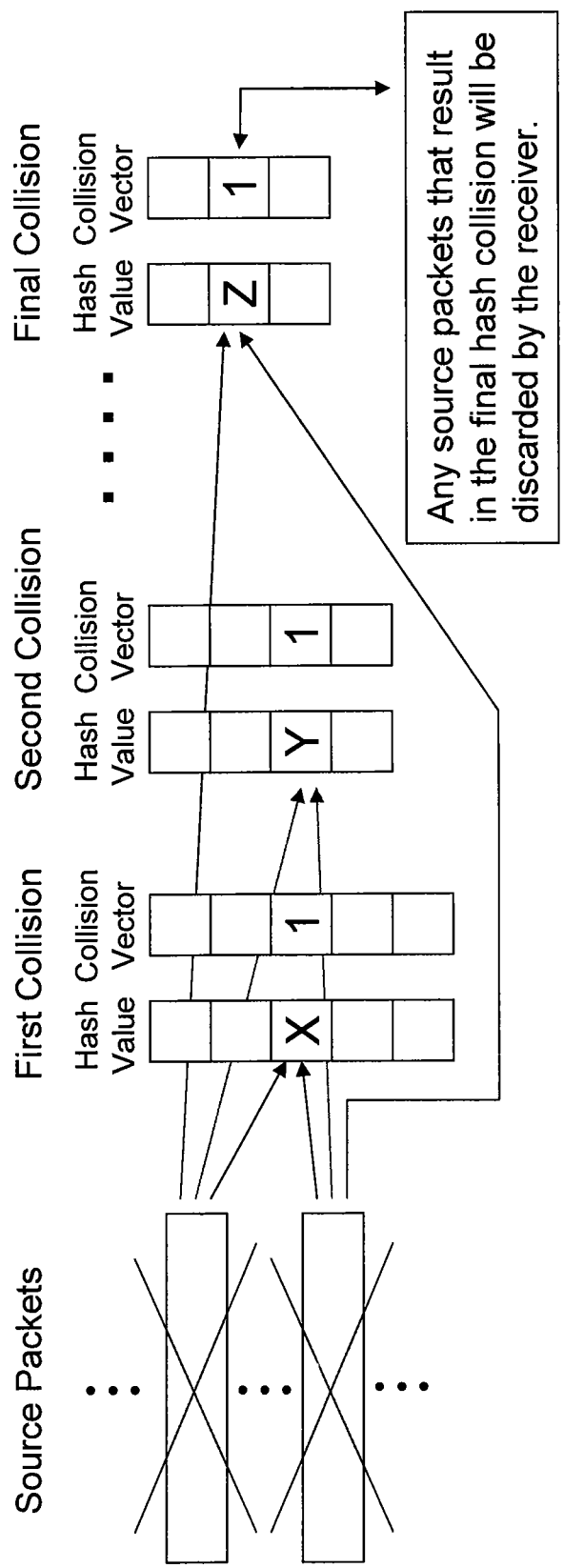
FIG. 12 is a block diagram that shows an example where non-identical packets hash to the same value.

Another potential problem is that there may be rare cases that different packets will still collide after every available hash function has been applied to the packets. This can happen due to limited hash function selection pool, or due to insufficient amount of time allocated to resolve the collision. In these cases, the last collision bit vector will have one or more bits marked for "final collision". The receiver will simply discard the packets whose hash collision cannot be resolved. This potential solution is illustrated in FIG. 12.

The use of Source System Maps to identify source data offers many advantages. For example, Source System Maps are reasonably efficient in size since they only require about an additional 4 to 12 bits of data for each source packet for some of the embodiments described for some values of K ranging up to a couple of hundred. Also, multiple hash function help to reduce CPU load. Low complexity hash functions are operated first; higher complexity hash functions then operate later on many fewer packets. Another advantage is that no additional method is needed to resolve hash collision. Also, Source System Maps are flexible to hash function design or replacement.

Reliable Transmission of Source Identification Data

Depending on network configuration, the Source Identification data may be either combined with FEC repair data in a single channel, or independently transmitted. Since this piece of information can be crucial in packet recovery and/or reordering process, it is preferred to apply forward erasure correction techniques on the Source Identification data. Note that the FEC applied on the Source Identification data does not have to bear any relationship with the FEC code on the original source stream. It may or may not be the same FEC code, it may or may not be systematic. In addition, spreading the transmission of these Source Identification data packets (and their FEC repair part) can be beneficial because the transmission is then more resilient to burst erasure. Another technique is to combine all or parts of the Source Identification data with the FEC repair data generated from the original source stream, if possible, in order to further reduce bandwidth overhead. In cases where the Source Identification data is not used with FEC repair data of the original data, it can still be preferable to FEC protect the Source Identification data.

In one embodiment, the source symbol map can be transmitted along with FEC data (such as data generated using a chain reaction code). The result is that a receiver can receive two streams—one stream with unmodified source data, and a second stream with FEC data for the original stream (chain reaction repair data) and Source Symbol map data. The source symbol map data can in turn also have its own FEC data.

Figure 13:
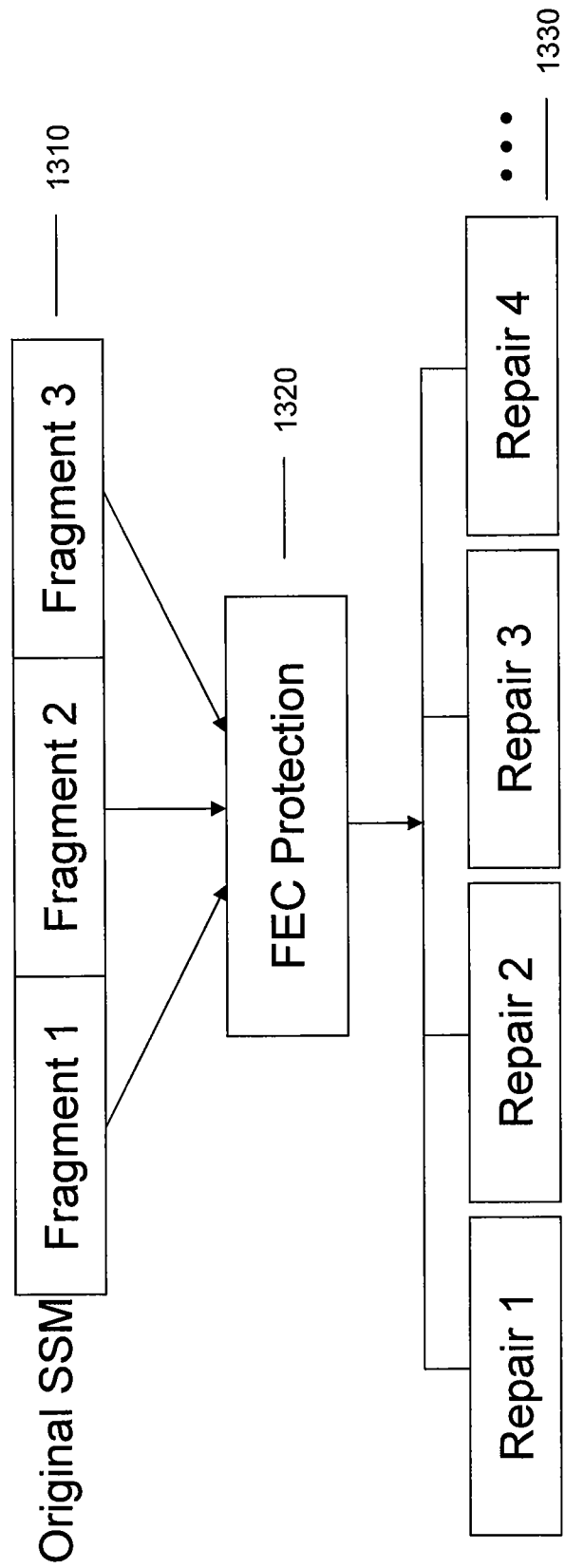
FIG. 13 is a block diagram that shows how Source Identification data may be FEC protected.

FIG. 13 shows one example of a method that generates FEC repair data from a Source Symbol Map. In FIG. 13, the Source Symbol Map is first broken in a number of fragments (1310) that are then used as the input to an appropriate FEC Protection scheme (1320). The FEC Protection scheme generates a set of repair data (1330) that can then be transmitted along with the original Source Symbol Map. In one embodiment, sequence numbers are applied to the fragments of the Source Symbol Map (1310) and the repair data (1330) so that if there are J Source Symbol Map fragments, then the Source Symbol Map fragments are assigned sequence numbers ranging from 0 to J−1, and the repair data is assigned to sequence numbers beginning with J and progressing upwards from J.

Figure 14:
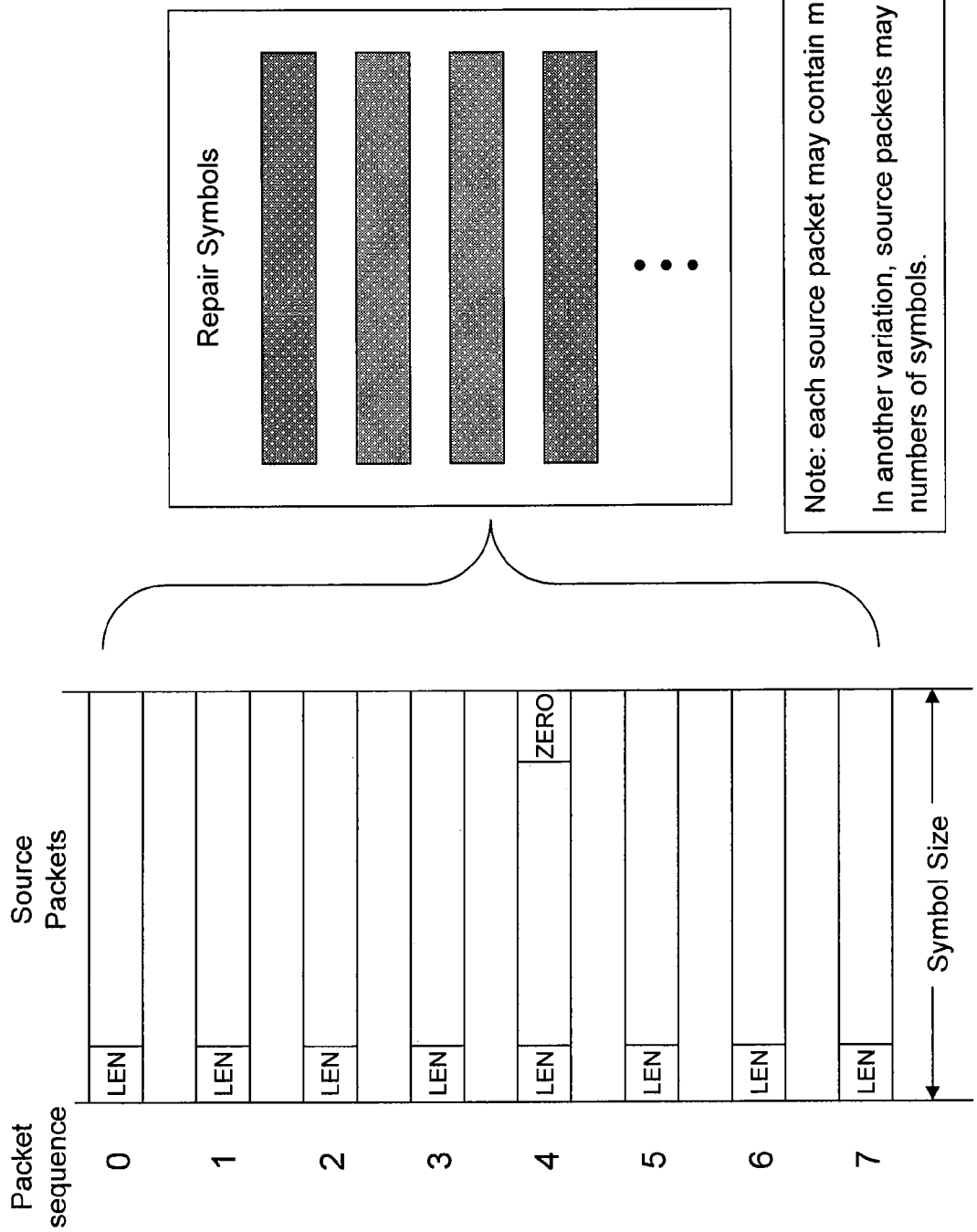
FIG. 14 is a block diagram that shows how FEC repair symbols may be generated from unmodified source packets.

FIG. 14 is an illustration of repair symbols being generated from source packets. In one embodiment, the repair symbols are generated using a chain reaction code. As referenced in FIG. 14, source packets may contain multiple source symbols and source packet may each contain a different number of symbols.

FIG. 15 illustrates the structure of a repair packet information in one embodiment wherein the repair packet contains both FEC data and Source Identification data. In the embodiment shown in FIG. 15, the Source Identification data is in the form of a source symbol map. In FIG. 15, R represents the number of FEC repair symbols in the packet. In a rare case R may be 0 if there are no repair symbols in the packet. SBN represents the Source Block Number that is protected by this packet. In the embodiment shown in FIG. 15, SBN can range from 0.0-4095. PP is the protection period provided by the FEC scheme. In the embodiment illustrated in FIG. 15, PP is in units of 10 ms. SBN and PP can both be used to enhance the synchronization of the stream. ESI is the Encoding Symbol ID of first FEC repair symbol in the packet. K is the number of source symbols in the source block. J is the SSM fragment sequence number. X is the number of original SSM fragments. Consecutive FEC repair symbols within the same packet have consecutive encoding symbol IDs. The SSM fragment can comprise either original Source Identification data or FEC repair data for an original Source Identification data fragment.

Figure 16:
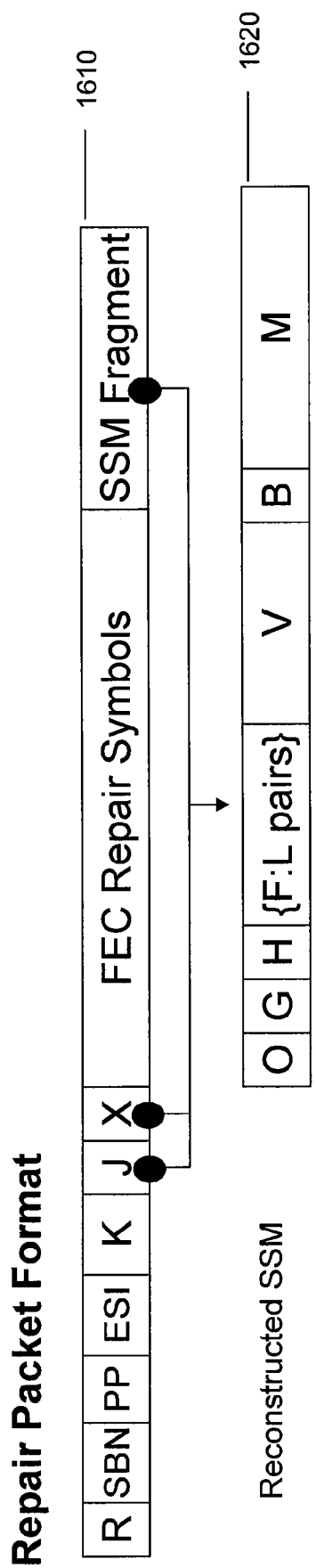
FIG. 16 is a block diagram that shows a possible partial reconstruction of Source Identification information from Source Identification data carried in a packet.

FIG. 16 illustrates one example embodiment showing how a Source System Map can be reconstructed using the fields from the data structure illustrated in FIG. 15. In FIG. 16, fields J, X, and the SSM fragment from the repair packet (1610) are expanded to show what SSM data may be carried in FEC repair packets protecting the original source data in one embodiment.

Figure 17:
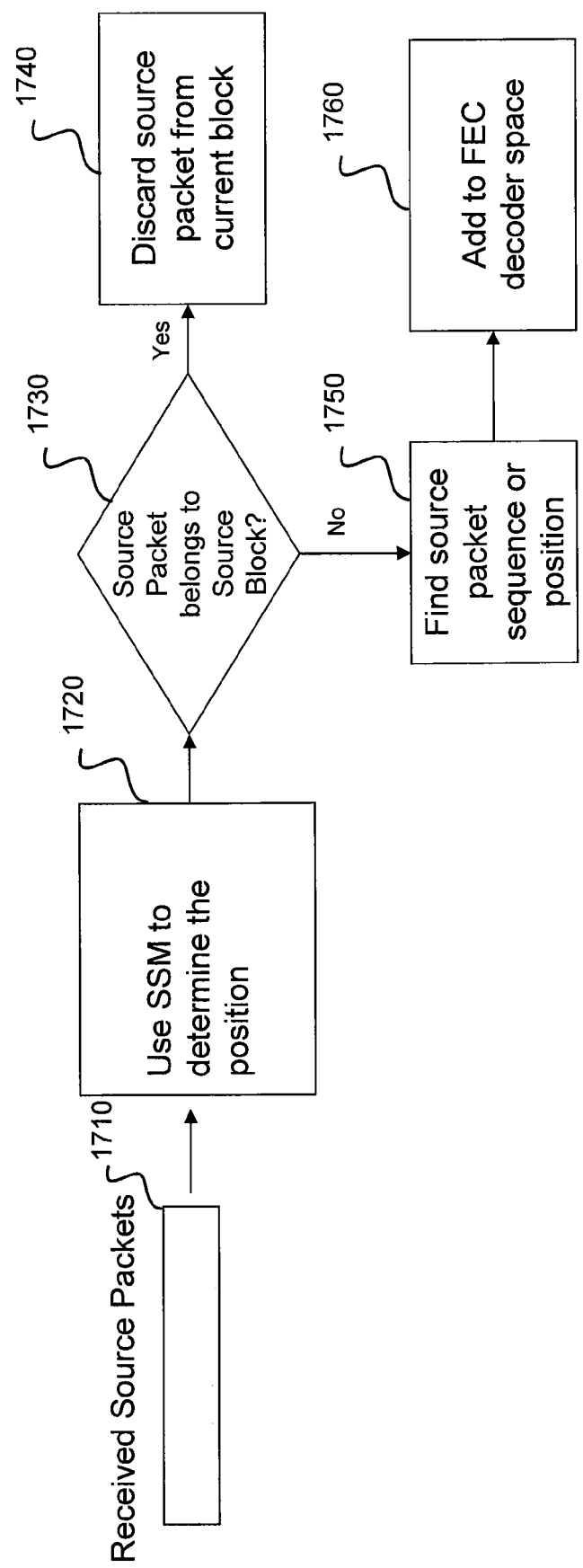
FIG. 17 is a flow chart that shows an example of how a receiver may use Source Identification information to process received source data.

FIG. 17 is a flow chart illustrating how a receiver can use a Source System Map to apply to Source Symbols received by the receiver. The SSM information is applied (1720) to received source packets (1710). If the receiver is unable to identify a unique position for the source packet or if the process outputs an invalid result for any reason (1730), for example the source packet is not within the valid range of positions or sequence numbers for this source block, the source packet can be discarded (1740) from this source block. If the mapping is successful, Source Symbol positions and/or sequencing can be extracted from the Source Symbol Map (1750) and associated with the source symbols. The source symbols can then be passed onto a FEC decoder, such as a chain reaction decoder (1760), for further processing, such as recovery of the source block.

Transmission Error Handling

In many embodiments, the data streams transmitted from an encoder to a decoder are transmitted over a network in a series of packets. In many such networks, there are many potential errors that can occur in the transmission of the packets. Packets can be lost, packets delivery can be delays, and packets may be duplicated during transmission and the decoder may receive identical packets at different times. In some embodiments, a decoder is subject to time-constraints and may time-out the decoding of a given source block after a period of time. However, the nature of the network may result in packets being delivered to a receiver after the relevant source block has already timed-out. Below are some examples of how a receiver can treat various packet errors. None of the examples below are meant to give an exhaustive list of how various errors can be handled by a receiver.

Figure 18:
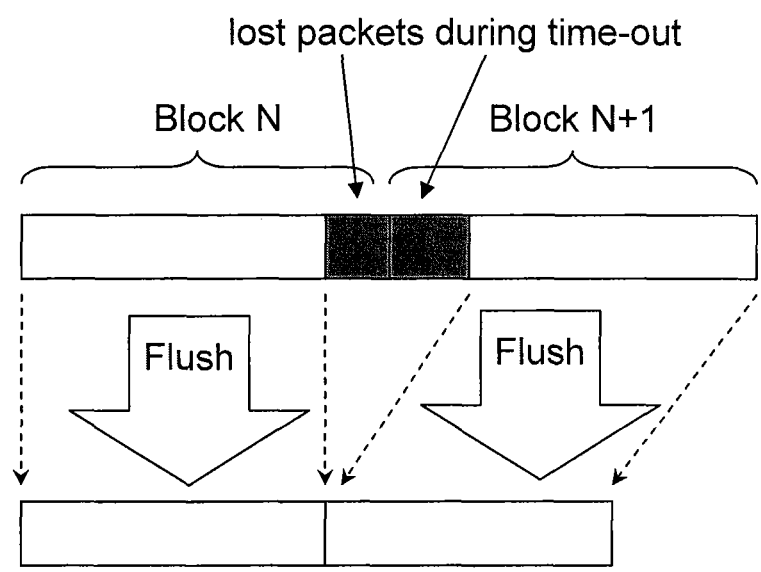
FIG. 18 is a block diagram that shows lost packets during a reception time-out at a receiver that spans two source blocks.

FIG. 18 illustrates a packet reception time-out wherein the lost packets span two blocks. If it is possible that source packets can be associated with the wrong block, both blocks can be flushed to the application. As used herein, flushing can mean that no attempt is made to decode those blocks; the source packets are returned as is. Alternatively, flushing can mean that the source packets are simply discarded. Operation for block N+2 will return to normal receiving and decoding. Occasionally the time-out may be associated with lost packets spanning more than two blocks. In such cases, the source packets in between can be stored in a temporary block and then ultimately can be flushed to the application.

Figure 19:
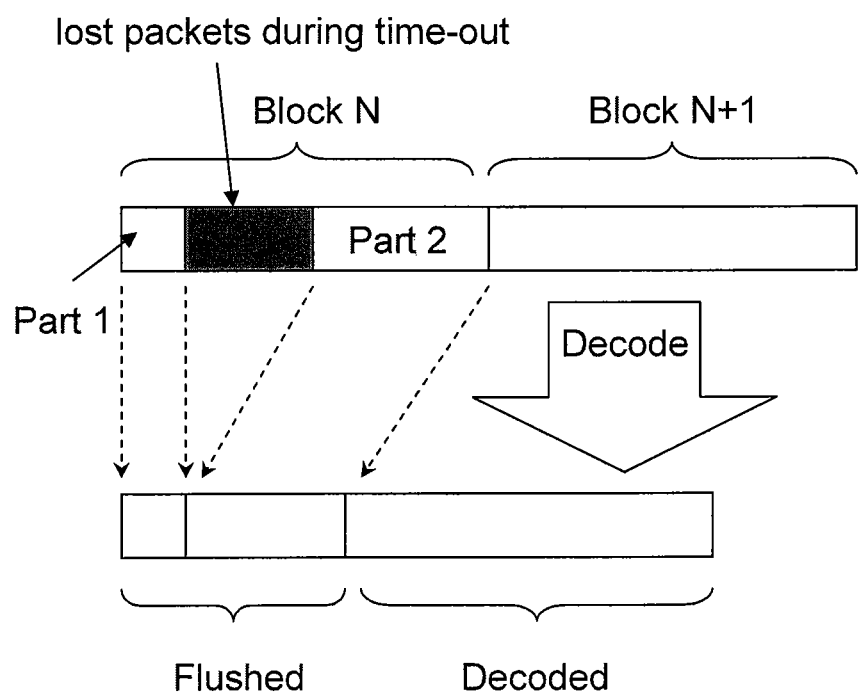
FIG. 19 is a block diagram that shows lost packets during a reception time-out at a receiver that occurs early in a source block.

FIG. 19 illustrates early burst loss early in a source block. The packets that belong to block N are flushed to the application. The operation on block N+1 can proceed with normal receiving and decoding.

Figure 20:
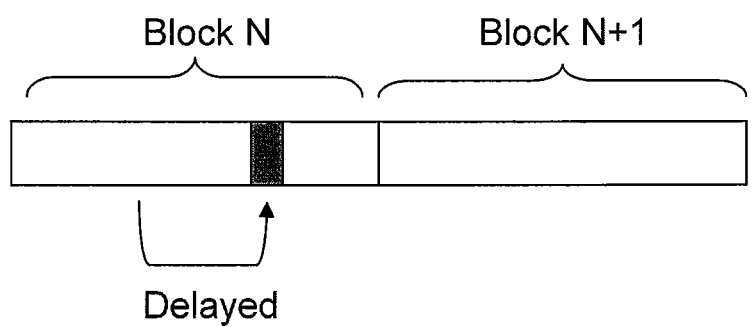
FIG. 20 is a block diagram that shows delayed packets within a source block during a reception at a receiver.
Figure 21:
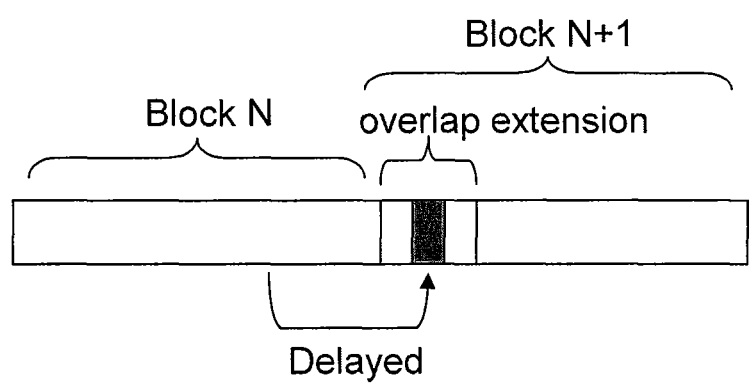
FIG. 21 is a block diagram that shows delayed packets between source blocks during a reception at a receiver.

FIGS. 20 and 21 illustrate delayed packets that are received either within the same block or within an extended block. In both situations, the delayed packets can be correctly identified within block N with no special handling. Receiving and decoding operations proceed as normal for source block N and for source blocks after N.

Figure 22:
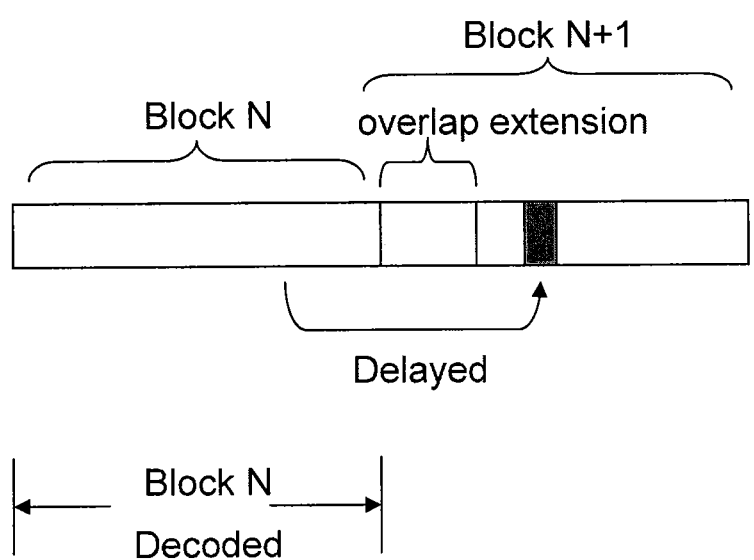
FIG. 22 is a block diagram that shows delayed packets during a reception at a receiver that cross beyond an extended block.

FIG. 22 illustrates a delayed packet that crosses beyond an extended block. Block N will be decoded as usual. For block N+1, there are three possible scenarios for what can happen to the delayed packet. The first possibility is that the delayed packet is deemed invalid. For example, the packet may not correctly hash to any packet ID contained in the SSM. In this case, the packet is discarded and block N+1 will be decoded as normal. The second possibility is that the delayed packet is assigned a packet ID according to the SSM on block N+1, but this assigned packet ID coincides with the ID of another packet received for block N+1. In this scenario, no attempt is made to decode block N+1 and block N+1 is flushed to the application. The third possibility is that the delayed packet is assigned a packet ID according to the SSM on block N+1 and no other packet in block N+1 assumes this packet ID. In this scenario, decoding is attempted on block N+1 and the checksum of recovered block is relied upon to invalidate this decoding attempt. The invalidation results in returning to app only received source packets for block N+1.

Figure 23A:
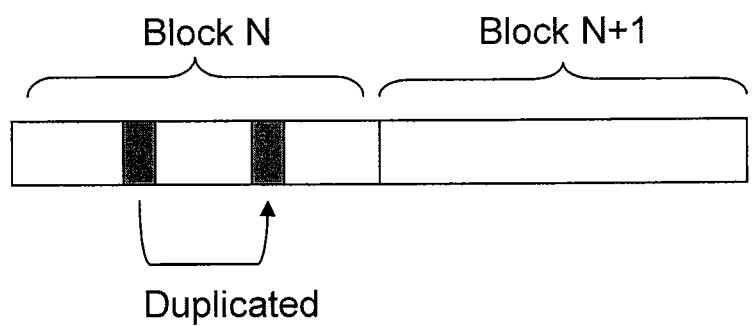
FIG. 23 is a block diagram that shows duplicate packet reception at a receiver within an extended block.
Figure 23B:
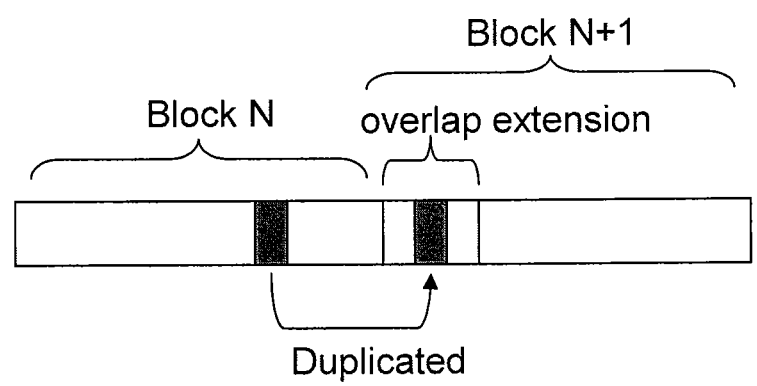

FIG. 23A/23B illustrate a duplicated packet received within extended block. In both situations, the duplicated packets can be correctly identified within block N. Receiving and decoding operations can easily proceed as normal.

Figure 24:
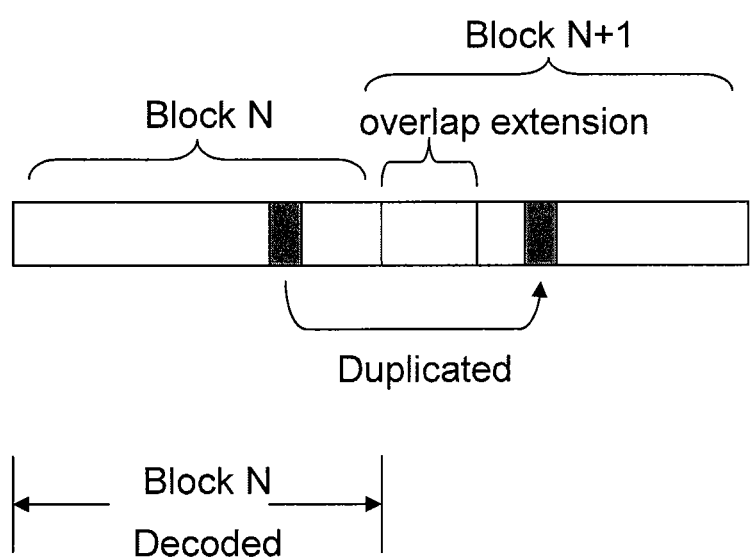
FIG. 24 is a block diagram that shows duplicate packet reception at a receiver beyond an extended block.

FIG. 24 illustrates a duplicated Packet received crossing beyond an extended block. Block N will be decoded as usual. For block N+1, there are three possible scenarios for what can happen to the duplicated packet. The first possibility is that the duplicated packet is deemed invalid. For example, the packet may not correctly hash to any packet ID contained in the SSM. In this case, the packet is discarded and block N+1 will be decoded as normal. The second possibility is that the duplicated packet is assigned a packet ID according to the SSM on block N+1, but this assigned packet ID coincides with the ID of another packet received for block N+1. In this scenario, no attempt is made to decode block N+1 and block N+1 is flushed to the application. The third possibility is that the duplicated packet is assigned a packet ID according to the SSM on block N+1 and no other packet in block N+1 assumes this packet ID. In this scenario, decoding is attempted on block N+1 and the checksum of recovered block is relied upon to invalidate this decoding attempt. The invalidation results in returning to the application only received source packets for block N+1.

Case Studies

Below are a number of case studies showing characteristics of the described methods on a variety of different systems. These are case studies of streaming applications where an FEC code is used to add FEC repair packets to protect the original stream, and where each SSM covers a small portion of the entire data stream. In all of these case studies, Each source data packet carries 7 MPEG-2 TS units, where each MPEG-2 TS unit is 188 bytes.

The symbol size is chosen to be 1320 bytes in order that each source packet is one symbol. Each repair packet carries one FEC repair symbol and other data such as all or parts of an SSM.

The SSM is either carried in whole in each FEC repair packet or is carried in parts within FEC repair packets.

Each SSM covers one source block of data to which FEC protection is to be applied, and each SSM carries some overlapping information about adjoining source blocks in order to filter out packets from those source blocks.

In each case a maximum packet size of 1500 bytes is desired in order to avoid packet fragmentation when sending packets over a network.

In each case, two values are derived: $P_{SSM}$ and $P_{FEC}$. $P_{SSM}$ is the probability that not enough packets arrive for the source block to recover the SSM data, whereas $P_{FEC}$ is the probability that not enough packets arrive for the source block to recover the source block assuming an ideal FEC code. These probabilities are calculated assuming random and independent packet loss under the loss conditions stated for each case.

Case Study 1

The source data stream rate is 4 Mbps.
SSM coverage period (=protection period): 125 ms
Loss conditions: 0.1%
Derived parameters:
    Number of packets in a source block=48
    Number of repair packets=3
SSM considerations:
    Number of packets used for SSM (5 packet overlap on each end)=58
    Number of hash functions=5
    Hash collision vector allocation≈20 bytes
    Hash position map allocation≤58 bytes
    The SSM length is less than 100 bytes, and thus the entire SSM can be carried in each FEC repair packet.
Failure Rates:
    $P_{SSM}=(0.1\%)^3=10^{-9}$
    $P_{FEC}=2.4*10^{-7}$ Case Study 2

The source data stream rate is 4 Mbps.
SSM coverage period (=protection period): 250 ms
Loss conditions: 0.7%
Derived parameters:
    Number of packets in a source block=95
    Number of repair packets=9
SSM considerations:
    Number of packets used for SSM (10 packet overlap on each end)=115
    Number of hash functions=5
    Hash collision vector allocation≈40 bytes
    Hash position map allocation≈114 bytes
    Entire SSM length 168 bytes
    The SSM is split into 2 segments
    FEC protection is used to generate another 9−2=7 repair SSM segments
    Each FEC repair packet carries one SSM segment
Failure Rates:
    $P_{SSM}=5.156*10^{-17}$
    $P_{FEC}=4.052*10^{-9}$ Case Study 3

The source data stream rate is 6 Mbps.
SSM coverage period (=protection period): 500 ms
Loss conditions: 0.7%
Derived parameters:
    Number of packets in a source block=285
    Number of repair packets=25
SSM considerations:
    Number of packets used for SSM (30 packet overlap at each end)=345
    Number of hash functions=7
    Hash collision vector allocation≈120 bytes
    Hash position map allocation≈400 bytes
    Entire SSM length 538 bytes
    The SSM is split into 5 segments
    FEC protection is used to generate another 25−5=20 repair SSM segments
    Each FEC repair packet carries one SSM segment
Failure Rates:
    $P_{SSM}=6.879*10^{-42}$
    $P_{FEC}=1.887*10^{-15}$ FIG. 25 is a failure rate chart for a 4 Mbps stream for varying protection periods and protection amounts under 0.7% loss conditions. A conclusion that can be drawn from this data is that the probability of decoding failure due to incomplete SSM is far less than that due to insufficient number of FEC received symbols.

Multiple Stream/Retransmission Embodiment

Figure 26:
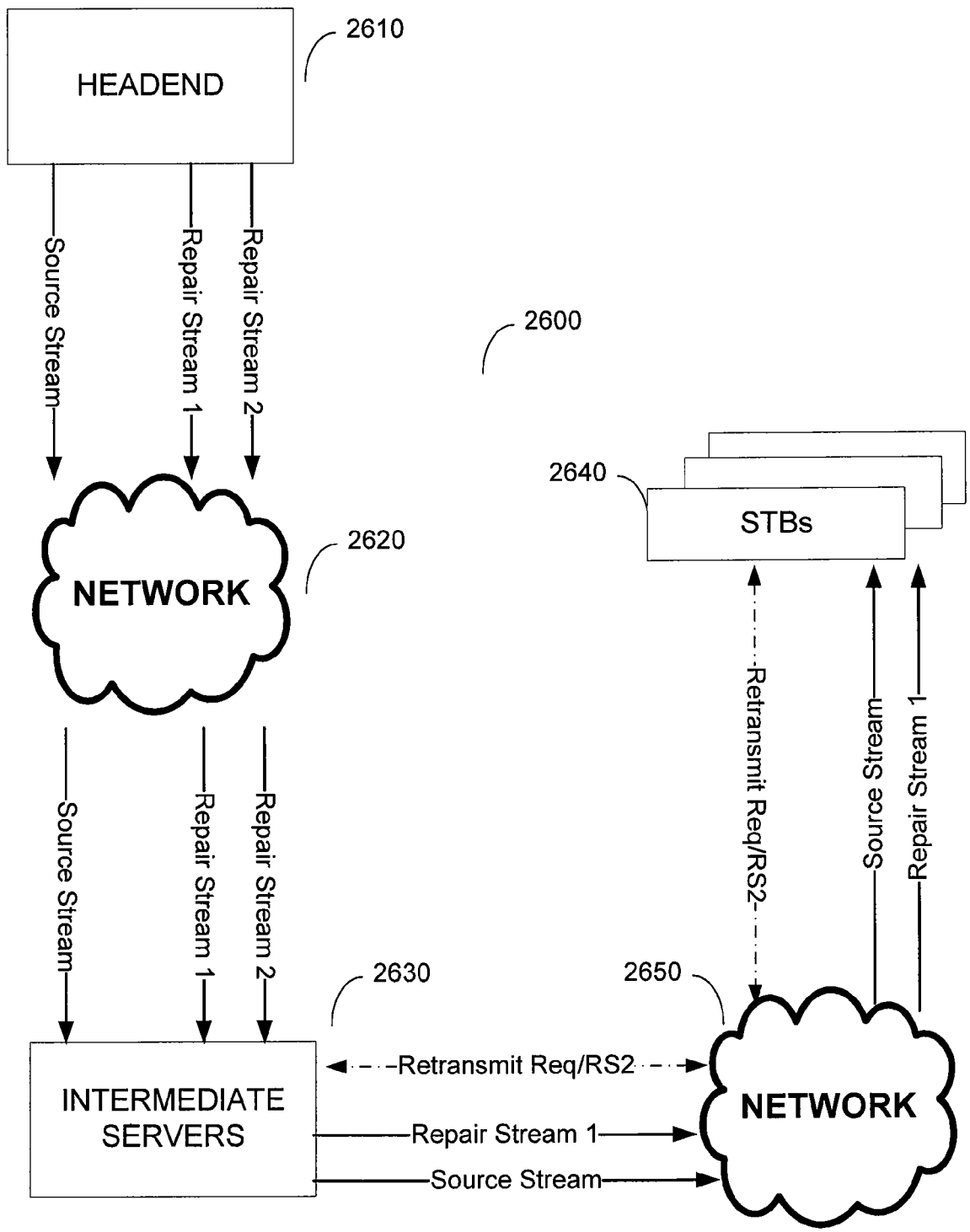
FIG. 26 is a block diagram that shows an example of protecting a stream with FEC repair data and Source Identification data and retransmission repair data.

FIG. 26 shows an example of a communication system 2600 that is using a mixture of streams to send data to a set-top box. A Headend device 2610 sends to network 2620 an original program that comprises original source data in a source stream, and two separate repair streams for the program that can comprises FEC repair data and/or Source Identification data. The network 2620 sends the original program to an intermediate server 2630. This intermediate server 2630 sends the source stream and one of the repair streams to a network 2650. Network 2650 may be the same network as network 2620, but it may also be a distinct network. In any event, network 2650 then sends the source stream and the one repair stream to one or more STBs 2640. In the event that the data received by any of the STBs is insufficient to create the source data, the STBs can request retransmission stream. This request is sent to the intermediate servers 2630 that can respond to a request for retransmission by sending a second repair stream that is distinct from the first repair stream. In some embodiments, packets from the second repair stream is cached on the intermediate servers. In some embodiments, the intermediate servers 2630 cached repair data that has not already been sent to a STB. In some embodiments, the intermediate servers 2630 cache repair data based on a protection period of the source stream. In some embodiments, caching of source or repair streams may occur at other locations in the system/network. In some embodiments, the STBs can request a specific amount of repair data in its retransmission request, such as a specific number of repair packets. In some embodiments, the STBs can request repair data (source data or FEC repair data) based on Source Identification data the STBs have received. In some embodiments, STBs that initially receive source data and/or repair data first receive data that has been cached at the intermediate servers in a unicast stream(s), and then the intermediate server transitions the stream(s) sent to the STBs to a multi-cast stream(s). There are many variations of the communication system 2600, including variations where the source stream and repair streams are sent as one logical stream, including variations where set-top boxes are other types of receiving devices, including variations where some receiving devices do not support the Source Identification data methods and some receiving devices support the Source Identification data methods in conjunction with FEC methods and other receiving devices support the Source Identification methods in conjunction with retransmission methods and other receiving devices support the Source Identification methods in conjunction with both retransmission methods and FEC methods and other receiving devices support the Source Identification methods in conjunction with data re-ordering methods, including variations where there are multiple sending devices, including variations where the sending and/or generating device for a repair for program is either logically or physically different from the sending and/or generating device for an original program, including variations where sending devices are at least sometimes receiving devices or vice versa, including variations where the Source Identification data methods are supported for reasons other than FEC methods or retransmission methods, for example to support data re-ordering methods.

DVB-T/DVB-H Embodiment

Source Identification data transmitted in a data stream separate from a data stream containing the source data can be applied to a variety of systems. For example, Appendix A discloses a system wherein FEC protection and Source Identification data can be transmitted on a first data stream carried on a network such as a DVB-T broadcast network while the original source data can be transmitted on a second data stream that is transmitted on the same network. Appendix A is incorporated into this disclosure for all purposes. In other embodiments, the FEC protection and Source Identification data can be transmitted first data stream carried on a network such as a DVB-H broadcast network while the original source data can be transmitted on a second data stream that is transmitted across another network such as a DVB-T network Note that DVB-T networks and settings have been designed to transmit to fixed position receivers, whereas there are great advantages to extending the usage of DVB-T networks to other types of receivers, e.g., mobile receivers or fixed position receivers in worse positions. For these types of new receivers, the error-conditions present on existing DVB-T networks are often too challenging to support relevant applications such as high quality streaming video. Using the methods described in this disclosure, the usage of these networks can be extended to these new receivers to support applications that are too challenging to otherwise support. No network upgrade is required for these methods to apply, nor is there a requirement to upgrade existing receivers to support these new receivers. Using the methods described in this disclosure, new receivers will be able to receive the original unmodified data streams, and in addition to receive Source Identification data and FEC repair data associated with these original data streams in order to recover and playout video streams at the same quality as existing receivers, even though the network conditions are much worse for the new receivers than they are for existing receivers.

As will be clear to those of skill in the art upon review of this disclosure, the methods described herein can be naturally extended to support different FEC codes, maintaining the property that, at the receiver, data from more than one transmitted code can be combined in a way that provides for greater error correction than if the data were processed independently according to the procedures associated with the respective codes.

The foregoing description has been presented for purposes of illustration and description. It is not intended to be exhaustive or to limit the invention to the precise form disclosed, and obviously many modifications and variations are possible in light of the above teaching. The described embodiments were chosen in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A method for generating and transmitting source identification data for source data, wherein the source data has been divided into K source data units, wherein K is greater than one, wherein the source identification data can be used to identify the position of source data units relative to other source data units and to identify lost or corrupted source data units, the method comprising:
generating source identification data from the K source data units;
transmitting a first data stream to a receiver, wherein the first data stream comprises a set of the source data units, wherein the first data stream does not have the source identification data; and
transmitting a second data stream to the receiver, wherein the second data stream comprises the source identification data, wherein the second data stream is distinct from the first data stream, wherein the source identification data is distinct from the set of the source data units transmitted on the first data stream, and wherein the source identification data is usable to identify source data units in the set of source data units transmitted on the first data stream.

2. The method of claim 1 wherein the source identification data enables a recipient of the first and the second data streams to determine identification labels for the K source data units used to generate the source identification data.

3. The method of claim 1 wherein the source identification data enables a recipient of the first and the second data streams to determine identification labels for any source data unit.

4. The method of claim 1 wherein the source identification data enables a recipient of the first and the second data streams to determine a position of a given source data unit with respect to an ordering of all the source data units.

5. The method of claim 1 wherein the source identification data enables a recipient of the first and the second data streams to determine a position of a given source data unit with respect to a source-determined order sequence of all of the source data units.

6. The method of claim 1 wherein the second data stream further comprises repair data for the source data units.

7. The method of claim 1 wherein the second data stream further comprises repair data for the source identification data.

8. The method of claim 1 wherein the first data stream is transmitted via DVB-T and wherein the second data stream is transmitted via DVB-H.

9. The method of claim 1 further comprising:
receiving a request from the receiver for additional data; and
transmitting a third data stream to the receiver.

10. The method of claim 9 wherein the third data stream comprises a second set source data units.

11. The method of claim 9 wherein the third data stream comprises repair data for the source data units.

12. A method for generating and transmitting source identification data for source data, wherein the source data has been divided into K source data units, wherein K is greater than one, wherein the source identification data can be used to identify the position of source data units relative to other source data units and to identify lost or corrupted source data units, the method comprising:
  generating source identification data from the K source data units, comprising:
  a) creating an ordered set S from each of the K source data units;
    i) applying a hash function, $H_i$, to each member of S, wherein $H_i$ maps the members of S to one of a possible L hash outputs and wherein $H_i$ maps at least X of the members of S to a unique hash output;
    ii) creating a vector corresponding to the L hash outputs, wherein the vector indicates which of the L hash outputs experience collisions and which of the L hash outputs uniquely map to a member of S;
    iii) creating a set, $S_i$, comprising the elements of S that do not map to a unique hash output;
    iv) iterating steps i-iii until either $S_i$ is an empty set or a maximum number of iterations have been executed, wherein for each iteration of steps i-iii $S_i$ is used as S, wherein for each iteration $H_i$ is a hash function that differs from the hash function used during the previous iteration of steps i-iii, wherein for each iteration the values of L and X can change; and
  b) generating source identification data from the vectors created during each iteration of steps i-iii;
  c) transmitting a first data stream to a receiver, wherein the first data stream comprises a set of the source data units; and
  d) transmitting a second data stream to the receiver, wherein the second data stream comprises the source identification data.

13. The method of claim 12 wherein the vector further indicates the location of each uniquely mapped member of S in S, the method further comprising:
  generating a position-to-sequence mapping from the location of the uniquely mapped members of S as indicated by the vectors created during each iteration of steps i-iii.

14. A non-transitory computer readable medium comprising code for performing the method of claim 1.

15. A transmitter comprising a processor and the computer readable medium of claim 14 coupled to the processor.

16. A method for receiving source identification data and associating the source identification data with source data, wherein the source data has been divided into K source data units, wherein K is greater than one, wherein the source identification data can be used to identify the position of source data units relative to other source data units and to identify lost or corrupted source data units, the method comprising:
  receiving a plurality of source data units from a first data stream, wherein the first data stream does not have the source identification data;
  receiving source identification data from a second data stream, wherein the second data stream is distinct from the first data stream; and
  associating the source identification data obtained from a set of packets from the second data stream with the plurality of source data units obtained from packets distinct from the set of packets from the second data stream, wherein the source identification data is usable to identify source data units in the plurality of source data units.

17. The method of claim 16 further comprising:
determining identification labels for the received plurality of source data units.

18. The method of claim 16 further comprising:
determining identification labels for any source data units that are not a member of the received plurality of source data units.

19. The method of claim 16 further comprising:
determining a position for a source data unit in the plurality of source data units with respect to an ordering of all the source data units.

20. The method of claim 16 further comprising:
determining a position for a source data unit in the plurality of source data units with respect to a source-determined order sequence of all of the source data units.

21. The method of claim 16 further comprising:
receiving repair data for the plurality of source data units from the second data stream.

22. The method of claim 16 further comprising:
receiving repair data for the source identification data from the second data stream.

23. The method of claim 16 wherein the first data stream is received via DVB-T and wherein the second data stream is received via DVB-H.

24. The method of claim 16 further comprising:
  analyzing the source identification data and the plurality of source data units to determine if any of the K source data units have not been received; and
  if any of the K source data units have not been received, requesting additional data.

25. The method of claim 24 further comprising:
receiving the additional data from a third data stream.

26. A method for receiving source identification data and associating the source identification data with source data, wherein the source data has been divided into K source data units, wherein K is greater than one, wherein the source identification data can be used to identify the position of source data units relative to other source data units and to identify lost or corrupted source data units, the method comprising:
  receiving a plurality of source data units from a first data stream;
  receiving source identification data from a second data stream; and
  associating the source identification data with the plurality of source data units comprises:
  i) creating a set, S, from each of the plurality of source data units;
  ii) applying a hash function, Hi, to each member of S to obtain a hashed output associated with each of member of S, wherein Hi maps each of the members of S to one of a possible L hash outputs;
  iii) determining which of the hashed outputs uniquely identify the source data unit associated with the hashed output;
  iv) if it is determined that a hashed output does uniquely identify a source data unit, removing the uniquely identified source data unit from S and associating a proper set of identification data from the source identification data with the uniquely identified source data unit; and
  v) if it is determined that one of the hashed output is not unique, iterating steps i-iii unit S is an empty set or until a maximum number of iterations have been executed, wherein for each iteration Hi is a hash function that differs from the hash function used during the pervious iteration of steps ii-iv with a potentially different value of L.

27. The method of claim 26 wherein the $H_i$ applied for each iteration of steps ii-v is determined from the source identification data.

28. The method of claim 26 wherein determining which of the hashed outputs uniquely identify the source data unit associated with the hashed output comprises:
comparing each hashed output to a vector from the source identification data, wherein the vector corresponds to the possible L hash outputs, and wherein the vector indicates which of the L hash outputs experience collisions and which of the L hash outputs uniquely map to a member of S.

29. The method of claim 28 wherein the source identification data includes a position-to-sequence mapping and wherein associating a proper set of identification data from the source identification data with the uniquely identified source data unit comprises associating location information from the position-to-sequence mapping to the uniquely identified source data unit.

30. The method of claim 26 further comprising:
if a source data unit is associated with a proper set of identification data from the source identification data, passing the source data unit to a decoder.

31. The method of claim 26 further comprising:
if a source data unit is not associated with a proper set of identification data from the source identification data, discarding the source data unit.

32. A non-transitory computer readable medium comprising code for performing the method of claim 16.

33. A receiver comprising a processor and the computer readable medium of claim 32 coupled to the processor.

34. A system for generating and transmitting source identification data for source data, wherein the source data has been divided into K source data units, wherein K is greater than one, wherein the source identification data can be used to identify the position of source data units relative to other source data units and to identify lost or corrupted source data units, the system comprising:
means for generating source identification data from the K source data units; and
means for transmitting a first data stream and a second data stream to a receiver, wherein the first data stream comprises a set of the source data units, wherein the first data stream does not have the source identification data, wherein the second data stream comprises the source identification data, wherein the second data stream is distinct from the first data stream, wherein the source identification data is distinct from the set of the source data units transmitted on the first data stream, and wherein the source identification data is usable to identify source data units in the set of source data units transmitted on the first data stream.

35. A system for receiving source identification data and associating the source identification data with source data, wherein the source data has been divided into K source data units, wherein K is greater than one, wherein the source identification data can be used to identify the position of source data units relative to other source data units and to identify lost or corrupted source data units, the system comprising:
means for receiving a plurality of source data units from a first data stream and receiving source identification data from a second data stream, wherein the first data stream does not have the source identification data, wherein the second data stream is distinct from the first data stream; and
means for associating the source identification data obtained from a set of packets from the second data stream with the plurality of source data units obtained from packets distinct from the set of packets from the second data stream, wherein the source identification data is usable to identify source data units in the plurality of source data units.

\* \* \* \* \*